US008185380B2

(12) United States Patent
Kameyama

(10) Patent No.: US 8,185,380 B2
(45) Date of Patent: May 22, 2012

(54) APPARATUS FOR PROVIDING INFORMATION FOR VEHICLE

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 464 days.

(21) Appl. No.: 12/465,986

(22) Filed: May 14, 2009

(65) Prior Publication Data
US 2009/0292528 A1   Nov. 26, 2009

(30) Foreign Application Priority Data

May 21, 2008   (JP) ................................ 2008-133463

(51) Int. Cl.
*G06F 17/21* (2006.01)
(52) U.S. Cl. .............. 704/10; 704/9; 704/275; 704/257; 704/246; 704/244; 704/1; 707/769; 706/62; 434/362
(58) Field of Classification Search .................. 704/275, 704/146, 1, 9, 244, 257, 246; 707/769; 706/62; 434/362
See application file for complete search history.

(56) References Cited

U.S. PATENT DOCUMENTS

| | | | |
|---|---|---|---|
| 5,597,312 A * | 1/1997 | Bloom et al. .................. 434/362 |
| 6,795,808 B1 * | 9/2004 | Strubbe et al. ................ 704/275 |
| 7,266,537 B2 * | 9/2007 | Jacobsen et al. ............... 706/62 |
| 7,418,391 B2 | 8/2008 | Gayama et al. |
| 2001/0041977 A1 * | 11/2001 | Aoyagi et al. ................. 704/246 |
| 2003/0191625 A1 * | 10/2003 | Gorin et al. ........................ 704/1 |
| 2005/0010951 A1 | 1/2005 | Saito et al. |
| 2006/0074634 A1 * | 4/2006 | Gao et al. ........................... 704/9 |
| 2007/0005206 A1 | 1/2007 | Zhang et al. |
| 2007/0192038 A1 | 8/2007 | Kameyama |
| 2008/0288252 A1 * | 11/2008 | Cerra et al. .................... 704/244 |
| 2009/0326947 A1 * | 12/2009 | Arnold et al. ................. 704/257 |
| 2011/0055256 A1 * | 3/2011 | Phillips et al. ................ 707/769 |

FOREIGN PATENT DOCUMENTS

| | | |
|---|---|---|
| JP | 2001-195419 | 7/2001 |
| JP | 2003-337039 | 11/2003 |
| JP | 2005-352776 | 12/2005 |
| JP | 2006-195637 | 7/2006 |
| JP | 2007-072331 | 3/2007 |
| JP | 2007-174441 | 7/2007 |
| JP | 2007-212421 | 8/2007 |

OTHER PUBLICATIONS

Japanese Office Action dated Apr. 1, 2010, issued in corresponding Japanese Application No. 2008-133463, with English translation.
"Eliza", Wikipedia, http://www.ycf.nanet.co.jp, pp. 1-4, 1-3 and 1-4.

* cited by examiner

*Primary Examiner* — Michael Colucci
(74) *Attorney, Agent, or Firm* — Nixon & Vanderhye P.C.

(57) ABSTRACT

A system is provided with a conversation support means. A conversation support means creates a conversation response, and outputs it in a sound, a character, etc. A conversation response is created in a manner that combines words by inserting a reference keyword as a leading keyword in the response sentence model prepared separately. A conversation support means retrieves the reference keyword beforehand provided in conversation support by dictionary collation from the conversation entry content made by a sound, a manual entry, etc. by a user. Furthermore, the retrieved reference keyword themselves or another reference keyword associated with the retrieved reference keyword are handled as a leading keyword. A series of user conversation contents inputted by the conversation support are accumulated as a base data for determining a user interest. The base data is analyzed to determine a user interest for providing suitable information service.

17 Claims, 50 Drawing Sheets

FIG. 3

| CHARACTER CODE | LIGHT COLOR CODE | LIGHTING PATTERN CONTROL DATA | 402 |
|---|---|---|---|
| SKC1 | CC1 | CD1 (RED FLASH) | |
| SKC2 | CC2 | CD2 (UMBER/FADE) | |
| SKC3 | CC3 | CD3 (BLUE CONTINUOUS FLASHING) | |
| ⋮ | ⋮ | ⋮ | |

FIG. 5

|    | R   | G   | B   | MIXED COLOR   |
|----|-----|-----|-----|---------------|
| 0  | 1   | 1   | 1   | WHITE         |
| 1  | 1   | 0.5 | 1   | PALE PURPLE   |
| 2  | 1   | 0   | 1   | PURPLE        |
| 3  | 0.5 | 0   | 1   | BLUISH PURPLE |
| 4  | 0   | 0   | 1   | BLUE          |
| 5  | 0.5 | 0.5 | 1   | PALE BLUE     |
| 6  | 1   | 1   | 1   | WHITE         |
| 7  | 1   | 1   | 0.5 | PALE ORANGE   |
| 8  | 1   | 1   | 0   | ORANGE        |
| 9  | 1   | 0   | 0   | RED           |
| 10 | 1   | 0.5 | 0.5 | PINK          |
| 11 | 1   | 1   | 1   | WHITE         |
| 12 | 0.5 | 1   | 1   | PALE TURQ.    |
| 13 | 0   | 1   | 1   | TURQUOISE     |
| 14 | 0   | 1   | 0   | GREEN         |

FIG. 11

| | | PHYSICAL INDEX | | | | | ~401 |
|---|---|---|---|---|---|---|---|
| | | MENTAL INDEX | | | | | |
| SONG ID 1 | SONG NAME 1 | GENRE CODE 1 | CHARACTER CODE 1 | AGE CODE 1 | SEX CODE 1 | MUSIC DATA 1 | SONG MODE 1 |
| SONG ID 2 | SONG NAME 2 | GENRE CODE 2 | CHARACTER CODE 2 | AGE CODE 2 | SEX CODE 2 | MUSIC DATA 2 | SONG MODE 2 |
| SONG ID 3 | SONG NAME 3 | GENRE CODE 3 | CHARACTER CODE 3 | AGE CODE 3 | SEX CODE 3 | MUSIC DATA 3 | SONG MODE 3 |
| SONG ID 4 | SONG NAME 4 | GENRE CODE 4 | CHARACTER CODE 4 | AGE CODE 4 | SEX CODE 4 | MUSIC DATA 4 | SONG MODE 4 |
| ⋮ | ⋮ | ⋮ | ⋮ | ⋮ | ⋮ | ⋮ | ⋮ |

CHARACTER CODE (SKC)

SKC1: ACTIVE
SKC2: GENTLE
SKC3: OPTIMISTIC
SKC4: PESSIMISTIC
SKC5: DECADENT
SKC6: PHYSICAL
SKC7: INTELLIGENT
SKC8: ROMANTICIST

GENRE CODE (JC)

JC1: CLASSIC
JC2: JAZZ
JC3: ROCK
JC4: POPS
JC5: JAPANESE MUSIC
JC6: WORLD MUSIC
JC7: MOOD

AGE CODE (AC)

AC1: INFANT (TO 5 YEARS)
AC2: CHILD (6 TO 11)
AC3: JUNIOR (12 TO 17)
AC4: YOUTH (18 TO 27)
AC5: MIDDLE AGE (28 TO 37)
AC6: SENIOR (38 TO 45)
AC7: MATURE AGE (46 TO 63)
AC8: OLD AGE (64 TO OVER)
AC9: REGARDLESS OF AGE

SEX CODE (SC)

SC1: MALE
SC2: FEMALE
SC3: REGARDLESS OF SEX

SONG MODE

AG: UPLIFTING, ACTIVATING
ST: REFRESHING
SF: MILD, SOOTHING
HL: HEALING, $\alpha$-WAVE

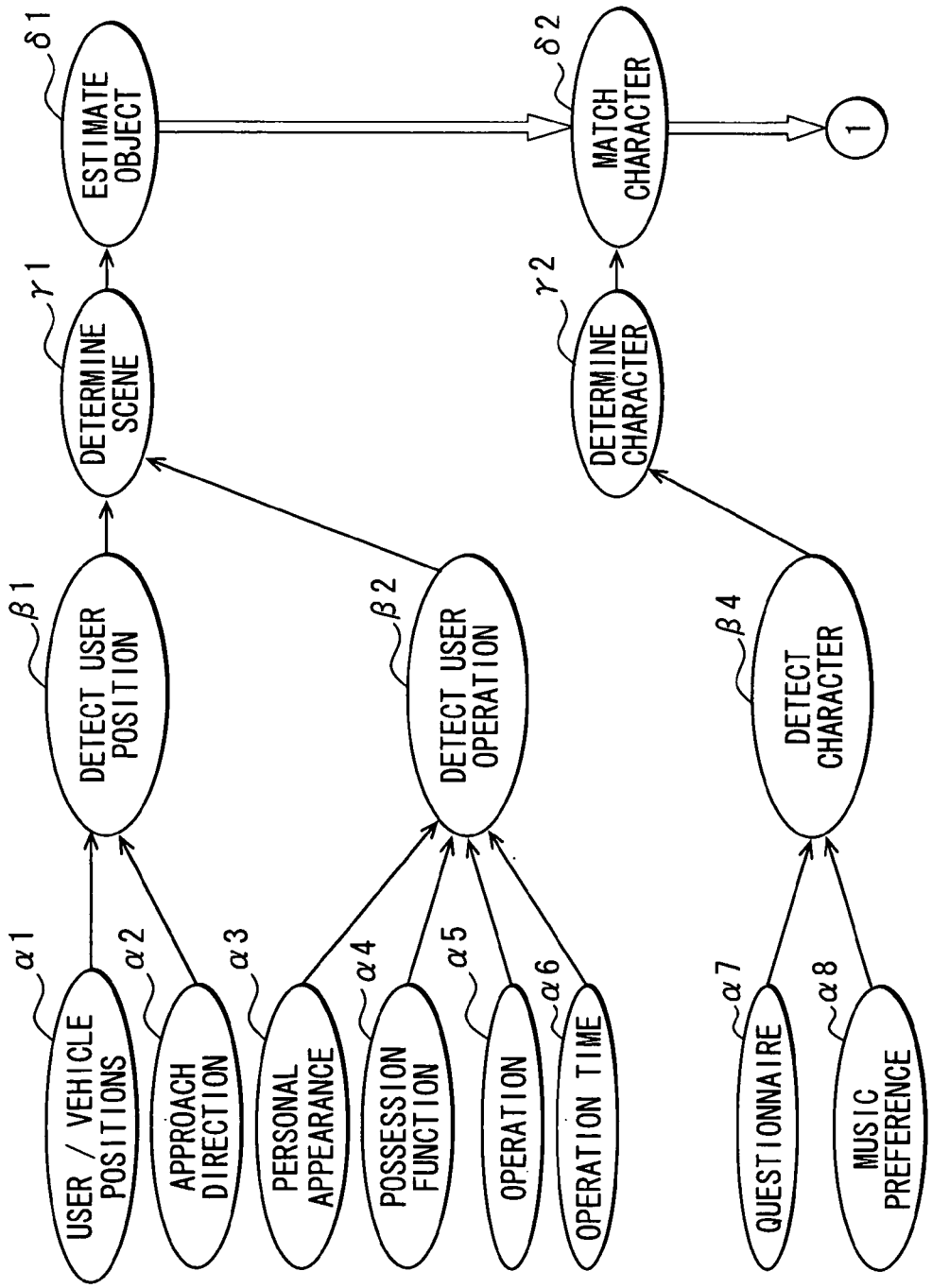

FIG. 14

| FIG. 14A |
|---|
| FIG. 14B |

FIG. 14A

| STATE TO BE SPECIFIED | | BIOLOGICAL PARAMETER | | | | | | EXPRESSION | | ATTITUDE | |
|---|---|---|---|---|---|---|---|---|---|---|---|
| PHYSICAL CONDITION | MENTAL CONDITION | BLOOD PRESSURE | | BODY TEMP. | | SKIN RESISTANCE | | MEANING | CHANGE | MOVE | SPEED |
| | | CHANGE | DIREC. | CHANGE | DIREC. | CHANGE | DIREC. | | | | |
| NORMAL | NEUTRAL (CENTER) | – | – | – | – | – | – | – | – | – | – |
| TIRED | NEUTRAL (CENTER) | FAST | VARYING | – | – | FAST | INCR. | FACE DIRECTION | SUDDEN INCR. | INCR. AND DECR. | – |
| NORMAL | NEUTRAL (UPLIFTING) | SLOW | – | SLOW | – | – | – | UNPLEASANT | SLIGHT INCR. | SLIGHT INCR. | – |
| NORMAL | NEUTRAL (SOOTHING) | | | | | | | | | | |
| SLIGHTLY ABNORMAL | NEUTRAL (CENTER) | | | | | | | | | | |
| CONSIDERABLY ABNORMAL | NEUTRAL (SOOTHING) | SLOW | – | SLOW | – | SLOW | INCR. | UNPLEASANT | INCR. | INCR. AND DECR. | DECR. |
| NORMAL | PASSIONATE OR EXCITED | FAST | VARYING | FAST | VARYING | FAST | DECR. | EXCITED | SUDDEN INCR. | SUDDEN INCR. | INCR. |
| TIRED | NEUTRAL (SOOTHING) | FAST | VARYING | SLOW | – | FAST | INCR. | FACE DIREC./ UNPLEASANT | INCR. | INCR. AND DECR. | – |
| CONSIDERABLY ABNORMAL | DISAPPOINTED | FAST | VARYING | SLOW | – | SLOW | INCR. | UNPLEASANT | INCR. | INCR. AND DECR. | DECR. |
| SLIGHTLY ABNORMAL | PASSIONATE OR EXCITED | FAST | – | FAST | – | FAST | DECR. | EXCITED | SUDDEN INCR. | SUDDEN INCR. | INCR. |
| TIRED | DISAPPOINTED | – | – | SLOW | – | SLOW | INCR. | NO EXPRESSION OR UNPLEASANT | SLIGHT INCR. | – | – |

| LINE OF SIGHT | | | PUPIL | STEERING | | COLLATION COUNTER |
|---|---|---|---|---|---|---|
| MOVE | SPEED | PATTERN | DIAMETER | ERROR | SPEED | MATCHING COUNT |
| — | — | — | — | — | — | $N_0$ |
| SUDDEN INCR. | — | MODULATION | VARYING | INCR. | — | $N_1$ |
| DECR. | — | — | — | — | — | $N_2$ |
| | | | | | | $N_9$ |
| | | | | | | $N_9$ |
| SUDDEN DECR. | SUDDEN DECR. | MODULATION | — | INCR. | DECR. | $N_3$ |
| SUDDEN DECR. | SUDDEN INCR. | MODULATION | OPENED | INCR. | INCR. | $N_4$ |
| SUDDEN INCR. | | MODULATION | VARYING | INCR. | — | $N_5$ |
| SUDDEN DECR. | SUDDEN DECR. | MODULATION | VARYING | INCR. | DECR. | $N_6$ |
| SUDDEN DECR. | SUDDEN INCR. | MODULATION | OPENED | INCR. | INCR. | $N_7$ |
| DECR. | | — | — | INCR. | — | $N_8$ |

| | | NORMAL | | ABNORMAL | |
|---|---|---|---|---|---|
| | | NORMAL | TIRED | SLIGHT | SERIOUS |
| [fb] | fb1 | 0.5 | 0.5 | 0.8 | 1 |
| | fb2 | 0.5 | 0.5 | 0.8 | 1 |
| | fb3 | 0.2 | 0.5 | 1 | 1 |
| | fb4 | 0.2 | 0.5 | 1 | 1 |
| | fb5 | 0.2 | 0.2 | 0.5 | 1 |

| | | PASSIONATE OR EXCITED | DISAPPOINTED | NEUTRAL | | |
|---|---|---|---|---|---|---|
| | | | | CENTER VALUE | UPLIFTING | SOOTHING |
| [fm] | fm1 | 1 | 1 | 1 | 0.8 | 1 |
| | fm2 | 1 | 1 | 1 | 0.8 | 1 |
| | fm3 | 0.2 | 0.2 | 0.2 | 1 | 0.5 |
| | fm4 | 0.2 | 0.2 | 0.2 | 1 | 0.5 |
| | fm5 | 0.2 | 1 | 0.2 | 1 | 0.2 |
| | fm6 | 0.8 | 0.2 | 0.2 | 0.2 | 1 |
| | fm7 | 0.8 | 0.2 | 0.2 | 0.2 | 1 |

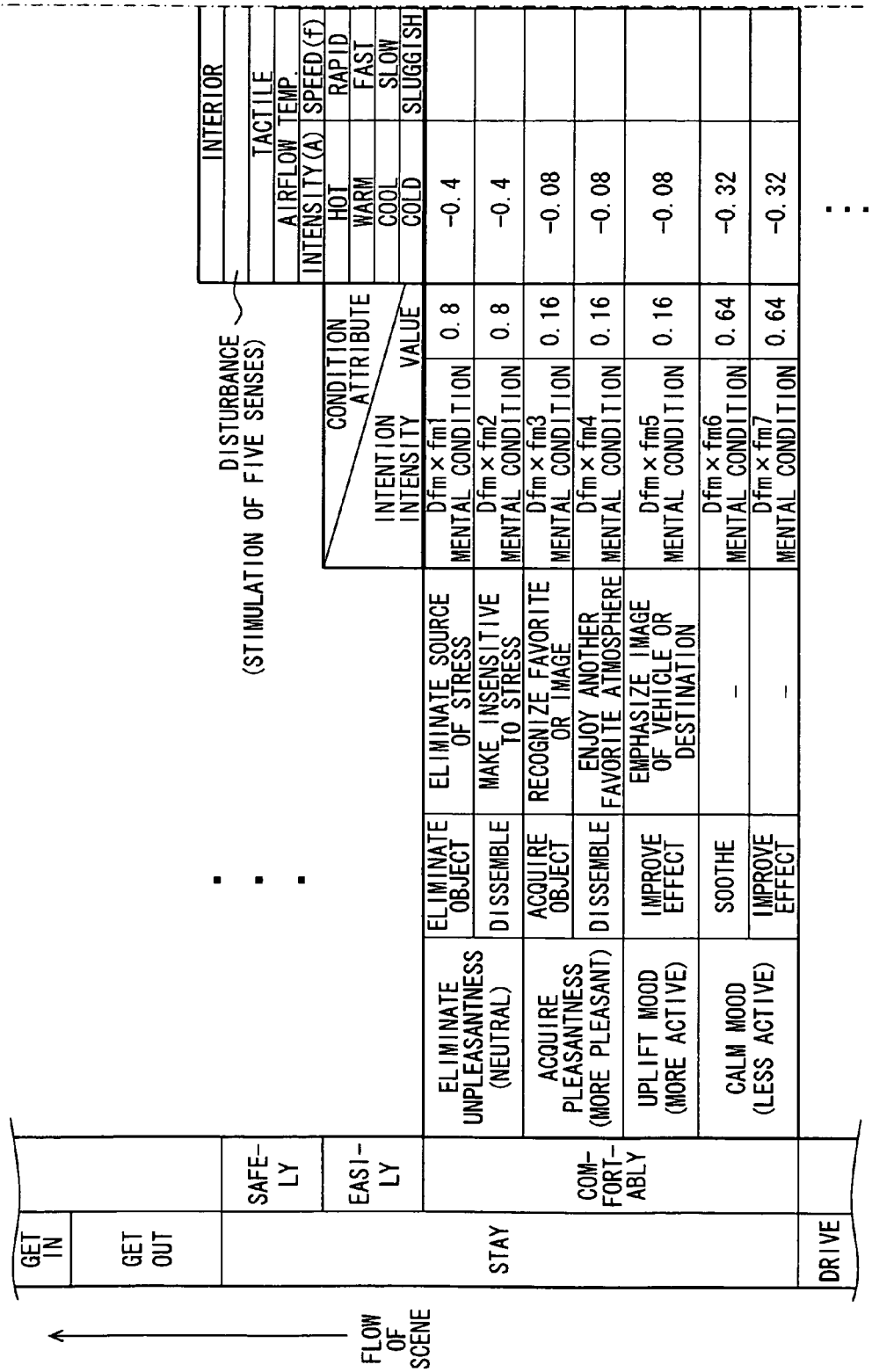

FIG. 19B

| INTERIOR DISTURBANCE (STIMULATION OF FIVE SENSES) | | | | | | | | | DISTURBANCE POINT | |
|---|---|---|---|---|---|---|---|---|---|---|
| TACTILE | | | | VISUAL | | | | AUDITORY | | |
| OBJECT TEMP. | HUMIDITY | PRESSURE (VIBRATION) | | ILLUMINANCE | | | | SOUND | | |
| INTENSITY(A) | INTENSITY(A) | INTENSITY(A) | SPEED(f) | INTENSITY(A) | | SPEED(f) | | INTENSITY(A) | SPEED(f) | |
| HOT | WET | LARGE | HIGH | GLARING | DIM DARK | WARM COLOR | COLD COLOR | NOISY | LIVELY | MAX/FAST +1.0 |
| COLD | MOISTENED DRY | SMALL | LOW | | | | | QUIET | GENTLY | MEDIUM LARGE +0.5 / MEDIUM SMALL -0.5 / MIN/SLOW -1.0 |
| | | -0.4 | | -0.8 | | | | 0.8 | | |
| | | -0.4 | | -0.8 | | | | 0.8 | | |
| | | -0.08 | | -0.16 | | | | 0.16 | | |
| | | -0.08 | | -0.16 | | | | 0.16 | | |
| | | -0.08 | | -0.16 | | | | 0.16 | | |
| | | -0.32 | | -0.64 | | | | 0.64 | | |
| | | -0.32 | | -0.64 | | | | 0.64 | | |

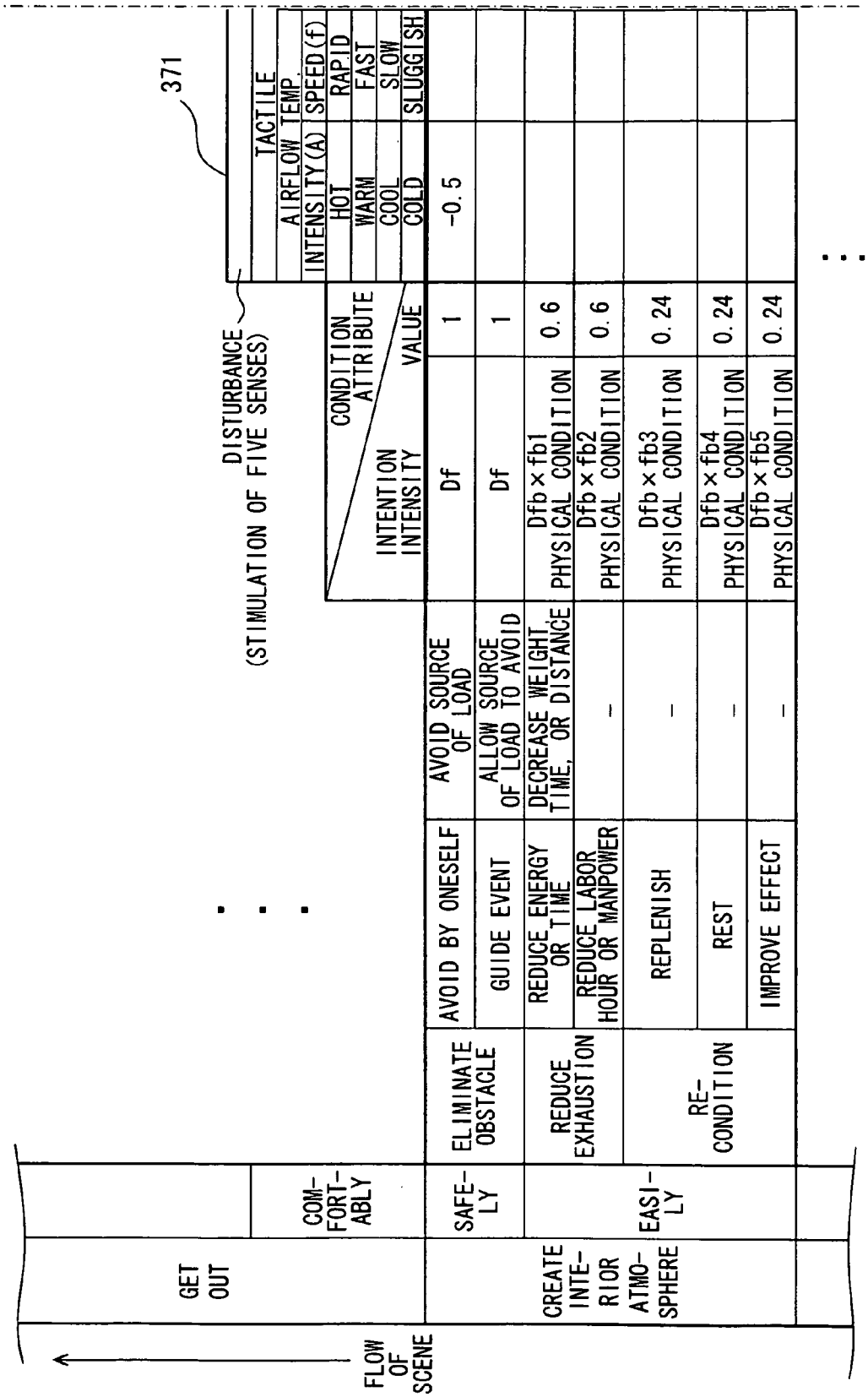

FIG. 20B

| | DISTURBANCE (STIMULATION OF FIVE SENSES) | | | | | | | DISTURBANCE POINT | |
|---|---|---|---|---|---|---|---|---|---|
| TACTILE | | | | VISUAL | | AUDITORY | | | |
| | HUMIDITY | PRESSURE (VIBRATION) | | ILLUMINANCE | | SOUND | | | |
| OBJECT TEMP. INTENSITY(A) | INTENSITY(A) | INTENSITY(A) | SPEED(f) | INTENSITY(A) | SPEED(f) | INTENSITY(A) | SPEED(f) | | |
| HOT | WET | LARGE | HIGH | GLARING | WARM COLOR | NOISY | LIVELY | MAX/FAST | +1.0 |
| | MOISTENED | | | DIM | | | | MEDIUM LARGE | +0.5 |
| COLD | DRY | SMALL | LOW | DARK | COLD COLOR | QUIET | GENTLY | MEDIUM SMALL | -0.5 |
| | | -0.5 | | -1 | | 1 | | MIN/SLOW | -1.0 |

| FIG. 21A |
|----------|
| FIG. 21B |

FIG. 21A

| | | | | Space Effect | | Intensity, Disturbance Type, Expected Value — Disturbance |
|---|---|---|---|---|---|---|
| | | | | | Burden or Expectation | |
| GET IN | | | | | | |
| GET OUT | EASILY | | Eliminate Unpleasantness (Neutral) | Eliminate Source of Stress | Eliminate Noise | |
| | | | | | Eliminate Heat or Cold | |
| | | | | | Strengthen Communication | |
| STAY | COMFORTABLY | | Acquire Pleasantness (More Pleasant) | Change Interest or Dissemble | Provide Interested Info. | |
| | | | | Favorite or Image is Available | (Common) Provide Interested Info. | |
| | | | | | (Common) Provide Favorable Impression | |
| | | | Uplift Mood (More Active) | Interested Matter Proceeds as Intended | Give Preference to Oneself | |
| | | | | Setting is Adjusted for Enjoying Favorites | Appeal Oneself | |
| | | | Calm Mood (Less Active) | Consciousness Can Be Freed | Cooperate | |
| DRIVE | | | | | | |

| VISUAL | | AUDITORY | | TACTILE | |
|---|---|---|---|---|---|
| RATIONAL | EMOTIONAL | RATIONAL | EMOTIONAL | RATIONAL | EMOTIONAL |
| | | | SOUND PREVENTED INTERIORLY | | AIR-CONDITIONED INTERIORLY |
| DISPLAYED INTERIORLY | ILLUMINATED INTERIORLY | | | | |
| DISPLAYED INTERIORLY | ILLUMINATED INTERIORLY | VOICE GENERATED INTERIORLY | MUSIC GENERATED | | |
| ALL DISPLAYED INTERIORLY | ALL ILLUMINATED INTERIORLY | | | ALL DISPLAYED INTERIORLY | |
| | ILLUMINATED INTERIORLY | VOICE GENERATED INTERIORLY | MUSIC GENERATED | | SOUND GENERATED INTERIORLY |
| | ILLUMINATED INTERIORLY | VOICE GENERATED INTERIORLY | MUSIC GENERATED | | |
| ALL DISPLAYED INTERIORLY | ALL ILLUMINATED INTERIORLY | ALL VOICES GENERATED INTERIORLY | | | |

372 — FIVE SENSES

|  |  |  | \_373 |  |  |  |  |  |
|---|---|---|---|---|---|---|---|---|
|  |  |  | FUNCTION | | | | | |
|  |  |  | PASSENGER POSITION | | | DISPLAY | | |
|  |  |  | FRONT OR REAR | LEFT OR RIGHT | TOP OR BOTTOM | EF-FECT | NOR-MAL | EVALU-ATION |
| INTERIOR EFFECT | VISUAL EFFECT | ILLUMI-NATION | FRONT | LEFT | TOP | | | |
|  |  |  |  |  | BOTTOM | | | |
|  |  |  |  | RIGHT | TOP | | | |
|  |  |  |  |  | BOTTOM | | | |
|  |  |  | REAR | LEFT | TOP | | | |
|  |  |  |  |  | BOTTOM | | | |
|  |  |  |  | RIGHT | TOP | | | |
|  |  |  |  |  | BOTTOM | | | |
|  |  | ⋮ | | | | | | |
|  | AUDITORY EFFECT | SOUND GENER-ATION | | | | | | |
|  |  | VOICE GENER-ATION | | | | | | |
|  |  | MUTING | | | | | | |
|  | TACTILE EFFECT | HEATING | | | | | | |
|  |  | COOLING | | | | | | |

| FUNCTION | | | | | | | | | | | |
|---|---|---|---|---|---|---|---|---|---|---|---|
| INTERIOR | | | ILLUMINATION | | | AUDIO | | | DOOR | | |
| EF-FECT | NOR-MAL | EVALU-ATION | EF-FECT | NOR-MAL | EVALU-ATION | EF-FECT | NOR-MAL | EVALU-ATION | EF-FECT | NOR-MAL | EVALU-ATION |
|  |  |  | 3 |  |  |  |  |  |  |  |  |
|  |  |  | 3 |  |  |  |  |  |  |  |  |
|  |  |  | 3 |  |  |  |  |  |  |  |  |
|  |  |  | 3 |  |  |  |  |  |  |  |  |
|  |  |  | 3 |  |  |  |  |  |  |  |  |
|  |  |  | 3 |  |  |  |  |  |  |  |  |
|  |  |  | 3 |  |  |  |  |  |  |  |  |
|  |  |  | 3 |  |  |  |  |  |  |  |  |

FIG. 26

| PRIORITY RANKING | CORRECTION COEFFICIENT |
|---|---|
| 10 | 1.0 |
| 8 | 0.8 |
| 6 | 0.6 |
| 4 | 0.4 |
| 2 | 0.2 |
| 0 | 0 |

FIG. 34

CB: It is hot.  Aren't you hesitating to go out?
DV: Well.  Boys want to go to <u>beach.</u>
CB: How about "TAKASHIO beach"?
DV: We went to <u>TAKASHIO beach</u> <u>last year.</u>
CB: How about "IMOARAI beach"?
DV: Isn't the beach <u>crowded?</u>
CB: Do you really need a place "NOT CROWDED"
DV: Right.  I like <u>less crowded</u> even somewhat <u>distanced.</u>
CB: How about "ANABA beach"?

FIG. 35

CB: I activated the air-conditioning.
DV: Thanks.  You <u>saved</u> me.
CB: It is my pleasure.  Outside is so hot.
DV: Don't you know anywhere <u>cool</u> place?
CB: I have some "cool places".  Do you have plenty of time?
DV: I want to go for a <u>drive.</u>  <u>Three hours.</u>
CB: How about "DOKAYUKI plateau" also good in summer. About one hour.

FIG. 36

CB: Aren't you tired?
DV: No, I am OK.
CB: Why don't you have a break.
DV: Thanks.

DV: I need something like coffee.
CB: We are approaching to "KAMEYAMA parking".
DV: Did I visit KAMEYAMA before?
CB: It has a highway oasis facility with a coffee shop.
DV: OK. Let's go there.
CB: 8 km more.

FIG. 37

CB: You did not have a meal. Right?
DV: Yes. I feel little hungry.
CB: Do you want to have a full and thick food?
DV: Any kind is OK. But, I want some fast.
CB: OK. How about a Noodle shop "TENKOMORI".
---
DV: OK. Have a light one.
CB: Do you want to have a light and thin food?
DV: What kind of place do you recommend?
CB: How about "Buckwheat noodle", "Japanese cuisine", "Seafood bowl" etc.
DV: OK. If possible, I want a tasty place.
---

FIG. 38

CB: Do you want to have some snack?
DV: Good idea. Something sweet.
CB: How about "Coffee shop"
DV: Do you know any shop close to here. Show me a fun shop.
CB: I recommend a shop serving "Coffee SHIRUKO" recently on a news

FIG. 39

| KEYWORD | FREQUENCY | 321a |
|---------|-----------|------|
| TIRE    | 20        |      |
| SNOW    | 17        |      |
| SKI     | 10        |      |
| ⋮       | ⋮         |      |

| URL | DESTINATION | FREQUENCY |
|-----|-------------|-----------|
| www.yukideri-tire.co.jp | YUKIDERITAIYA | 10 |
| www.nabari-dampezzo.ne.jp | NABARIDANPEZZO | 7 |
| www.shimospa.com | SHIMOBUKURE ONSEN | 3 |
| ⋮ | ⋮ | ⋮ |

(321b indicates URL column)

| DATE | USER | DESTINATION | CLASS | FREQUENCY |
|---|---|---|---|---|
| 2003.3.1 | MOTHER | SHOP A | NJC2 | 2 |
| 2003.3.1 | MOTHER | RESTAURANT A | NJC1 | 1 |
| 2003.3.2 | FATHER | RESTAURANT B | NJC1 | 8 |
| 2003.3.8 | FATHER | RESTAURANT C | NJC1 | 2 |
| ⋮ | ⋮ | ⋮ | ⋮ | ⋮ |
| 2003.8.3 | ALL FAMILY | SEASHORE A | NJC3 | 1 |
| 2003.8.3 | ALL FAMILY | RESTAURANT D | NJC1 | 1 |
| ⋮ | ⋮ | ⋮ | ⋮ | ⋮ |

21d

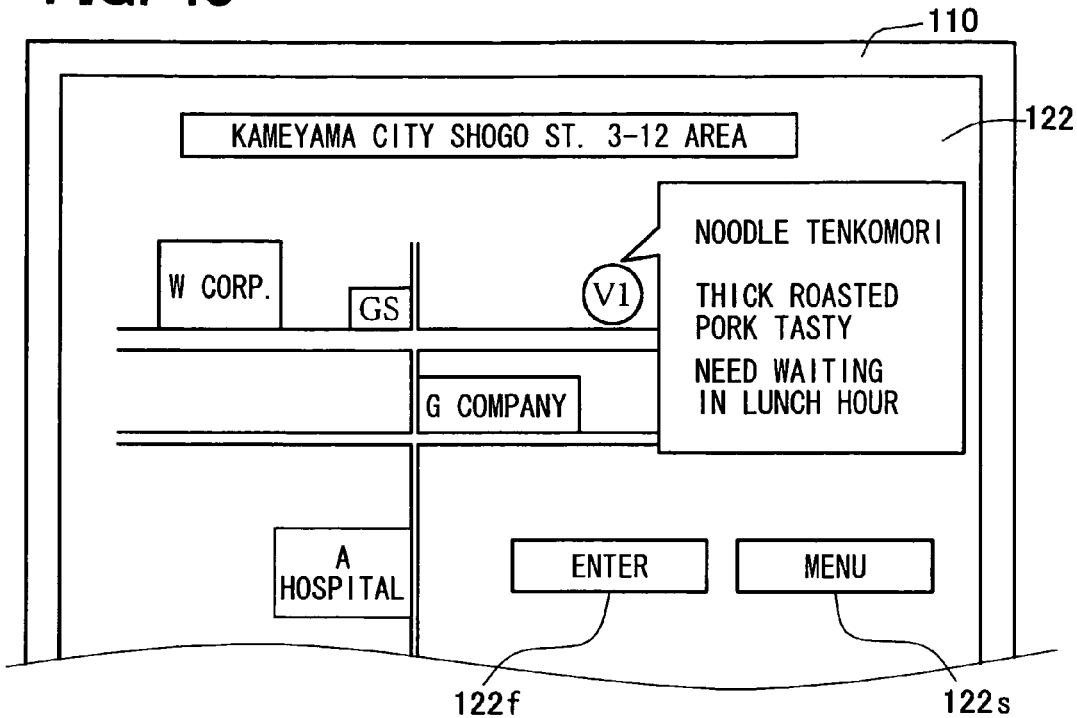
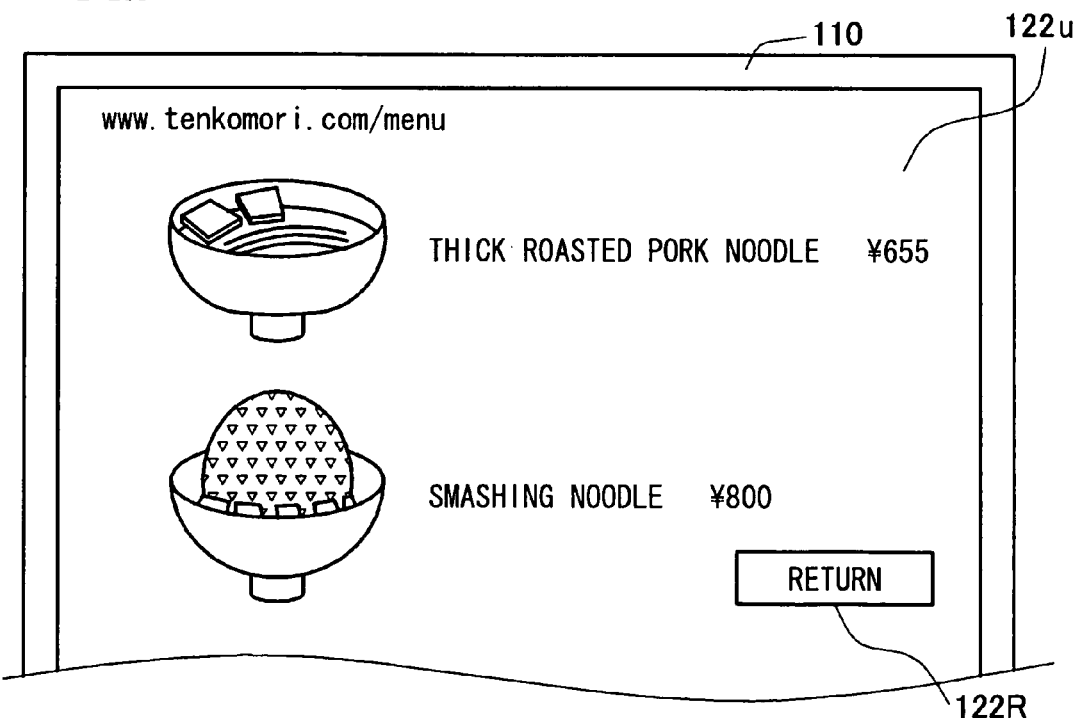

```
http://www.yukideri-tire.co.jp/catalog/studless2007
```
2007 WINTER NEW MODEL

| PHOTO | MAKER | PRODUCT | PRICE (FOUR WHEEL) |
|---|---|---|---|
| 🛞 | MAX | KAMITUKI MAX-2000KM | 87500 |
| 🛞 | BABA | FUMITUKE SUPER-200 | 88000 |
| 🛞 | KAMEYAMA | NICE DRIFT 10 | SOLD |
|   |   |   |   |

```
http://www.maxtire.com/max-2000km/
```

FOR THIS WINTER!

KAMITUKI
MAX-2000km

GOOD FOR ICY

[ RETURN ]

MAX TIRE CO.

APPARATUS FOR PROVIDING INFORMATION FOR VEHICLE

CROSS REFERENCE TO RELATED APPLICATION

This application is based on Japanese Patent Application No. 2008-133463 filed on May 21, 2008, the contents of which are incorporated herein by reference in its entirety.

FIELD OF THE INVENTION

This invention relates to an apparatus for providing information for vehicle, and a system for the same.

BACKGROUND OF THE INVENTION

The following conventional technologies are known in the art.

Patent documents 1: JP-2007-174441-A
Patent documents 2: JP-2007-11380-A
Non-patent literature 1: An Internet home page "Chatbot is thinking" (URL:http://www.ycf.nanet.co.jp/~skato/muno/index.shtml)

In recent years, development of the technology which carries out the mutual link of a cellular phone and the in-vehicle information service apparatus (specifically car-navigation system) is performed actively. For example, a hands free phone operating system is put in practical use. The hands free phone operating system is constructed by using a voice input and output infrastructure of a car-navigation system, and by connecting a mobile phone and the car-navigation system via a bidirectional short-distance-radio network (for example, Bluetooth (Trademark)). Moreover, the mobile phone connected via wireless connection can be used as an input terminal of a car-navigation system, or can be used as a communication terminal with an external network (for example, Internet). Many interface devices which use a mobile phone as mentioned above are also developed. One typical example of the interface device downloads the data of an image, a video image, or music through a cellular phone, and radio-transmits the data to a car-navigation system. Then, the interface device outputs the data through a monitor of the car-navigation system. For example, the patent document 2 discloses an example of the interface device. The wireless connection adapter which realized the interface device is already marketed (for example, brand name-PDI-B922 (available from I-O Data Device, INC.)).

SUMMARY OF THE INVENTION

The above prior art technology intends to improve operability and convenience of the car navigation apparatus by combining with a cellular phone, rather than aiming to flexibly respond to a variety of user tastes. For instance, an example of responding to a user taste is a learning function which simplifies an operation for designating a favorite route or a destination, which is visited recently, based on a history of accessing map data or a history of operations performed inside vehicles. However, for a large majority of users except professional drivers, the time period of use for vehicles occupying a daily life is relatively short, therefore, it makes difficult to obtain sufficient time period to allow the service contents to adapt and match the individual tastes. Further, in order to match individual tastes shortly, it is assumed that a user answers a questionnaire requested by a dealer or the like to thereby customize various setting items inside the vehicle. However, in such a case, it is impossible to reflect the newest hobby and interest of individual user on the setting items, each time an event occurs. In addition, providing such a service is limited to a vehicle purchased via a certain dealership which can provide the service.

It is an object of the present invention to provide an apparatus for providing information for vehicle to more densely collect information reflecting user's newest hobbies and interests and also respond to various kinds of tastes appropriately.

According to an example of the present invention, an apparatus for providing information for vehicle is provided with the following features.

The apparatus includes a conversation input means which inputs conversational words in a conversation by an audio input or manual operation by a user of a vehicle.

The apparatus further includes a conversation support means which is made to perform as a user's false conversation partner. The conversation support means includes a reference-keyword dictionary storage section which memorizes the reference-keyword dictionary including a plurality of reference keyword, a reference-keyword extraction means to extract and retrieve reference keyword by comparing contents inputted in the conversation with a keyword dictionary, and a response sentence model storage section which memorizes a plurality of response sentence models with an insertion blank part which corresponds to a leading keyword. The leading keyword is designated to guide or lead a user's next conversation input. The leading keyword corresponds to a retrieved reference keyword or another reference keyword associated with and linked to the retrieved reference keyword within the keyword dictionary. The conversation support means further includes a response sentence output means for creating and outputting a response sentence for leading and guiding the next conversation input by a user. The response sentence is created by inserting the leading keyword corresponding to and linked to the retrieved reference keyword into the insertion blank part of the response sentence model which is retrieved in an orderly manner from the response sentence model storage section at each time of input of the conversation input by a user.

The apparatus further includes a base data accumulation means for accumulating and storing base data for determining user interest. The base data is assembled and accumulated based on a series of conversation contents of a user inputted in response to lead of a conversation support means, an information collection means for analyzing an object of user interest based on the contents of the base data, and for collecting service information which is matched with the analyzed object of the user interest, and a service information output means to output the collected service information in a form of an image, audio, or those combination.

In the above-mentioned invention, the reference keyword beforehand defined for conversation support are retrieved from the contents of the conversation input made by the user by audio, a manual entry, etc. by looking up a dictionary. Next, a conversation response is created by inserting the retrieved reference keyword or another reference keyword associated beforehand with the retrieved reference keyword into a blank of a leading keyword in the response sentence model prepared separately. A conversation support means outputs a created conversation response in a form of audio, a character, etc. Then, a user answers the output of the conversation response. This is the next conversation input. An conversation support means creates a succeeding conversation response which corresponds to the next conversation input, and outputs it in succession. Thus, a user performs a conversation input in a dialogic operation manner under a conversation leading provided by the conversation support means. In this way, a series of inputted conversation contents of a user are accumulated as a base data for interest determination. The conversation contents may be accumulated as the base data for interest determination as it is. Alternatively, keywords considered necessary may be retrieved from the conversation contents, and the retrieved keyword may be accumulated as the base data for interest determination.

Then, the user interest information reflecting the user's present interest is retrieved from the base data for an interest determination. The service information which matches the retrieved user interesting information is collected, and it is provided for the user using a vehicle. The reference keyword originating in the user's conversation contents are positively taken into the conversation response returned from the conversation support means. Therefore, the user feels that the machine understands the user's conversation input and answering correctly. For this reason, the user can continue a false conversation with the conversation support means in a comfortable and enjoyable manner. As a result, the information reflecting the hobby and interest of the newest which the user is holding now can be sucked up more densely. The information service which corresponds exactly to a user taste of infinite variety is possible.

The following means can be used for a conversation support means. First, the morphological analysis of the contents of the conversation input is conducted. An example of a morphological analysis is decomposition to a word. Furthermore, if it is necessary, the syntax interpretation which specifies the modification relation between the morphemes (reference keyword) obtained as a decomposition result is performed. Then, the optimal response sentence model is determined while a syntax interpretation is also taken into consideration. However, it is not necessary to perform a syntax interpretation. In this case, it is not necessary to install a complicated syntax interpretation engine for a syntax interpretation in the conversation support means. In this case, it is possible to employ a simple algorithm which creates a conversation response by applying a leading keyword to the response sentence model selected at random or a conversation leading order defined beforehand. Also in such an easy algorithm, the feature that the reference keyword originating in the user's conversation input contents are taken in positively is common in the conversation response returned from the system side. Therefore, in spite of being a conversation support engine comparatively lightweight as soft ware, it is possible to continue a conversation by providing false feeling of sophisticated conversation partner. Such a conversation support engine is called and well-known as "Chatbot" or "Chatterbot", or "an artificial non-brain" (See non-patent literature 1). An example of the conversation support means is a chatterbot.

The distribution origin or source of service information can be an in-vehicle service information storage section which was prepared in the vehicle side information providing apparatus and which memorizes service information. The information collection means can be a means for searching and collecting service information based on user interesting information in the in-vehicle service information storage section. By preparing the in-vehicle service information storage section, if the service information which matches the retrieved user interesting information exists in the in-vehicle service information storage section, it is possible to read out and output the matched information promptly. On the other hand, the source of service information can be an information service server on the external network through which both the cellular phone and the vehicle side information providing apparatus can be accessed. In this case, an information collection means is arranged as a means for searching and collecting service information based on the user interesting information from the information service servers via the external network. In this case, it is possible to search and collect service information without the in-vehicle service information storage section in the vehicle side information providing apparatus. The accessible information service server on the external network may be worked with the in-vehicle service information storage section for a purpose to supplement service information which is not stored in the in-vehicle service information storage section.

The apparatus for providing information for a vehicle may include an interest determining keyword retrieving means for retrieving or extracting the interest determining keyword which is able to use for determining the user interest from the conversation contents. The base data storage means can be constituted as an interest determining keyword storage means for storing the retrieved interest determining keyword. By retrieving the keyword to be used for a user interest determination, it is possible to exactly determine an object of the user interest in the form of a keyword. A conversation input means can be provided by a microphone for audio inputs, for example.

In this case, the service information collecting means may be a means for searching service information to be collected by using the interest determining keyword retrieved by the interest determining keyword retrieving means. A user interest information retrieving means may be constituted as a means for analyzing the frequency of occurrence of the interest determining keyword accumulated in the interest determining-keyword storage means, and for setting higher priority for employing the interest determining keyword having high occurrence frequency when searching the service information in the service information collecting means. By using an interest determining keyword having a high occurrence frequency in the conversation, the present user interest can be determined more exactly.

The user interest information retrieving means may include an interest determining keyword dictionary storage section which storages the interest determining keyword dictionary which covers a group of the interest determining keywords selected and prepared beforehand for a purpose of determining the interest. The interest determining keyword retrieving means may be constructed as a means for selectively retrieving the interest determining keyword listed on the interest determining keyword dictionary by comparing the interest determining keyword dictionary and a decomposition result which is provided by a process for decompositioning a sentence into words (may be called as a morphological analysis) performed on the contents inputted by the speech recognition. In the conversation by a user, the interest determining keyword group useful as a key for presuming a user interest is restricted comparatively. Then, an interest determining keyword dictionary is installed therein. By determining selectively the interest determining keyword covered by the interest determining keyword dictionary, a user interest can be specified more exactly. In this case, a user interest information retrieving means can be provided with a keyword update information acquisition means and a keyword dictionary renewal means. A keyword update information acquisition means acquires by receiving periodically the keyword update information which contained the new keyword group related to a season, fashion, or the newest topic through the external network. A keyword dictionary renewal means updates the interest determining keyword dictionary based on the update information acquired by the keyword update information acquisition means. In this way, the contents of the interest determining keyword dictionary can be rearranged in an optimal fashion according to a change of a season, fashion, or the newest topic, and, as a result, a timely interest determine can be performed.

It is desirable that the information collection means uses the first keyword with the highest frequency of occurrence among interest determining keywords to search service information in order to determine an information contents which is the most interested one for the user now. However, a search hit number of service information by the first keyword may exceed a threshold number. In this case, an information collection means can be constituted so that the frequency of occurrence may perform narrowing search of service information using the second high keyword after the search by the first keyword.

The interest determining keyword dictionary may be also called and used as the reference-keyword dictionary used by the response sentence output means. It is possible to import the interest determining keyword positively into the conversation response as the reference keyword created and outputted by the conversation support means, as a result it is possible to lead the user to a conversation which concentrated to determine a user interest. In this case, the reference-keyword extraction means in the response sentence output means may be also called and used as the interest determining keyword retrieving means in the user interest information retrieving means. It is possible to perform simultaneously a conversation response creating and a retrieving of the interest determining keyword contained in a user conversation content in a parallel manner, and it is efficient.

Next, in the conversation support means, the conversation support base data which includes a reference keyword dictionary and a response sentence model may includes a plurality of sub-sets of the conversation support base data each of which has different contents adapted to a predetermined conversation support scenes. In this case, the apparatus may includes a conversation support scene determining means for determining scene by detecting occurrence of one of the predetermined conversation support scenes, and the conversation support base data switching means for switching sub-sets of the conversation support base data in response to a determined conversation support scene. By changing sub-sets of the conversation support base data in accordance with the kind of conversation support scene, more exact conversation leading can be held for each scene, as a result, it becomes possible to determine the user interest object in an adaptive fashion to each scene. In this case, the conversation support means may be provided with a conversation cue phrase storage section and a conversation cue phrase output means. The conversation cue phrase storage section stores a plurality of the conversation cue phrases prepared for every conversation support scene. The conversation cue phrase output means reads the conversation cue phrase corresponding to and linked to the determined scene from a storage section in response to an event when an occurrence of the predetermined conversation support scene is detected, and outputs it. As a result, equipment outputs a conversation cue phrase automatically, in response to the occurrence of a conversation support scene. It becomes possible to determine the user interest object in the scene promptly, and, as a result, timely information service can be performed.

For example, the conversation support scene determining means may be constructed so that a start-up scene of a vehicle may be determined as one of the conversation support scenes. The conversation support base data switching means may be constructed to switch to the sub-set of the conversation support base data which were suitable in order to pull out the interest object information about a final destination place from a user in response to an event when the start-up scene was determined. In this case, in the time of automobile start up, i.e., the time of a start of a projected trip, a possibility of getting the information related to a user's final destination place is improved by the conversation support. As a result, the information presumed to attract the user interest and attention due to somewhat related to the final destination place or the outskirts of it or an area along the trip is provided promptly. As a result, the user may be able to enjoy the projected trip.

Alternatively, the conversation support scene determining means may be constructed so that a hungry scene of the user may be determined as one of the conversation support scenes. The conversation support base data switching means may be constructed to switch to the sub-set of conversation support base data which were suitable in order to pull out the interest object information about a meal contents from the user in response to an event when the hungry scene was determined. By determining the hungry scene, the interest object information concerning that the user wants to eat what where, for example etc. and meal contents can be acquired exactly, as a result, it is possible to perform information service relating to dining facilities etc. effectively.

Alternatively, the conversation support scene determining means may be constructed so that a tired scene of a user may be determined as one of the conversation support scenes. The conversation support base data switching means may be constructed to switch to the sub-set of the conversation support base data which were suitable in order to pull out the interest object information about a resting activity from the user in response to an event when the tired scene was determined. It is possible to initiate a process for recommending resting activities for the user by determining the tired scene. Consequently, it is possible to provide information relating to a resting method which is considered suit for the user interest, as a result, it is possible to contribute also to safe driving.

Alternatively, in the conversation support means, the conversation support base data which includes a reference keyword dictionary and a response sentence model may includes a plurality of sub-sets of the conversation support base data each of which has different contents adapted to phisical conditions or mental conditions of the user subject to the conversation support provided by the apparatus. In this case, the apparatus may includes a user body characteristics information acquisition means for acquiring the user body characteristics information reflecting the user's physical condition and/or mental condition, a condition determining means for determining user's physical condition and/or mental condition respectively based on the acquired user body characteristics information, and a conversation support base data switching means for switching sub-sets of the conversation support base data in response to a determined user's physical condition and/or mental condition. The user body characteristics information acquisition means may be called as a biological parameter detecting sections. Thereby, it is possible to perform a conversation leading according to the user's physical condition and/or mental condition, as a result, it is possible to provide information adaptive to the user's physical condition and/or mental condition.

In addition, the conversation support base data may includes sub-sets containing different contents for seasons. The conversation support base data switching means may detects the present season, and may switches to the sub-set of the conversation support base data corresponding to the detected season. It is possible to change the flow of conversation leading in accordance with the present season, as a result, it is possible to provide information adaptive to the season.

Usually, a user in a vehicle pay attention in a concentrated manner into a point that relates to a present user interest such as where to go from now, or where to visit during the trip even when the destination has been decided. To meet such a user interest, the information providing apparatus for vehicle may be constructed as an apparatus including a car-navigation system. The information collection means may be constructed so as to search and collect the destination information which suits user interesting information as service information on the car-navigation system, as a result, it is possible to navigate the user to the destination which suits the determined interest exactly.

On the other hand, when the wireless access device to the Internet website is equipped in the information providing apparatus for vehicle of the above-mentioned invention, an information collection means may be constructed so as to retrieve and collect the website information on the Internet as service information which suits user interesting information. Thereby, in response to the determined interest, it is possible to satisfy the user by allowing a timely access to the Internet website that suits the determined interest. In addition to or instead of the above described examples, it is possible to play a video data, an image data or a music data by reading out from a library in an in-vehicle service information storage section, or by downloading from an external network via a wireless connection.

In addition, service information could become useless or obsolete due to repeated outputs and serves of the same service information during repeated use of the vehicle by the same user. In order to avoid the problem, the vehicle side information providing apparatus may include an output-history-information record means for recording the output history information of the service information served by the service information output means. In this case, the information collection means may be constructed so that a relatively new service information that can be identified as one that has less number of output record in the output history information than a predetermined threshold number for a last predetermined period is collected with high priority. Thereby, it is possible to serve fresh service information even for the same user. In addition, in the information collection means, a service information that has less number of output record in the output history information than a predetermined threshold number for a last predetermined period may show less search hit number than a predetermined number in a result of a first search using the determined user interest information in the information collection means. In this case, it is possible to broaden candidates of service information by carrying out a second search that has broadened narrowing-down conditions than the first search.

BRIEF DESCRIPTION OF THE DRAWINGS

Additional objects and advantages of the present invention will be more readily apparent from the following detailed description of preferred embodiments when taken together with the accompanying drawings. In which:

FIG. 3 is a map showing an example of data structure of lighting control data for the lighting equipment, FIG. 5 is a chart showing mixture ratios of each lighting lights of RGB full color lighting with respect to luminescent colors, FIG. 11 is a schematic map showing contents of the music source database, FIG. 14 is a figure showing an example of a deciding table, FIG. 15 is a figure showing an example of a setting table for standard intention vector for a physical condition, FIG. 16 is a figure showing an example of a setting table for standard intention vector for a mental condition, FIG. 19 is a figure showing an example of an intention presumption table, FIG. 20 is a figure showing another portion of an intention presumption table, FIG. 21 is a figure showing an example of a principle search table, FIG. 22 is a figure showing an example of a functional extraction table, FIG. 26 is a figure which illustrates a relation between a hospitality priority and an intention strength correction coefficient, FIG. 34 is a figure showing a second example of a conversation led by a chatterbot, FIG. 35 is a figure showing a third example of a conversation led by a chatterbot, FIG. 36 is a figure showing a fourth example of a conversation led by a chatterbot, FIG. 37 is a figure showing a fifth example of a conversation led by a chatterbot, FIG. 38 is a figure showing a sixth example of a conversation led by a chatterbot, FIG. 39 is a schematic diagram showing an example of keyword statistical data and access statistical data, FIG. 43 is a figure showing an example of display of a destination setting screen corresponding to the first example of output, FIG. 44 is a figure showing an example of display for the contents of a website.

DETAILED DESCRIPTION OF THE PREFERRED EMBODIMENTS

Figure 1:
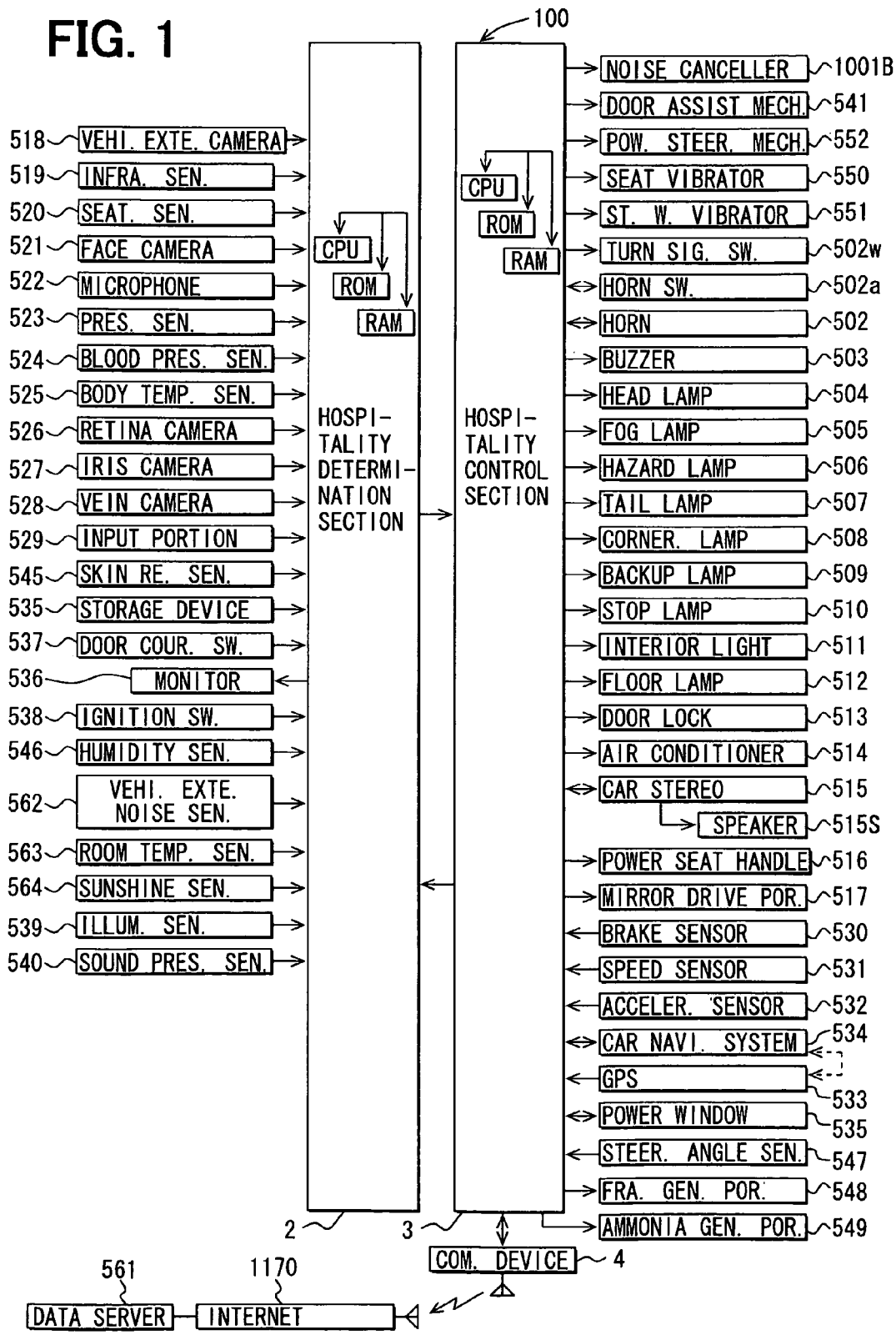
FIG. 1 is a block diagram showing an example of electronic configuration of a user hospitality system for vehicles which includes an apparatus for providing information for vehicles of the present invention.

Hereinafter, an embodiment of the present invention is described in detail while using attached drawings. FIG. 1 is a block diagram showing an example of electronic configuration of a user hospitality system for vehicle which includes an apparatus for providing information for vehicle of the present invention. The vehicle is a car in the embodiment. The system 100 is constructed to include a vehicle side mounted portion 100 as a principal part that comprises a first computer for a hospitality control section 3 and a second computer for a hospitality determination section 2. The first computer is connected with a plurality of various hospitality action sections 502-517, 534, 541, 548, 549, 550, 551, 552, and 1001B. The second computer is connected with a plurality of sensors 518-528 including a camera. The first and second computers, each includes CPU, ROM, and RAM, and perform various functions explained below by executing control software stored in ROMs while using RAMs as a work memory.

In the above-mentioned system 100, consecutive activities and operations relating to use of the vehicle is divided into a predetermined plurality of scenes. The consecutive activities may include scenes such as an approaching to the vehicle, a getting into the vehicle, a driving of the vehicle, a staying in the vehicle, and a leaving from the vehicle. The hospitality action sections 502-517, 534, 541, 548, 549, 550, 551, 552, and 1001B performs hospitality operations for supporting use of the vehicle, or delighting or entertaining the user for each one of the plurality of scenes divided. In the embodiment, the horn 502 and the buzzer 503 are connected with the system as an acoustic-wave generator to the outside of the vehicle. A head lamp 504, a fog-lamp 505, a hazard lamp 506, a tail lamp 507, a cornering lamp 508, a reversing lamp 509, a stop lamp 510, an interior lighting 511, and a floor lamp 512 are connected with the system as lighting devices (lamps). The head lamp 504 may be changeable in a high beam direction and a low beam direction. The system further has the other hospitality action sections. An air-conditioner 514, a car audio system (car stereo) 515, a powered seat and a powered steering handle 516, actuators 517 for adjusting angular positions of side view and rear view mirrors, a car-navigation system 534, an door assistant mechanism 541 for assisting door opening and closing operation, an air purifier 548 are connected as the hospitality action sections. Further, a generating section 549 for restorative and awakening component against serious poor health conditions is connected as the hospitality action section. The section 549 is responsive to a serious poor health condition such as serious sleepy condition, and is mounted on a center region of the steering handle to inject the restorative and awakening component such as a thing containing ammonia toward around a driver's face. Further, a seat vibrator 550 embedded in a seat bottom or a backrest part for notifying cautious conditions to a driver or making a driver awake from sleepiness, a steering handle vibrator 551 attached to an axis of a steering handle, and a noise canceller 1001B for noise reductions in the vehicle are connected.

Figure 2A:
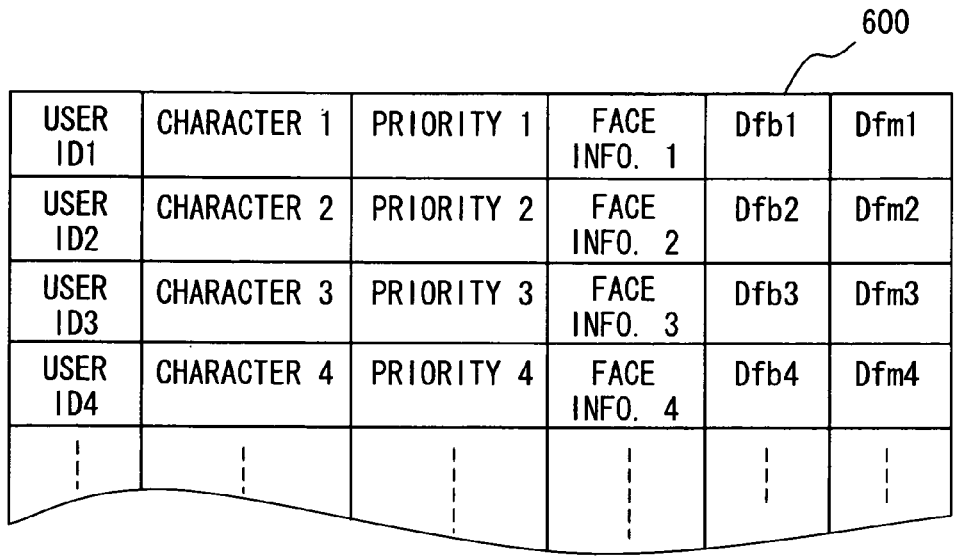
FIG. 2A is explanatory drawing showing an example of a user registration part.
Figure 2B:
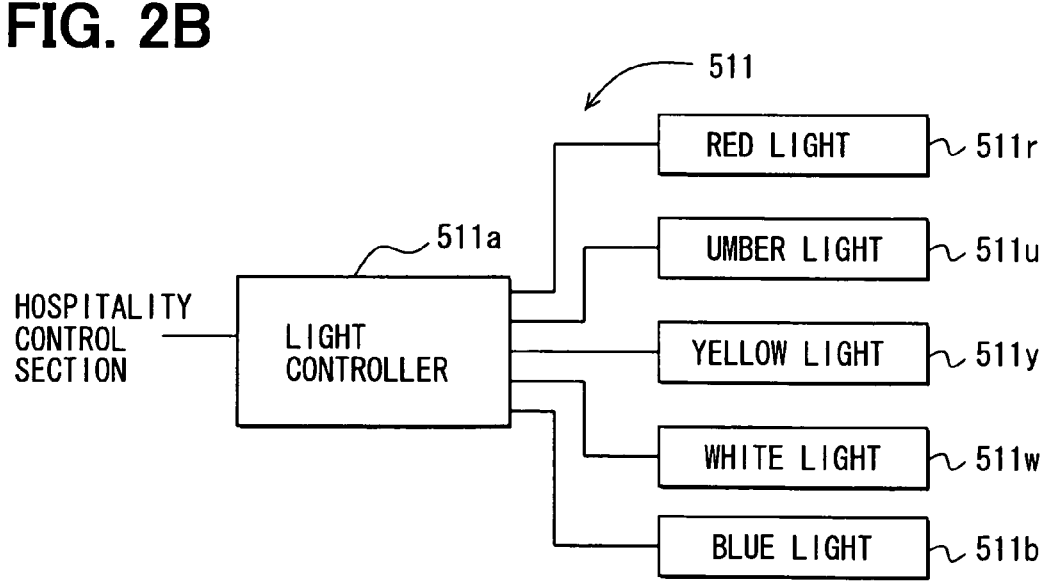
FIG. 2B is a block diagram which shows an example of an electronic configuration of lighting equipments in the vehicle.

FIG. 2B shows an example of the interior lighting 511 in the car. The interior lighting 511 has a plurality of lighting parts each having own lighting color. In the embodiment, the interior lighting 511 includes a red lighting 511r, an amber lighting 511u, a yellow lighting 511y, a white lighting 511w, and a blue lighting 511b. The lightings receives a control command signal from the hospitality determination section 2 via the hospitality control section 3, and are selected and activated to be controlled to provide various lighting patterns in accordance with the control command signal. FIG. 3 shows an example of arrangement of the lighting control data 402 defined according to a user's character classification. The lighting control data 402 is stored in ROM in the hospitality determination section 2, and is used by a control software after read. For example, the red lighting 511r is selected and activated in an intermittently flashing manner for an active character (SKC1 in FIG. 11). The red lighting 511r may be activated in the intermittently flashing manner only in the beginning, then the red lighting 511r may be activated in a continuous manner. For example, the amber lighting 511u is selected and activated in a fade-in lighting manner for a gentle character (SKC2). Those examples are described only for explanatory examples.

Figure 4:
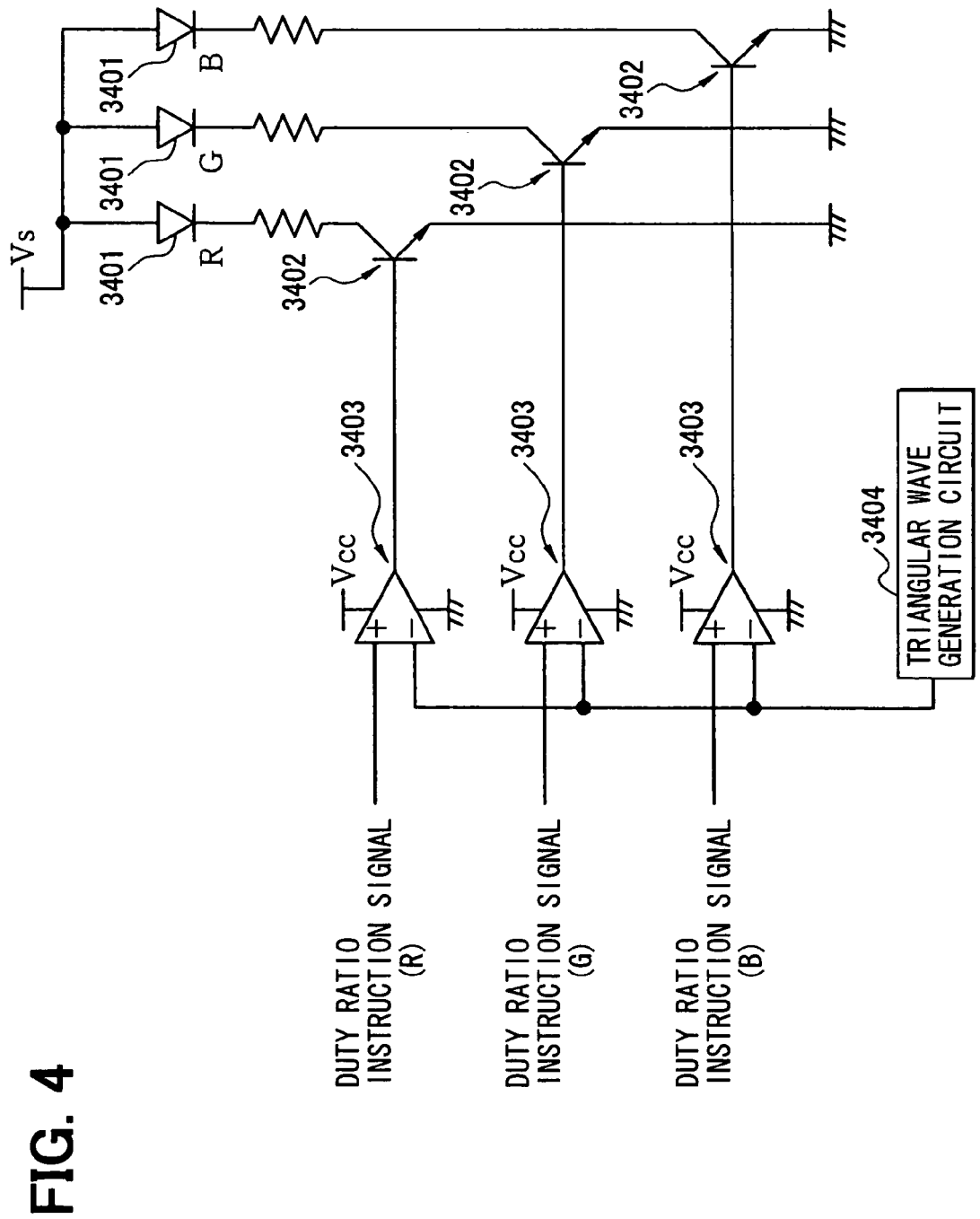
FIG. 4 is a circuit diagram showing an example of lighting equipment which uses light emitting diodes.

In addition, the lighting devices may be provided by an incandescent lamp and a fluorescent lamp, further by a lighting device using a light emitting diode. Especially, it is possible to obtain various lighting lights by combining the trichromatic light emitting diode of a red (R), a green (G), and a blue (B). FIG. 4 shows an example of a circuit configuration. Each of light emitting diodes 3401 including a red (R), a green (G), and a blue (B) is connected to a power source (Vs) and a transistor 3402, and is activated in a switching control manner. The switching control is performed as the PWM control that uses a signal having a duty ratio defined by a variable period of the triangular wave (or a saw-tooth-wave) inputted into a comparator 3403, and by a variable voltage level of a command signal. An input waveform of the command signal applied to each color of the light emitting diodes 3401 is independently variable. Therefore, it is possible to obtain desired color of lighting light in accordance to a mixture ratio of three lighting colors. In addition, it is also possible to change the lighting color or a lighting intensity pattern as time goes on by varying the input waveform of the command signal. Alternatively, instead of the above-mentioned PWM control system, the lighting intensity of the light emitting diode 3401 of each color may be variable by several methods and systems such as a current control system which controls driving current level while lighting continuously, and a combined system which uses both the current control and the PWM control in a combined manner.

FIG. 5 shows a relationship between the relation between the visible color of the mixed light and the mixture ratio adjusted by the duty ratio of each light of a red (R), a green (G), and a blue (B). The mixture ratio shown here is expressed with a relative mixture ratio of the other colors with respect to the color having ratio "1". An absolute lighting intensity is separately set on the basis of this relative mixture ratio. Each factor is obtained with index (0-14) for choosing a lighting color at the time of control, and stored as control reference information in ROM of the hospitality control section 3. Each factor may be stored in the storage device 535 in the hospitality determination section 2, and be transmitted to the hospitality control section 3 as it is required as necessary information for the control. Since White light is frequently-used, therefore, in order to change white light to the other color smoothly, a plurality of the indexes specifying white are set on the index chart to appear periodically.

For example, on the index chart, warm colors (pale yellow to yellow to red) and cold colors (pale blue to blue to purplish-blue) are arranged on different side of a boundary defining a white light (e.g., Index 6) placed among two color groups. This arrangement is advantageous for changing lighting color smoothly from the white light to the warm color or from the white color to the cold color. Here, the lighting color is set at the white color when it is usual time and is not required to consider any lighting effect. The lighting color, the index, is associated with and linked to a value of the mental condition index that may indicate a high condition as the value of the mental condition index takes large number. The chart is set to change the light color in accordance with the mental condition of the user so that the white color is chosen in a moderate mental condition (e.g., the mental-condition index 5), and so that the bluish color, i.e., short wavelength, is chosen as the mental condition index becomes larger (i.e., getting higher mental condition), and so that the reddish color, i.e., long wavelength, is chosen as the mental condition index becomes smaller (i.e., getting blocked lower mental condition).

Figure 6:
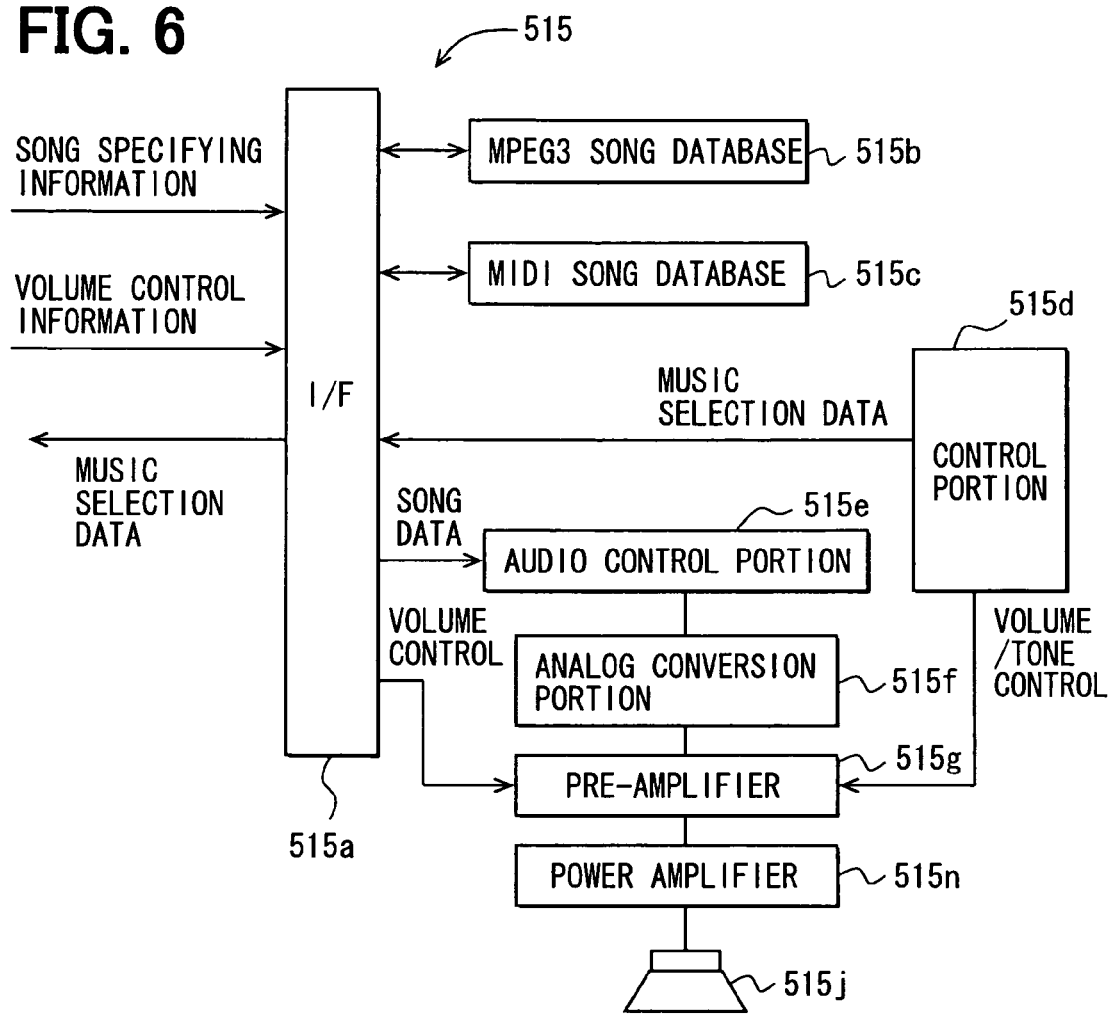
FIG. 6 is a block diagram showing an example of the electronic configuration of an audio system on the vehicle.

Next, FIG. 6 shows the example of composition of the car audio system 515 that has an interface part 515*a* into which music performance control information for a hospitality control, such as music specific information and volume control information, is inputted through the hospitality control section 3 from the hospitality determination section 2. The digital audio control unit 515*e* and the music source databases 515*b* and 515*c* (the former is an MP3 data base and the latter is a MIDI data base) each of which stores a plurality of music source data are connected to the interface part 515*a*. In this specification and drawings, "music" may be transcribed into "song". The music source data selected based on the music specific information are sent to an audio control part through the interface part 515*a*. Then, the music source data transmitted is decoded into a digital music waveform data. The digital music waveform data is converted into an analogue signal in the analogue conversion part 515*f*. The analogue signal is supplied through the preamplifier 515*g* and the power amplifier 515*h* and outputted from the speaker 515*j* with volume specified by the music performance control information.

Returning to FIG. 1, the door assist mechanism 541 is electric powered and for carrying out automatic opening and closing or opening-and-closing power assist of a slide type door or swing type door by a motor (actuator) which is not illustrated.

Figure 7:
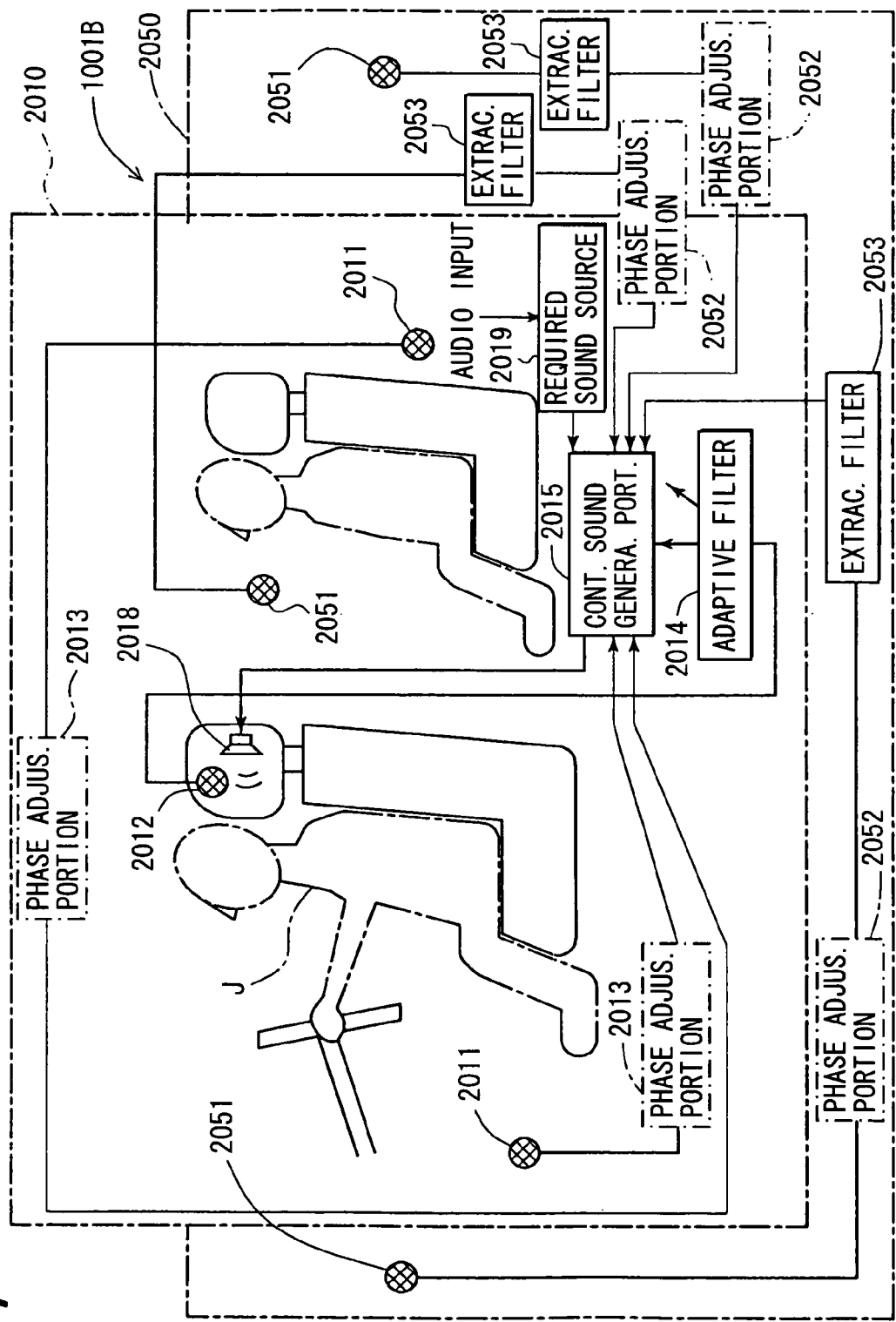
FIG. 7 is a schematic block diagram showing an example of configuration of a noise canceller.

FIG. 7 is a functional block diagram showing an example of configuration of a noise canceller 1001B. The principal part of the noise canceller 1001B contains a main part of an active-noise-control system 2010 which forms a noise control means, and a required sound emphasis part (means) 2050. The active-noise-control system 2010 has an in-car noise detection microphone (noise detection microphone) 2011 which detects the noise in the car, and the waveform synthesis part 2015 for noise control (control sound generating part) which compounds a noise control waveform that is anti-phase of the noise waveform detected by the in-car noise detection microphone 2011. The noise control waveform is outputted from the speaker 2018 for noise control. The active-noise-control system 2010 further has an error detection microphone 2012 for detecting remaining noise component contained in a sound in the car after the noise control waveform is once overlapped, and an adaptive filter 2014 having a filter factor that is adjusted to reduce the remaining noise component.

The active-noise-control system 2010 includes a plurality of in-car noise detection microphones 2011 which are disposed on the car in a distributed manner in order to detect respective noises in the car in a suitable fashion, since the noise in the car generated by sources in the car itself includes several noises such as an engine noise, an road noise, and a wind noise. The in-car noise detection microphones 2011 are disposed different locations respectively from a passenger J in the car. Therefore, there is a certain amount of phase difference between the noise waveform picked a microphone 2011 up and the noise waveform the passenger J actually hears. In order to cancel the phase difference, the detected waveform of the in-car noise detection microphone 2011 is supplied to the control sound generating part 2015 through a phase adjustment part 2013 if it is required.

Next, the required sound emphasis part 2050 is configured to include an emphasis sound detection microphone 2051 and a required sound extracting filter 2053 through which an extracted waveform of the required sound is supplied to the control sound generating part 2015. Here, if it is required, a phase adjustment part 2052 is disposed between the microphone 2051 and the filter 2053 due to the same reason as the in-car noise detection microphone 2011. The emphasis sound detection microphone 2051 includes an outside microphone 2051 for detecting a required sound outside a car, and an inside microphone 2051 for detecting a required sound in the car. Either one of above-mentioned microphones may be provided by a well-known directional microphone. The outside microphone is disposed to orient a sound sensible angular range toward outside the car and to orient a sound less sensible angular range toward inside the car. In the embodiment, the whole microphone 2051 is disposed to expose outside the car. Alternatively, the microphone 2051 may be disposed to expose both inside and outside the car so as to expose the sound sensible angular range toward the outside and to locate the sound less sensible angular range in the inside. On the other hand, in order to detect each passenger's conversation selectively corresponding to each seat, each of the inside microphones 2051 is disposed to orient the sound sensible angular range toward a target passenger and to orient the sound less sensible range toward an opposite side to the target passenger. Each of the emphasis sound detection microphones 2051 is connected to respective one of the required sound extracting filters 2053 which passes a required sound component in the input waveform (detected waveform). The audio input of the car audio system 515 in FIG. 6 is used as the in-car required sound source 2019. A sound generated by the speaker of the audio system is controlled so as to not cancel even if the noise control waveform is superimposed on. The speaker of the audio system may be provided by the speaker 218 for noise control, or may be provided separately from the speaker 218 for noise control.

Figure 8:
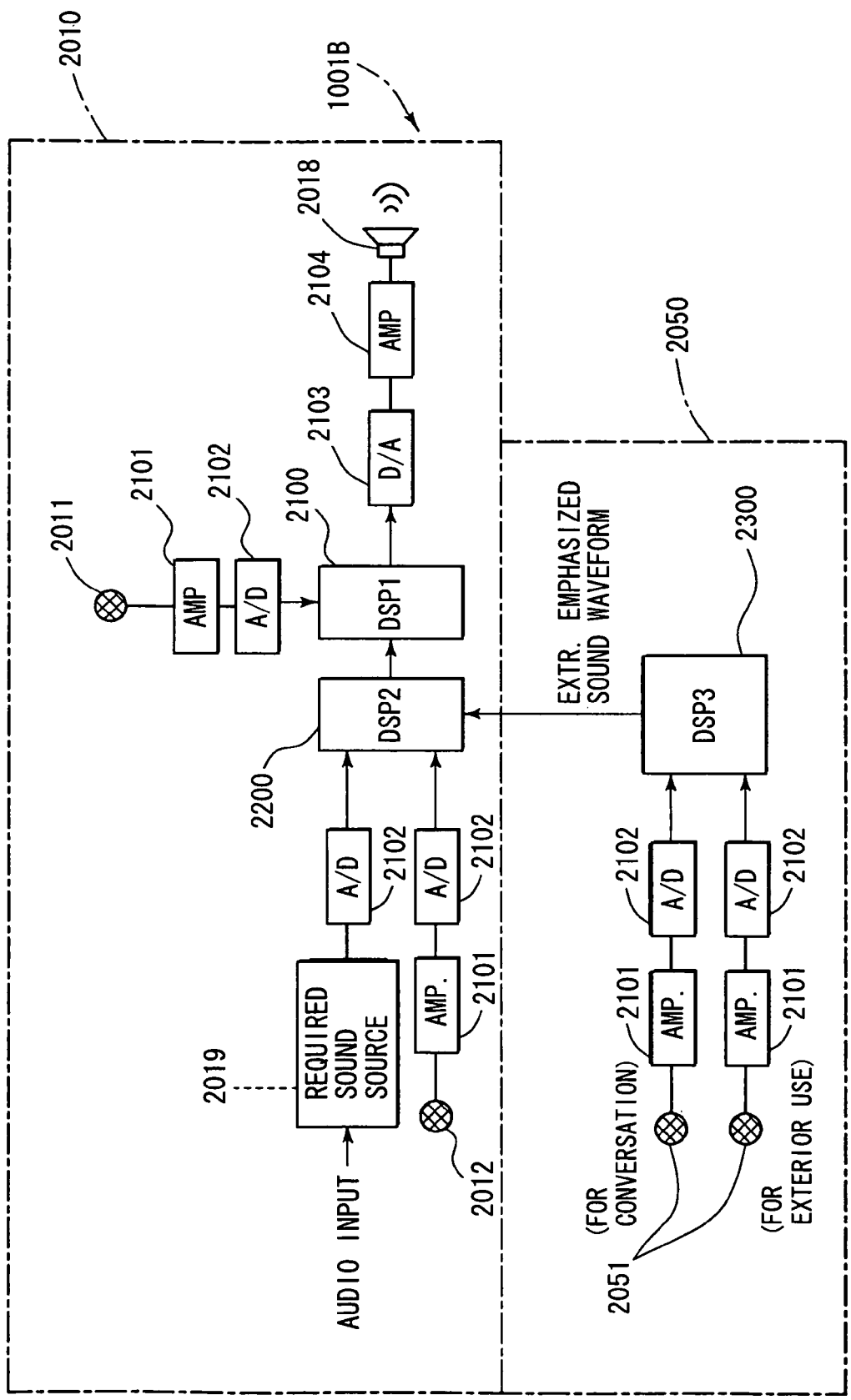
FIG. 8 is a block diagram showing an example of hardware configuration similarly.

FIG. 8 shows an example of a hardware block diagram corresponding to the functional block diagram in FIG. 7. A first DSP (Digital Signal Processor) 2100 provides the noise control waveform compositing part (control sound generating part) 2015, the adaptive filter 2014, and the phase adjustment part 2013. The first DSP 2100 is connected with the in-car noise detection microphone 2011 through a microphone amplifier 2101 and an A/D converter 2102, and a speaker 2018 for noise control through a D/A converter 2103 and an amplifier 2104 respectively. A second DSP 2200 provides an extracting part for extracting the noise component which should be controlled. The second DSP 220 is connected with the error detection microphone 2012 through a microphone amplifier 2101 and an A/D converter 2102, and the sound signal source 2019 which is not subject to reduction, i.e., the required sound source, through an A/D converter 2102.

The required sound emphasis part 2050 has a third DSP 2300 which functions as the required sound extracting filter 2053, and is connected with the required sound detection microphone (emphasis sound detection microphone) 2051 through a microphone amplifier 2101 and an A/D converter 2102. The third DSP 2300 functions as a digital adaptive filter. Hereinafter, a setting process for filter factors is explained.

When designing the apparatus, some outside sounds of the car that should be considered cautions or dangerous are selected as required outside sounds (emphasis sound). For example, the required outside sounds may include the siren sound of emergency vehicles (an ambulance, a motor fire engine, a police car, etc.), the crossing alarm sound for a rail road crossing, the klaxon-horn sound of a following car, a whistle sound, and the cries (a child's cry, a female cry, etc.) of human. Sample sounds of the selected required outside sounds are recorded on a recording medium such as a disk. etc. for a readable and re-playable library of reference emphasis sound data. Moreover, for conversation sound, two or more persons' individual model voices are similarly recorded as a library of reference emphasis sound data. If boarding candidates for the car are almost fixed to a specific person, it is possible to improve emphasis accuracy of the conversation when the specific person is on board by preparing and recording model voice of the specific person as the reference emphasis sound data.

In an initial setting, the apparatus sets appropriate initial values for filter factors, and initial values for an emphasis sound detection level for the emphasis sound detection microphones 2051. Then, each of the reference emphasis sounds is read out and set, and the emphasis sound detection microphone 2051 detects sound. The apparatus monitors the waveform passed through the adaptive filter and measures level of the waveform that passed as the reference emphasis sound. The above-mentioned processing is repeated until these detected levels reach a set point. Thus, the filter factors are learned and renewed in a learning processing manner so that the detected level of the waveform passed through the filter is optimized by switching the reference emphasis sound for both inside and outside sound (including conversation sound) of the car. The filter factors are automatically regulated by the above-mentioned manner. The apparatus extracts the required sound from the input waveform of the emphasis sound detection microphone 2051 by using the required sound extracting filter 2053 of which the filter factor was adjusted as mentioned above, and transmits the extracted emphasis sound waveform to the second DSP 2200. The second DSP 2200 carries out difference calculation for the input waveform from the required sound source (here audio output) 2019 and the extracted emphasis sound waveform from the third DSP 2300 from the detected waveform of the in-car noise detection microphone 2011.

The filter factor of the digital adaptive filter built into the first DSP 2100 is initialized before use of the system. First, various noises are selected for noise reduction control. Sample sounds of those selected noises are recorded on a recording medium such as a disk etc. for a readable and re-playable library of reference noises. In an initial setting, the apparatus sets appropriate initial values for filter factors, and initial values for a remaining noise level for the error detection microphones 2012. Then, each of the reference noises is read out and set, and the in-car noise detection microphone 2011 detects sound. The apparatus decomposes the waveform of detected noise into the sinusoidal component waveforms having different wave length each other by carrying out fast Fourier transform of the detected waveform of the in-car noise detection micro phone 2011 that passed the adaptive filter. Then the apparatus achieves a noise control waveform having antiphaze with the noise detection waveform by generating inversed component waveforms inversed to the sinusoidal component waveforms respectively, and compounding the sinusoidal component waveforms again. The noise control waveform is outputted from the speaker 2018 for noise control.

Since only the noise component should be efficiently extracted from the waveform of the in-car noise detection microphone 2011 if the factors of the adaptive filter are appropriately provided, it is possible to cancel the noise in the car with neither more nor less by the noise control waveform that was composed in anti-phase based on the extracted noise component. However, if the filter factors are not appropriately set, component of the waveform that was not cancelled appears and recognized as a remaining noise component. The remaining noise component is detected by the error detection microphone 2012. The apparatus compares level of the remaining noise component and a target value. Then, the apparatus renews the filter factors if the level is not below the target value. The apparatus repeats the above-mentioned processing until the level is suppressed below the target value respectively. Thus, the filter factors are learned and renewed in a learning processing manner so that the remaining noise component is minimized by switching the reference noise. The filter factors are automatically regulated by the above-mentioned manner. During actual use of the apparatus, the apparatus continuously monitors the remaining noise component and renews the filter factor in a real-time fashion so as to minimize the remaining noise component. It is possible, by performing the above mentioned processing, to reduce only a noise level in the car effectively while maintaining the required sound component.

The following sensor cameras are connected to the hospitality determination section 2. At least a part of those cameras function as both a scene estimation information acquisition means and a user body characteristics information acquisition means.

For example, a vehicle external camera 518 monitors the figure of the user approaching to the car. The camera 518 acquires a user's behavior, the expression of the face, etc. in a form of a still image or a movie image. In order to take an enlarged image of the user, the camera 518 may be equipped with an optical zoom system using a telescopic lens, and/or a digital zoom system which enlarge a taken image in a digital processing.

An infrared sensor 519 provides a thermo-graphic image by monitoring an infrared radiation from the face part of the user approaching to the car or the user in the car. The sensor 519 functions as a temperature-monitoring section for a user body characteristics information acquisition means. The apparatus can estimate a user's physical condition and/or mental condition by measuring a temporal temperature changing waveform.

A seating sensor 520 detects whether the user sat down on the seat. The sensor 520 may be provided by a proximity switch etc. which are laid under the seat of the car. Alternatively, the seating sensor 520 may be provided by a camera that takes image of the user on the seat. In this case, an optional control for performing the hospitality control only when a human is on a seat can be added, since the above-mentioned camera enables the apparatus to distinguish a case where a human is on the seat and a case where a loading thing other than a human is on the seat. Moreover, it is possible to increase detected information, since the camera enables the apparatus to detect movement of the user on the seat. Alternatively, a pressure-sensitive sensor attached on the seat may be used for detecting movement of the user on the seat.

Further, in the embodiment, the apparatus detects the posture change of the user (driver) on the seat in a waveform detecting fashion based on detected outputs from the seating sensors 520A, 520B, and 520C embedded in the seat in a distributed fashion in the seating part and in the backrest part of the seat. The seating sensors 520A, 520B, and 520C all are provided by pressure sensors respectively. More specifically, the seating sensor 520A is arranged as a reference sensor at the center of the back of the user sitting to face front. The sensors embedded in the seating part includes the left side sensor 520B arranged in an offset manner to the left from the center and the right side sensor 520C arranged in an offset manner to the right from the center. A differential amplifier 603 calculates difference between an output from the reference sensor 520A and the right side sensor 520C. A differential amplifier 604 calculates difference between an output from the reference sensor 520A and the left side sensor 520B. Then, those outputs from the differential amplifiers 603 and 604 are supplied to a differential amplifier 605 for outputting a attitude-signal. The attitude-signal output Vout (also referred to as a second biological parameter) takes substantially a reference value (e.g., zero volt) when the user is sitting toward front. The attitude-signal output Vout shifts to the negative side when the user shifts attitude to the right, since an output from the right side sensor 520C increases and an output from the left side sensor 520B decreases. If the user shifts attitude to the left, the sensors and the circuit functions opposite and the attitude-signal output Vout shifts to the positive side. In the illustrated circuit, both output from the right side sensors 520C in the seating part and the backrest part are added by an adder 601. Also, both output from the left side sensors 520B in the seating part and the backrest part are added by an adder 602. Alternatively, the circuit may be configured to supply a differential value between the outputs from the sensors in the seating part and the backrest part. In this case, it is possible to detect a shift of the user attitude as a greater collapse of the user posture, since the output from the sensor in the backrest part is decreased and the differential value increases when the user leans forward.

Figure 10:
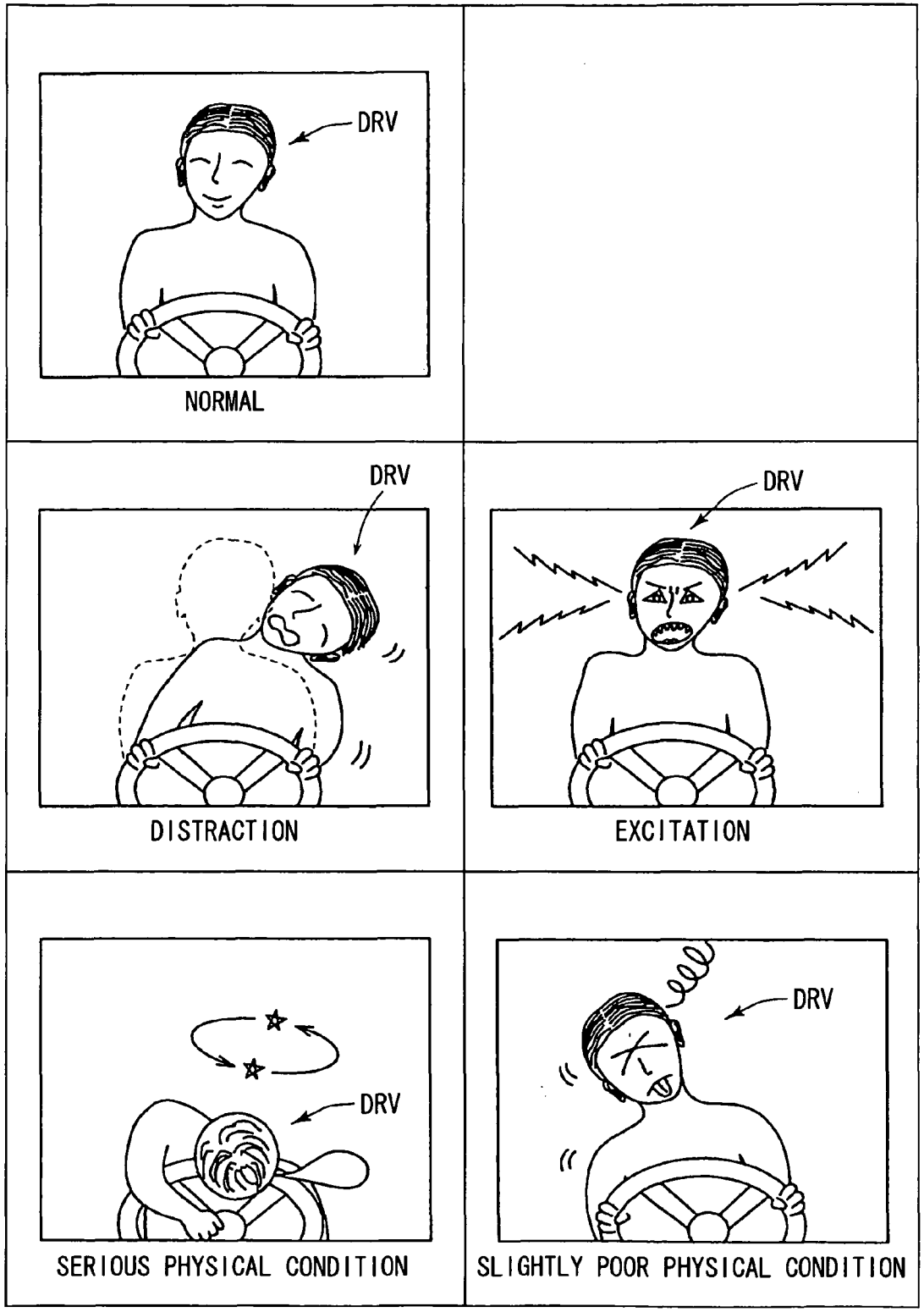
FIG. 10 is a descriptive drawing showing various states to be specified (determined conditions)

A face camera 521 takes image of the expression of the face of the user on the seat. For example, the camera 521 is attached to a rear view mirror etc. and takes an image of an upper half body containing the face of the user (driver) on the seat viewing obliquely from wind shield side upper portion. The apparatus identifies and determines various expressions shown in FIG. 10 by comparing an image of the face trimmed from the image taken by the camera and master images of several expressions of the user prepared beforehand. For example, expressions may be sorted in an order from good condition for both a mental condition and a physical condition, and may be obtained scores associated with the order. For example, in a mental condition, the expression showing a stable neutral condition takes "1", the expression showing an inattentive and uneasiness takes "2", and the expression showing an excitement and anger takes "3". As a result, it is possible to handle the expressions of the user by a discrete numerical parameter (second biological parameter), and handle a temporal change of the expressions by monitoring and measuring a waveform of the discrete numerical parameter. In addition, it is possible to estimate a physical and mental conditions based on the waveform. Alternatively, change of the driver's posture is also detectable from the imaged shape of the upper half body containing the face and the gravitational center location of the image. That is, a changing waveform of a gravitational center location may be used as a changing waveform of a posture (i.e., as a second biological parameter). It is possible to estimate a physical and/or mental conditions based on the waveform. Although the means and signals explained above are used for providing functions as a user body condition information acquisition source (i.e., user body characteristics information acquisition means), the means and signals explained above may be used as a biometrics personal identification of the user. Moreover, it is possible to determine a direction of the face or a direction of sight line by detecting a direction of the iris of eyes. For example, it is possible to estimate a mental condition of the user based on the detected direction. If the user frequently sees a direction to a clock, it is possible to estimate that "the user may be feeling hurry." Moreover, the detected direction may be used to estimate the driver's mental and/or physical condition based on the temporal changing waveform of the sight line (second biological parameter). For example, the waveform is detected as a shifting waveform of a shifting angle to the left and right with respect to a reference direction that is toward the front side.

A microphone 522 detects a user's voice. The microphone 522 may be also used as the user body characteristics information acquisition means.

A pressure-sensitive sensor 523 is disposed on a grasp location of the user such as a steering handle of the car and a shifting lever. The pressure-sensitive sensor 523 provides a user body characteristics information acquisition means.

A blood-pressure sensor 524 is disposed on a grasp location of the steering handle. The blood-pressure sensor 524 provides a user body characteristics information acquisition means. The blood-pressure value detected by the blood-pressure sensor 524 is recorded in a form of waveform of temporal change (first biological parameter). The apparatus uses the waveform for estimating the driver's physical condition and/or mental condition.

A body temperature sensor 525 is provided by a temperature sensor disposed on a grasp location of the steering handle. The body temperature sensor 525 provides a user body characteristics information acquisition means. The body temperature value detected by the body temperature sensor 525 is recorded in a form of waveform of temporal change (first biological parameter). The apparatus uses the waveform for estimating the driver's physical condition and/or mental condition.

A skin resistance sensor 545 is disposed to the user grasp location of the steering wheel, and is provided by a well known sensor for measuring a resistance on a body surface reflecting an amount of perspiration etc. The skin resistance value detected by the skin resistance sensor 545 is recorded in a form of waveform of temporal change (first biological parameter). The apparatus uses the waveform for estimating the driver's physical condition and/or mental condition.

A retinal camera 526 gets an image of a user's retina patterns that is used for a biometrics personal identification purpose.

An iris camera 527 is attached to a rear view mirror etc. and takes an image of a user's iris that is used for a biometrics personal identification purpose. When using the image of an iris, the apparatus performs collation and identification using the individual nature of the pattern and color. Especially an iris pattern is an acquired forming element, since the degree of genetic effect is also low, it has the difference also with remarkable identical twins, and there is a certainly distinguishable advantage. The identification method using an iris pattern can perform recognition and collation promptly, and can perform with low error rate. Moreover, it is possible to estimate the driver's physical condition and/or mental condition based on a temporal change of the driver's pupil size (second biological parameter) imaged by the iris camera.

A vein camera 528 takes an image of a user's vein pattern that is used for a biometric personal identification.

A door courtesy switch 537 detects opening and closing of a door. The door courtesy switch 537 is used as a scene estimation information acquisition means for detecting scene shifting to a getting in scene and a getting out scene.

A branched signal from the output of the ignition switch 538 for detecting engine start is inputted into the hospitality determination section 2. A moisture sensor 546, a room-temperature sensor 563, a sunshine sensor 564 (for control of the air-conditioner 514), an external noise sensor 562 (for control of the noise canceller 1001B) disposed on outside, an illumination sensor 539 which detects a brightness level inside the car, and a sound pressure sensor 540 which measures a sound level in the car are also connected to the hospitality determination section 2.

An input unit 529 provided with a touch panel etc. and a storage device 535 provided with hard disk drives etc. which function as a hospitality performance information storage part are also connected to the hospitality determination section 2. The touch panel may be provided by a touch panel disposed on a monitor display for the car navigation system 534. In this case, the input data is transmitted from the hospitality control section 3 to the hospitality determination section 2.

On the other hand, a GPS device 533 for acquiring vehicle position information (it is used also in the car-navigation system 534), a brake sensor 530, a speed sensor 531, and an acceleration sensor 532 are also connected to the hospitality control section 3.

The hospitality determination section 2 inputs detected information from a plurality of sensing devices including the sensors and cameras 518-528. Then, the hospitality determination section 2 processes the detected information for acquiring a user living body state information including at least one of a user's character, a mental condition, and a physical condition. The hospitality determination section 2 further determines hospitality operation that is considered to be carried out in accordance with the acquired user living body state information. In the determining process for the hospitality operation, at least one of the hospitality action sections 502-517, 534, 541, 548, 549, 550, 551, 552, and 1001B is selected as a device to provide a specific hospitality operation, and a content or an amount of specific hospitality operation is determined. The hospitality determination section 2 command the determined specific hospitality operation to the hospitality control section 3. Then, the hospitality control section 3 controls the corresponding hospitality action sections 502-517, 534, 541, 548, 549, 550, 551, 552, and 1001B to perform hospitality operation in response to the command from the hospitality determination section 2. Namely, the hospitality determination section 2 and the hospitality control section 3 collaborate mutually to perform as a device for provide function to change the contents and amount of the activity of the hospitality action sections 502-517, 534, 541, 548, 549, 550, 551, 552, and 1001B according to the acquired user living body state information. A wireless communication device 4 providing a vehicle side communication means (host side communication means) is connected to the hospitality control section 3. The wireless communication device 4 communicates with a user-side-terminal device (portable device) 1 carried by the user through a wireless communication network.

The car audio system 515 includes a manual operation panel 515d (See FIG. 6) as an interface device for a user. The system 515 plays a music by reading out source data of the music in response to a music selection data inputted via the panel 515d. A volume/tone control signal from the panel 515d are inputted into the preamplifier 515g. The music selection data is transmitted from an interface section 515a to the hospitality determination section 2 through the hospitality control section 3 in FIG. 1, and is stored as music selection record data in the storage device 535. A user character determining processing is performed based on the storage contents of the music selection record data. That is, the panel 515d of the car audio system 515 provides at least a part of a user body characteristics information acquisition means for acquiring information relating to at least one of user's physical and mental condition, character, and preference.

FIG. 11 is an example of database structure for the music source data. The data base 401 stores music source data (MP3 or MIDI) which are categorized by and linked to a music ID (song ID), a music name (song name), and a genre code. In addition, the music source data are also categorized by and linked to a character code showing an estimated character of the user estimated based on the selection of music by the user, an age code, and a sex code. The character code may vary "active", "gentle", "optimistic", "pessimistic", "decadent", "physical", "intelligent", "romanticist", etc. The age code may vary "infant", "child", "junior", "youth", "middle", "senior", "mature", "old", "age irrelevance", etc. The sex code may vary "male", "female", and "sex irrelevance". The character code is one of the user character determining information. The age code and the sex code are sub classifications unrelated to character. Even if it could determine the user's character, if the music source which suits neither an age group nor sex was chosen, a hospitality effect for delighting a user is considered to be deteriorated almost in half. Therefore, the above mentioned sub classification is advantageous for narrowing down more the suitability of the music source to be served to a user.

On the other hand, a music mode code is stored for each music source data in a categorizing and linking manner. The music mode code is data showing an expected effect linkage between the music and a mental and/or physical condition of the user who selected the music. The music mode code may vary "uplifting, activating", "refreshing", "mild and smooth", "healing, alpha-wave inducing", etc. Since the character code, the age code, the sex code, the genre code, and the music mode code are data prepared to reference for determining contents of hospitality to each user, those data are called and treated as reference data.

Further, a physical condition index PL and a mental condition index SL are prepared and stored for each music source data respectively in a linked manner. The indexes are given beforehand in order to determine a music source data which suit the physical condition and/or mental condition indicated by the index. A method for using the index is described later.

Next, in the embodiment, an approaching scene, a getting in or boarding scene, a drive preparation scene, a driving scene, a staying scene, a getting out or alighting scene, a leaving scene, etc. are prepared for identifying using scene of the car. A method and means for determining scene are described in a simplified manner, since the patent documents listed discloses such method and means. For example, the apparatus may be able to determine a present scene by detecting a user is approached into a predetermined area around the car by locating positions of the car and the user, and monitoring a relative distance between them and change of the distance. For locating positions of the car and the user, the GPS device 533 and a user's portable GPS device can be used. The getting scene and the leaving scene may be determined by monitoring a signal indicative of door opening supplied from the door courtesy switch 537. Individual scene flags corresponding to and indicative of each scene is prepared in the apparatus. The apparatus manages set (Flag=1) and reset of the flags in response to scene determinations. For example, a specific flag is set in response to a signal indicative of a specific scene occurrence which usually occurs in a predetermined order of time series. At least whether the seating sensor is detecting a user or not is used for determining the preparation scenes, the driving scene, and the staying scene. A scene for a time period from the user getting in to a turning on of the ignition switch 538, and a time period from getting in to confirmation of certain period of continuous seating while the ignition switch 538 is not turned on are determined as the preparation scene. A transition to the leaving scene can be determined by detecting a closing signal of the door courtesy switch 537 after the getting out scene.

Each of the hospitality action is controlled by corresponding action control application for the hospitality action section. Such action control applications are stored in ROM or the storage device 535 in the hospitality control section 3.

Figure 12B:
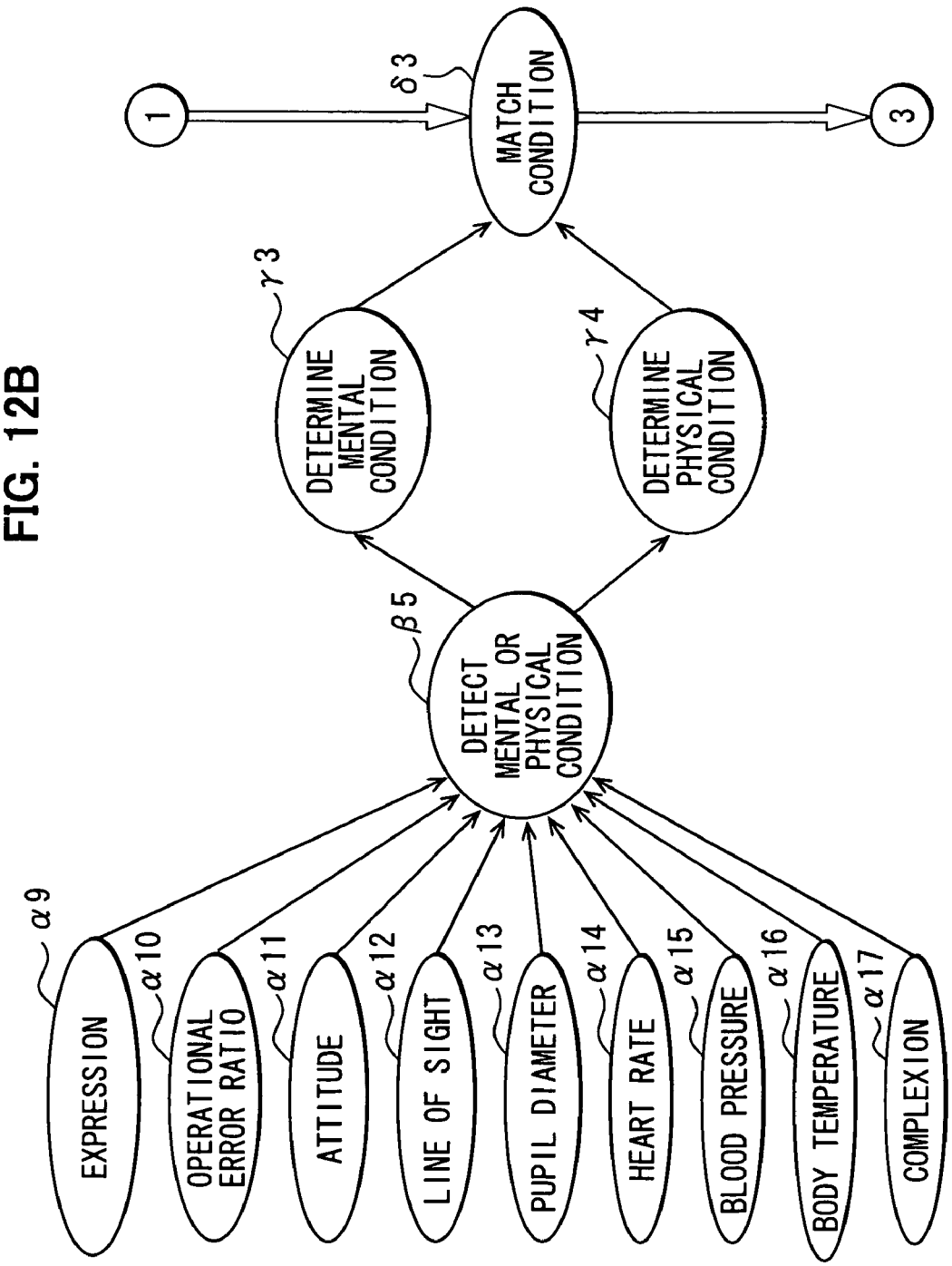
FIG. 12 is a flow chart showing whole flow of hospitality processing.
Figure 12C:
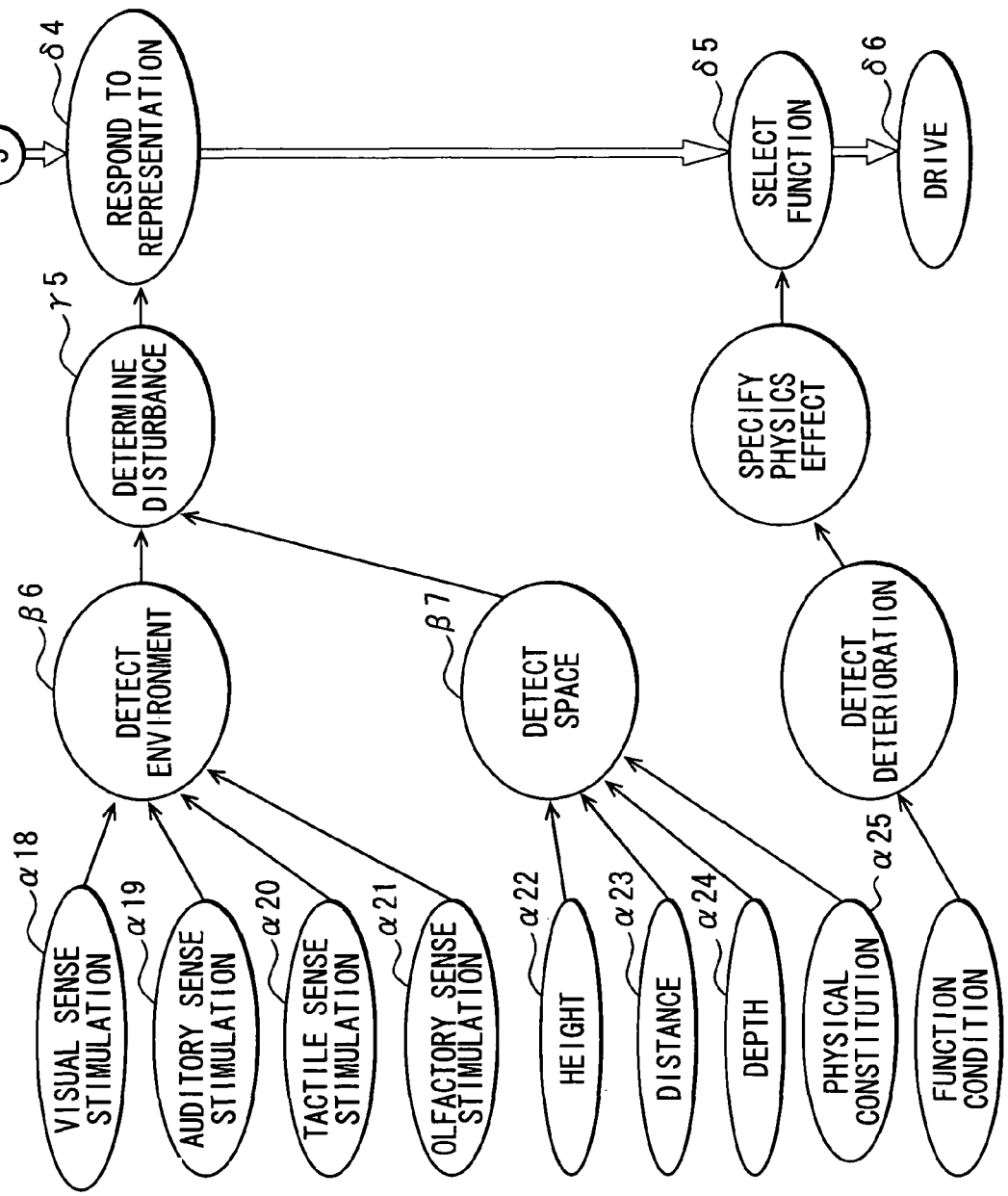

FIG. 12 shows notionally a series of whole processing algorithms from hospitality decision making to hospitality action execution in the system 100. Three figures should be read as a single FIGURE connected via the same circled numbers. Hospitality main processing includes steps of "an object estimation (Delta 1)", "individual character matching (Delta 2)", "condition matching (Delta 3)", "representation (Delta 4)", "function selecting (Delta 5)", and "a drive (Delta 6)."

First, in the object estimation (Delta 1), the present scene is estimated in response to a user location detection (Beta 1) and a user motion detection (Beta 2). Specifically, the user location detection (Beta 1) is performed by determining the relative location relation (Alpha 1) between the user and the car. Further, a user's approaching direction (Alpha 2) may also be taken into consideration. On the other hand, fundamentally, the user operation detection (Beta 2) is carried out by using the output of the sensors (scene estimation information acquisition means) which detect action predetermined for determining scene, such as opening and closing operation of the door, and seating to the seat (Alpha 5). In addition, a duration (Alpha 6) of specific action can also be taken into consideration for determining the scene. For example, a continuous seating duration can be taken into consideration for determining transition from the preparation scene to the driving scene or the staying scene.

In case that a scene is determined by a step Gamma 1, a hospitality intention on each scene is estimated in the step Delta 1. "Estimation of a hospitality intention" means an estimation of contents for hospitality which suit most at each time in accordance with the physical condition and the mental condition of the user which changes every moment, i.e., an estimation of contents that is considered most wanted by the user. In detail, the apparatus uses an intention estimation table 371 illustrated in FIG. 19 and FIG. 20 and a principle action table 372 illustrated in FIG. 21 for searching presence or absence of a suitable hospitality intention in each of items. The apparatus determines the presence or absence of a suitable hospitality intention that matches an environment item to be controlled for the user's physical feeling such as a tactile, a visual, an olfactory, and an auditory sense with respect to categories of required objects such as a safety, a convenience (easiness), and a comfort for each scene. If a hospitality intention is searched, with reference to the function determine table 373 according to corresponding scene illustrated in FIG. 22, the apparatus determines a hospitality function corresponding to the searched hospitality intention.

In a step Delta 2, it is performed to fit the contents of the hospitality to the user's individual character. In detail, the apparatus puts proper weightings to each hospitality processing, i.e., each user's character, according to the character judged and a user's character decision processing mentioned later. In other words, the apparatus modifies the hospitality processing in order to fit the user's character. For example, the apparatus customizes a combination of two or more hospitality actions, and/or modifies an amount of hospitality action. For determining individual character, a character detection processing Beta 4 is necessary. For the character detection processing Beta 4, it is possible to employ several methods for determining character. For example, either a method for determining character based on a user's own input or a method for determining character based on an analytically fashion considering an action of the user, a behavior of the user, a thinking patterns, an expression, etc. Concerning the latter, the apparatus employs a system which determines a character classification based on statistics of music selection (Alpha 8: See also W2) as well as in the patent documents 1 and 2.

A step Delta 3 shows a processing for fitting contents of hospitality to the user's physical and mental conditions. A step Delta 4 is a processing for representation. A step Delta 5 is a processing for selecting function. That is, the apparatus estimates and determines the user's physical and/or mental condition based on an acquired information which is the physical and/or mental condition information reflecting the user's physical and/or mental condition and is acquired from the detection information of the user body characteristics information acquisition means. In detail, a physical condition index and a mental condition index are calculated from the user living body characteristics information acquired from the user, then a user state index is calculated based on at least one of the physical condition index and the mental condition index.

The user body characteristics information acquisition means may be provided with at least one of the infrared sensor 519 for detecting a complexion of the user (Alpha 17), the face camera 521 for detecting at least one of an expression of the user (Alpha 9), a posture (Alpha 11), a sight direction (a line of sight) (Alpha 12)), and a diameter of pupil (Alpha 13), the blood-pressure sensor 524 for detecting a cardiac beats (pulses) (Alpha 14), etc. In addition to or alternatively, the user body characteristics information acquisition means may be provided with other sensing devices such as sensors which detect a driving operation record (502w, 530, 531, 532, e.g., for detecting a rate of operation mistakes (Alpha 10),), a blood-pressure sensor (Alpha 15), and the seating sensor 520. For example, the seating sensor 520 may provide information that can be used to determine degree of the driver's fatigue by determining whether a composure is spoiled during a drive or not or by detecting a leaned weight. The spoiled composure and the leaned weight may be determined by detecting a small and quick weight shifting during a drive from a weight distribution on the seat measured by a pressure sensitive sensor. The detail of above feature is described later.

The apparatus estimates a user's mental condition and physical condition from a numerical parameter and a temporal change of the same (Gamma 3, Gamma 4). The numerical parameter indicative of the user's mental condition and physical condition is obtained (Beta 5) based on an output from the above-mentioned user body characteristic information acquisition means. The estimated result is used in a processing for determining the below-mentioned reference intention parameter values. The reference intention parameter values are used in a processing, which utilizes both the intention estimation table 371 (FIGS. 19 and 20) and the principle action table 372, for determining a hospitality function and a control content. The reference intention parameter value is set to a specific value reflecting the estimated mental condition and physical condition. As a result, the hospitality function and the control content determined according to the reference intention parameter value can be adjusted appropriately to suit the estimated mental condition and physical condition of the user. In addition, even in a hospitality service for the identical scenes, if a user's character differs, the apparatus finely tunes the hospitality action differently to suit the character. Even in a hospitality service for the identical scenes for the same user, the hospitality function and an amount of the same are differently tuned according to the mental condition and physical condition.

In a case of an example of lighting function, it may be usually recognized in many cases that a user's color preference depends on the character, and a user's desire for a lighting intensity depends on a good or bad physical condition. For example, a person categorized in the active usually prefers red, and a person categorized in the gentle usually prefers green or blue. For example, many users tend to drop the lighting intensity in order to reduce the stimulus from lighting when the physical condition is bad. In order to respond to the former one, the hospitality control will be provided by adjusting a frequency or a wave length of lighting according to the preference. The wave length becomes shorter in an order of red, green and blue. In order to respond to the latter one the hospitality control is provided by adjusting an amplitude of lighting. In addition, the mental condition is a factor related to the both. Therefore, in order to uplift feeling in a little cheerful mental condition, it is conceivable either to employ a red lighting (frequency adjustment) or to increase a lighting intensity without changing color (amplitude adjustment). In addition, in order to calm down feeling in an excessively excited mental condition, it is conceivable either to employ a blue lighting (frequency adjustment) or to decrease a lighting intensity without changing color (amplitude adjustment). In the case of music, since various frequency components are contained, it is more complicated, but the hospitality control may contains control patterns of a frequency and/or an amplitude. For example, the apparatus may emphasize an acoustic wave of high frequency range such as a range about from several 100 Hz to 10 kHz in order to increase the awakening effect. For example, in order to calm down a feeling conversely, the apparatus may employ so-called alpha wave music which contains the acoustic wave having a center frequency that is adjusted to the frequency (7-13 Hz: human Resonance) of the brain waves (alpha wave) at the time of a relaxation.

The apparatus estimates a disturbance stimulus value (Gamma 5) by achieving (environmental detection: Beta 6) information (disturbance stimulus) that is indicative of how much amount of stimulus is given to the user based on outputs from the sensors such as the illumination sensor 539 (visual-sense stimulus: Alpha 18), and a sound pressure sensor (acoustic-sense stimulus: Alpha 19) in FIG. 1. The apparatus may estimate an additional disturbance stimulus. For example, a tactile sense stimulus (Alpha 20: e.g., the pressure-sensitive sensor 523 attached on the steering handle) may be additionally employed. For example, a sense-of-smell stimulus (Alpha 21: based on a sense-of-smell sensor) may be additionally employed. Regarding an estimation of disturbance, it is also possible the indirect stimulus from space enclosing the user may be taken into consideration. For example, parameter (space detection: Beta 7) such as a room height (Alpha 22), a horizontal distance (Alpha 23), a depth (Alpha 24) and a physique of user oneself and/or a passenger (Alpha 25) may be considered.

The possible user of the vehicle is registered in a user registration part 600 (FIG. 2A) provided in ROM of the hospitality determination section 2 of FIG. 1. The ROM is preferably configured with a flash type memory device to enable overwriting. The user registration part stores each user name and a user's character classification in an associated and linked manner. The user name may be replaced with a user ID, or with a user ID and a personal identification number. The character classification may be determined based on a music selection statistical information of the car audio system accumulated during automobile use. The detail of determining process is explained below. However, when an accumulated information of the music selection statistical information is insufficient for determining a character, or in a case that it is desired to obtain a character classification without collecting an operation history information, it is possible to determine a character classification based on an input result of a character classification information or a necessary information for determining a character classification inputted by the user.

For example, the apparatus may display selections of character classifications on the monitor 536 (may be substituted by the monitor of the car-navigation system 534) in FIG. 1, and invite the user to choose the character classification which considered to suit the user from the input unit 529. Alternatively, the apparatus may employ a system which performs the questionnaire input for getting information for determining a character classification instead of carrying out direct input of the character classification. In this case, the apparatus displays a questionnaire in a multiple-choice style on the monitor 536, and invite the user to select and answer the questionnaire. For example, the apparatus generates the multiple-choice entries in response to a selection button, and inputs a choice by a touch signal on a touch panel 529 overlapped on the displayed entries. The apparatus may include a processing for choosing a unique single character classification from a group of the character classifications based on a combination of the answers for all questionnaires.

A user registration input including a user name is also inputted via the above-mentioned input unit 529. The user name is stored in the user registration part 600 of FIG. 2A with the character classification determined, a rank, and physical condition correction coefficients Dfb, and Dfm (after-mentioned). Alternatively, the above mentioned inputs can be completed via the portable apparatus 1. In this case, the input data is transmitted to the vehicle side devices via a wireless connection. Alternatively, inputting for the user registration information may be performed before by a person in a dealer ship via the input unit 529 or an input tool exclusively used by the dealer ship person when a user purchases the car.

About an example for determining a character classification based on the music selection statistical information of the car audio system is explained in the patent documents 1-2. The contents of the patent documents 1-2 listed before are incorporated by reference. In the car audio system 515 of FIG. 6, the user can choose favorite music at any time by inputting via the panel 515d, and can enjoy a selected music performance. When the user selects a music by oneself, the user identification information (a user name or a user ID), an ID of a selected music source data, and the hospitality reference data RD are stored in a music selection record storage part in an associated and linked manner. The music selection record storage part is formed in the storage device 535 of FIG. 1. The hospitality reference data RD may include the character code, the age code, the sex code, the genre code, and the music mode code. In the music selection record storage part, a statistical information of the music selection record is arranged for each of the users. The statistical information of the music selection record is stored in the storage device 535 of FIG. 1. The apparatus counts the number of music selected for every character codes based on the music selection data as the statistical information. As a result, the character classification which has most numbers of music selections is determined. The character classification of the user may be determined with numerical parameter called the number of music selection. The most simple way to determine the character classification is that the apparatus determines the character classification having most number of selected music is directly selected as the user character. For example, in response to an event when the total number of selected music stored in the statistical information exceeds a predetermined level, an old character classification initially inputted by the user may be renewed with a new character classification determined by the above-mentioned way based on the statistical information.

The user shall be identified before use of the car. It is because the contents of hospitality shall be difference depending on each user categorized in different character classifications, especially in a case where a plurality of potential users are registered in the car. The most simple way of user identification is that the apparatus transfers the user ID and the personal identification number to the vehicle side device from the portable device 1, then the hospitality determination section 2 in the vehicle side device checks whether the received user ID and personal identification number are matched with one of registered user IDs and personal identification numbers. Alternatively, the apparatus may utilize a biometrics identification method such as a image matching of the user face captured by a camera disposed on the portable device 1, a voice matching, and a fingerprint matching. Alternatively, the apparatus may execute a rough and simple identification just using the user ID and the personal identification number when the user approaching to the car, then after the user unlocks and gets into the car, the apparatus may execute a more accurate and reliable biometrics identification method using such as the above-mentioned face camera 521, the microphone 522, the retinal camera 526, the iris camera 527, and the vein camera 528.

Figure 27:
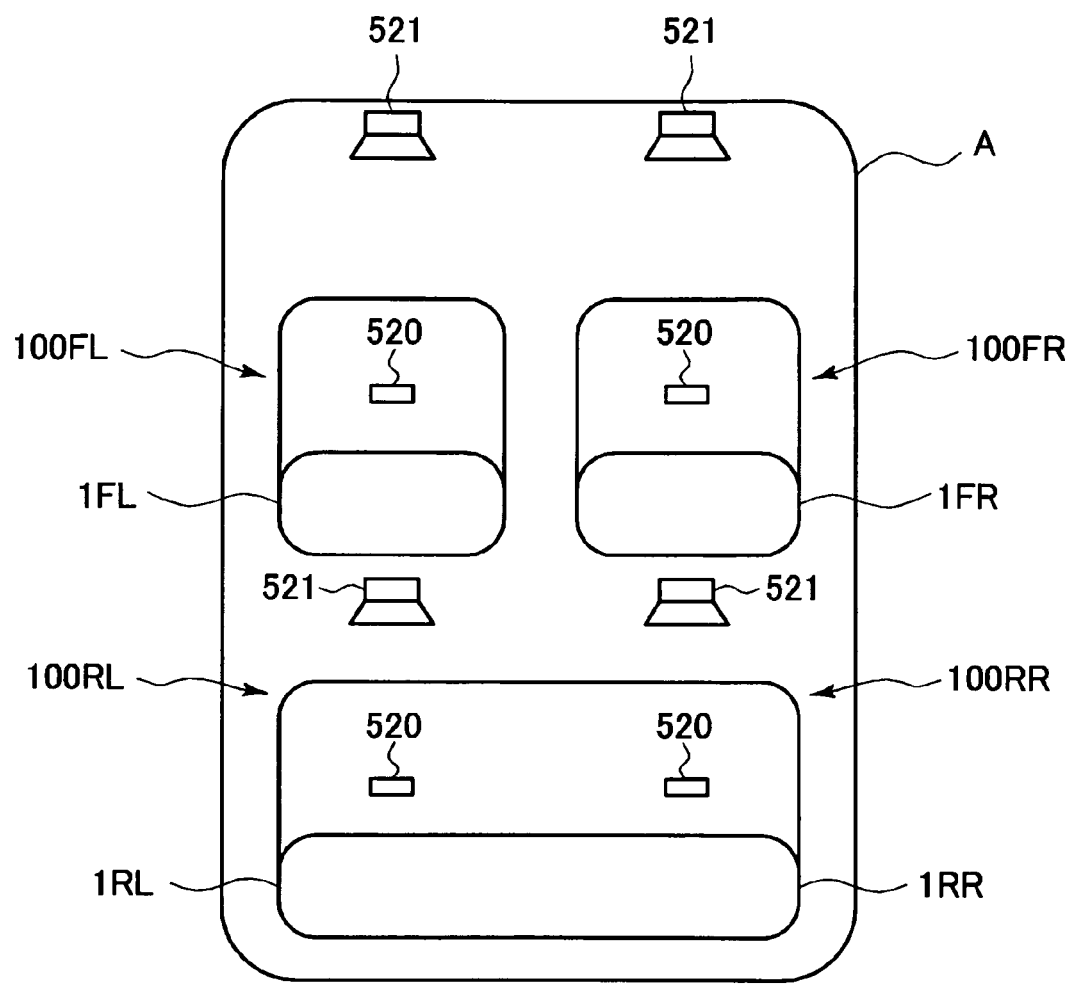
FIG. 27 is a schematic diagram showing an example of arrangement of a face camera and a seating sensor in vehicle.

In the embodiment, the case where an identification is performed by matching a face image is illustrated. As shown in FIG. 27, the face camera 521 is designed and arranged to take frontal images on each seat 100 FR, FL, RR, and RL to cover each passenger's upper half of the body. The seating sensor 519 is provided by load sensors etc. which are embedded in a seat portion of the each seat 100 FR, FL, RR, and RL, and detects the passenger seated thereon in an auxiliary manner. For example, the apparatus may detects a seating on a certain seat if both a detection of load on the seat by the seating sensor 519 and a detection of the face image of the certain potential user in an imaging range of the face camera 521a are met. It is possible to avoid erroneous detection caused by a luggage loaded on the seat or a disturbance light etc. In addition, an auxiliary use of the seating sensor 519 allows the apparatus to perform a certain accuracy for seating detection even if an accuracy of the face image matching is lowered, and enables the apparatus to use a lighter algorithm. Further, as shown in FIG. 2A, an amount of face features extracted from each user's master face image is stored in an associated and linked manner with each user ID in the user registration part 600. The apparatus configured to provide identifying means for identifying each user on each seat by matching the face feature amount stored and the face feature amount extracted from the image captured by the face camera 521.

An example of operation in driving and/or staying scene is explained below based on the flow chart in FIG. 13. First, the mental condition and physical condition of the user seating are estimated (See FIG. 12, Gamma 3, Gamma 4). An outline of the method is explained here since the detail can be found in the patent documents listed above. The method employed is that the apparatus estimates a mental condition and a physical condition based on a changing waveform that is achieved by measuring a temporal change of the acquired living body condition parameters.

In a case that the apparatus adopt "expression" as the living body condition parameter, the apparatus captures a face image in a predetermined sampling interval by using the face camera 521 of FIG. 1, and determines a present expression by comparing the captured images with a master image. The apparatus may categorize the expression in "stability", "uneasy and displeasure", "excitement and anger", etc. and also determines a transition of the expression in "small change", "increasing", "slight increase", "sudden increase", etc.

When adopting "body temperature" as the living body condition parameter, the body temperature sensor 525 (e.g., the infrared sensor 519) is used. In detail, the apparatus performs sampling of the body temperature value at each sampling timing defined by a certain time interval to monitor and record a waveform thereof. Then, the apparatus calculates a center frequency (or a peak frequency) based on a frequency spectrum achieved by performing a well-known Fast Fourier Transform processing. The apparatus divides the waveform into a plurality of sections, and calculates a body temperature average value for each section. The apparatus determines a representative value of a waveform amplitude by averaging sectional integrated amplitudes calculated based on the body temperature and the body temperature average value used as a waveform centerline for each section. The apparatus checks whether the determined frequency f exceeds an upper threshold fu0 or not, and determines that the change of the body temperature monitored is "fast", if the determined frequency f exceeds. The apparatus checks whether the frequency reaches below a lower threshold fL0 (>fu0) or not, and determines that the change of the body temperature monitored is "slow", if the frequency reaches below. The apparatus determines that the change of the body temperature monitored is "normal", if an expression fu0>=f>=fL0 is met. The apparatus compares the value of the integrated amplitude A (the average value) with a threshold value A0, and determines that the body temperature monitored is in "varying" condition, if an expression A>A0 is met. The apparatus determines that the body temperature monitored is in "maintained (stable)" condition, if an expression A <=A0 is met.

In a case that the blood pressure is adopted as the living body condition parameter, the apparatus calculates a center frequency f (or a peak frequency) of a blood-pressure waveform detected by the blood-pressure sensor 524, and an average value A of integrated amplitudes A1 and A2 for each sections. The apparatus determines that the blood pressure change is "fast", if the frequency f is higher than an upper threshold fu0. The apparatus determines that the blood pressure change is "slow", if the frequency f is lower than a lower threshold fL0 (>fu0). The apparatus determines that the blood pressure change is "normal", if an expression fu0>=f>=fL0 is met. The apparatus compares the amplitude A with a threshold A0, and determines that the blood pressure change is in "maintained" condition, if an expression A <=A0 is met, otherwise, the apparatus determines the blood pressure change is in "varying" condition. The apparatus may be able to reach an estimation result that the mental condition is in "inattentive", if the blood pressure change is in "fast" and a changing direction is in "varying". In a poor physical condition, the blood pressure changes slowly. If the blood pressure rapidly varies, the apparatus may determine that the user is in "excitement (anger)" condition.

When adopting "skin resistance" as the living body condition parameter, the skin resistance sensor 545 is used. In this case, similar to the above, the apparatus samples and records a waveform of the skin resistance, and calculates a center frequency f (or a peak frequency) of a spectrum, and integrated amplitudes for sections such as A1, and A2. Then, the apparatus plots the integrated amplitude A with respect to a time t, and calculates a gradient Alpha by carrying out the least square regression. The apparatus determines that the skin resistance change monitored is "fast", if the frequency f is higher than an upper threshold fu0. The apparatus determines that the skin resistance change monitored is "slow", if the frequency f is lower than a lower threshold fL0 (>fu0). The apparatus determines that the skin resistance change is "normal", if an expression fu0>=f>=fL0 is met. The apparatus compares an absolute value of the gradient Alpha (Ab−Alpha) with a threshold Alpha−0. Then, the apparatus determines that an average skin resistance monitored is in a "constant" condition, if an expression Ab−Alpha<=Alpha−0 is met. In a case that Ab−Alpha>Alpha−0, the apparatus determines that the average skin resistance monitored is in "increasing" condition, if the gradient Alpha is positive, and the average skin resistance monitored is in "decreasing" condition, if the gradient Alpha is negative. The apparatus may be able to reach an estimation result that the mental condition is in "inattentive", if the skin resistance change is "fast" and a changing direction is in "increasing". Although a slight poor physical condition is not reflected so much in the change of the skin resistance, if a poor physical condition advances the change of the skin resistance will gradually change to an increasing, therefore, the way explained above is still effective to estimate a "serious poor physical condition." The apparatus may estimate that the user is in "excitement (anger)" condition with high probability, if the skin resistance decreases rapidly.

In a case that the posture is adopted as the living body condition parameter, the apparatus calculates a center frequency f (or a peak frequency) of a posture waveform detected by the plurality of the seating sensors 520 embedded in a seat, and an average value An of integrated amplitudes such as A1 and A2 for each sections, and a variance Sigma-square. The apparatus determines that the posture change monitored is "increasing", if the frequency f is higher than an upper threshold fu0. The apparatus determines that the posture change monitored is "decreasing", if the frequency f is lower than a lower threshold fL0 (>fu0). The apparatus compares the average An of the integrated amplitude A with a predetermined threshold, and determines and categorizes a posture shifting amount into "small", "slight increase" and "sudden increase". Usually, the posture shifting amount shows tendency in an increasing direction as the average An becomes higher. The apparatus determines that the posture shifting amount is in an increasing and decreasing, i.e., a fluctuation, if the variance Sigma-square is higher than the threshold. The posture shifting is considered as an especially effective parameter for discriminating the mental conditions, since the shifting of the posture shows a notably different tendency according to differences among fundamental states to be specified (determined conditions) such as "poor", "inattentive" and "excited". The driving user may keep a necessary tension or concentration while keeping a posture within an appropriate range, if the user's condition is in a normal condition. However, if the user gets something wrong on the physical condition, the user may change a posture occasionally in order to relief hardness of the physical condition. As a result, the posture shifting amount shows a slight-increase tendency. However, if a poor physical condition advances further, a posture will become unstable as shaky, and will show an increasing and decreasing tendency. For example, if the user attacked very heavy sleepiness, the posture may show an unstable and shaky shifting. In such a situation, the posture shifting is unstable and the body control is almost impossible. Therefore, usually, a speed of the posture shifting decreases substantially. In comparison to the above-mentioned case, a difference can be found in the speed of the posture shifting that is not decreased so much in the inattentive condition where the posture shifting is increased and decreased untidily too, but the body control is still available. On the other hand, in the excited condition, the posture shifting increases suddenly and a speed of the posture shifting is also increased due to a losing composure or nervousness.

In a case that a sight direction is adopted as the living body condition parameter, the apparatus detects and locates a pupil location and a face center position in the above-mentioned face image, and acquires a temporal waveform of the sight direction Theta that is calculated as a shifting amount of the pupil from the front direction with respect to the face center position. The apparatus calculates a center frequency f (or a peak frequency) of the waveform, an average integrated amplitude An of integrated amplitudes A1 and A2 for sections, and a variance Sigma-square. The apparatus determines that a changing speed of the sight direction Theta is "increasing", if the frequency f is higher than an upper threshold fu0. The apparatus determines that the changing speed of the sight direction Theta is "decreasing", if the frequency f is lower than a lower threshold fL0 (>fu0). The apparatus determines that the changing speed of the sight direction Theta is "normal", if an expression fu0>=f>=f0 is met. The apparatus compares the average An of the integrated amplitude A with a predetermined threshold, and determines and categorizes the sight direction Theta into "small change", "slight increase" and "sudden increase". Usually, a changing amount of the sight direction Theta shows tendency in an increasing direction as the average An becomes higher. If the variance Sigma-square of the integrated amplitude A is higher than the threshold, the apparatus determines that the changing of the sight direction Theta is in an increasing and decreasing tendency, i.e., in a modulation, a fluctuation, or "abnormal-condition" (so-called a condition where an eye looked around restlessly). The sight direction Theta is considered as an effective factor for determining "inattentive" condition, since the changing amount of the sight direction is suddenly increased and becomes in "abnormal-condition" where an eye looked around restlessly when the user is in an inattentive condition. In addition, the sight direction Theta is an effective factor for estimating a wrong physical condition, since the changing amount of the sight direction is decreased according to a degree of a poor physical condition. Although the changing amount of the sight direction is decreased also in an excited condition, it is still possible to discriminate between a poor physical condition and the excited condition by using the changing speed. For example, the changing speed of the sight direction is also decreased in the poor physical condition due to a delay of the sight direction change in response to a view change, however, the changing speed of the sight direction in the excited condition occasionally shows a very fast changing speed due to a fixedly staring action etc., in response to a view change sharply.

When adopting "the diameter of a pupil" as the living body condition parameter, the apparatus captures an image of the user's iris by the iris camera 527 (FIG. 1), and acquires a temporal waveform of the diameter d of the pupil determined based on the image. The apparatus calculates an average diameter dn of the pupil in each section based on the waveform, an average An of integrated amplitudes A1 and A2 in each section, and a variance Sigma-square. The apparatus determines that it is "the pupil is open", if the average diameter dn of the pupil is larger than a threshold value d0. The apparatus checks that whether the variance Sigma-square is larger than a threshold Sigma-square-O when the average diameter dn of the pupil is not larger. Then, the apparatus determines that it is "the pupil is varying", if the variance Sigma-square is larger than the threshold Sigma-square-O. The apparatus determines that it is "normal", if the variance Sigma-square is not larger than the threshold Sigma-square-0. The diameter d of the pupil changes notably in response to the mental condition of the user. Especially, it is possible to estimate whether the user is in the excited condition or not with high accuracy based on whether there is any characteristic pupil open condition. It is possible to estimate that the user is in an inattentive condition when the diameter of the pupil is varying.

When adopting a steering operation condition as the living body condition parameter, the apparatus executes a sampling and evaluation of a steering handle at the time of straight traveling. The apparatus inputs a present value of a steering angle Phi from an output of the steering angle sensor 547 at each sampling timing defined with a predetermined time interval. For example, the steering angle Phi is defined as an angle to the left or right from a straight traveling neutral position where Phi=0. The steering angle may be positive in right side and be negative in left side. Then, the apparatus acquires a value of the steering angle value in a waveform, and calculates a center frequency f (or a peak frequency), integrated amplitudes A1, A2 in each section, and a variance Sigma-square of the same. The apparatus determines that a changing speed of the steering angle Phi is "increasing", if the frequency f is higher than an upper threshold fu0. The apparatus determines that the changing speed of the steering angle Phi is "decreasing", if the frequency f is lower than a lower threshold fL0 (>fu0). The apparatus determines that the changing speed of the steering angle Phi is "normal", if an expression fu0>=f>=fL0 is met. The apparatus determines that a steering error is "increasing", if the variance Sigma-square of the integrated amplitude A is larger than a threshold Sigma-square-0. The apparatus determines that the steering error is "normal", if the variance Sigma-square is not larger than the threshold Sigma-square-0. The apparatus may estimate that the user is in an inattentive condition or an excited condition, by detecting an increase of the steering error. The apparatus may estimate a serious poor physical condition from an increasing tendency of the error, since an appropriate steering operation is hindered in the case that the user gets a serious poor physical condition including a nap condition. The apparatus may estimate a poor physical condition and an inattentive condition based on a decreasing of the steering speed, since either the poor physical condition or the inattentive condition causes the user tends to delay in a response of the steering operation. The apparatus may estimate the excited condition based on the increasing of the steering speed, since the user tends to make a quick steering operation nervously in the excited condition.

Thus, the apparatus performs a determination (estimation) of the physical and/or mental condition of the user by using the evaluation result based on the temporal change of the living body condition parameter acquired as mentioned above. The storage device 535 stores a determining table 1601 as shown in FIG. 14, which is used for determining a determined condition based on a combination of determined or estimated result of temporal changes of the living body condition parameters which are detected by the plurality of user body characteristic information acquisition means. The determined condition is a combination of the mental and physical conditions.

The physical condition used as the determined condition are "normal", "tired", "slight abnormal", and "considerably abnormal" in this embodiment. Similarly, the mental conditions used as the determined condition are "disappointed", "neutral", and "excited". The neutral is further divided into three categories as "smoothing", "center", and "uplifting". The excited includes a passionate and excitement. The determining table 1601 shows setting examples of the physical condition index PL and the mental condition index SL corresponding to each of the determined conditions. In the determining table 1601, the living body condition parameters cover all of the parameters including the parameters that are used in the following scenes, such as "blood pressure", "body temperature", "skin resistance", "expression", "posture", "sight line", "pupil (size)", and "steering". Even if it is listed as the same name of the parameter, a sensor or a camera to be used for acquiring the parameter is selected to use an appropriate one for acquiring necessary living body condition parameter.

In detail, the apparatus reads a determined result (e.g., "fast decrease", or "increase", etc.) of the temporal change of each living body parameter, and compares respective determined result read with the combination of temporal change condition corresponding to each determined condition on the determining table 1601 one by one. In this case, the apparatus may employ a processing which uses only the determined condition where the determined result and the referenced information are matched with respect to all the living body condition parameters. However, if the apparatus refer to many living body condition parameters, it may be prevented to estimate the physical or mental condition flexibly, since the referenced conditions and the determined results for all the living body condition parameters are rarely matched in predetermined combinations. For this reason, the apparatus preferably include a collation counter for counting a score (N) defined as a degree of matching, and a section for performing a method for selecting one potential determined condition which has the highest score, i.e., has the highest matching degree, and deciding as the determined condition.

There may be a case where the identical living body condition parameter may contribute to matching in two or more determined conditions. For example, a condition "varying" determined on the average blood-pressure level may contribute to establishing "inattentive" and "excited". In such a case, the apparatus increment both the collation counters for each of the determined conditions. For example, if the average blood-pressure level is determined to be "varying", the apparatus increments the collation counter values N1, N4, N5, and N6.

On the other hand, matched or not-matched between the referenced information and the determined result is mostly determined in comparison with the threshold values (frequency or amplitude etc.) of the living body condition parameters as mentioned above. Therefore, a degree of difference between the actual value of the living body condition parameter and the threshold is lost when matched or not-matched is determined in a binary fashion (white or black). However, if the determination of matched or not matched was performed based on the actual value very close to the threshold, it may be considered as a gray determination. In such a case, it is preferable to evaluate a contribution degree for the determined result small as compared with the case where the determination of matched or not matched was performed based on the value far apart from the threshold value (for example, the value is different from the threshold value apparently).

In order to address the problem above, instead of a processing that increments the collation counter only when the referenced information and the determined result are completely matched, if the completely matched was not established, but an approximate result within a predetermined range is obtained, the collation counter may be added with a limited value smaller than that in the completely matched case. For example, in the case of that the referenced information is "sudden increase", add three (3) points if the determined result is also "sudden increase", add two (2) points if the determined result is "increase", and add one (1) point if the determined result is "slight increase".

Returning to FIG. 13, after determining and specifying the physical and mental conditions, the processing proceeds to a step S2 that is a processing for determining and setting a reference intention parameter corresponding to the physical condition. In this embodiment, the reference intention parameter is a space parameter which consists of five components fb1, fb2, fb3, fb4, and fb5. Hereafter, a components set of the reference intention parameter is called as a reference intention vector VFB for the physical condition, and may be expressed as VFB in a vector form that means VFB=fb1 to fb5. Among the five above-mentioned components, fb1 and fb2 belong to a parameter classification showing an intention power about a prevention or reduction of physical exhausting, and fb3, fb4, and fb5 belong to a parameter classification showing an intention power about a recovery of physical strength. More specifically, the component fb1 corresponds to an intention which means "reducing a power/time". The component fb2 corresponds to an intention which means "reducing an effort/person". The component fb3 corresponds to an intention which means "supplying". The component fb4 corresponds to an intention which means "resting". The component fb5 corresponds to an intention which means "enhancing an effect".

Next, a step S3 is a processing which determines a reference intention parameter corresponding to the determined mental condition. In this embodiment, the reference intention parameter for the mental condition is a space parameter which consists of seven components fm1, fm2, fm3, fm4, fm5, fm6, and fm7. Hereafter, a components set of the reference intention parameter is called as a reference intention vector VFM for the mental condition, and may be expressed as VFM in a vector form that means VFM=fm1 to fm7. Among the seven above-mentioned components, fm1 and fm2 belong to a parameter classification showing an intention power about a prevention or reduction of unpleasant, and fm3 and fm4 belong to a parameter classification showing an intention power about an acquisition of pleasant. In addition, fm5 belongs to a parameter classification showing an intention power about an uplifting of feeling, and fm6 and fm7 belong to a parameter classification showing an intention power about a calming down or resting of feeling. More specifically, the component fm1 corresponds to an intention which means "eliminating an object, i.e., eliminating a source of stress". The component fm2 corresponds to an intention which means "deceiving a stress, i.e., make insensible to a stress". The component fm3 corresponds to an intention which means "acquiring or obtaining an object, i.e., recognizing a favorite thing or image". The component fm4 corresponds to an intention which means "deceiving, i.e., supplying and enjoying another favorite atmosphere". The component fm5 corresponds to an intention which means "uplifting a feeling, i.e., emphasizing an image of a vehicle and/or destination". The component fm6 corresponds to an intention "healing or curing". The component fm7 corresponds to an intention which means "enhancing an effect".

The values of components of the reference intention vector VFB for the physical condition corresponding to a determined physical condition are predetermined and stored in a table 601 for setting the reference intention vector for the physical condition as shown in FIG. 15. The table is stored in the ROM in the hospitality determination section 2 of FIG. 1. The values are looked up and used in accordance with the determined physical condition occasionally. The values of components of the reference intention vector VFM for the mental condition corresponding to a determined physical condition are predetermined and stored in a table 602 for setting the reference intention vector for the mental condition as shown in FIG. 16. The table is stored in the ROM in the hospitality determination section 2 of FIG. 1. The values are looked up and used in accordance with the determined mental condition occasionally.

The absolute values of components of the reference intention vector VFB and VFM are set to greater values as a user's exclusion intention against a disturbance stimulus is considered stronger. An example is given and explained. Regarding the reference intention vector VFB for the physical condition, as shown in FIG. 15, the values of the parameters classified as the components fb1 and fb2 showing the intention power relating to the prevention or reduction of physical exhausting are set to an apparently greater values in an abnormal physical condition than that in a normal physical condition. Especially, the value is set to the maximum value, e.g., 1.0, in the serious abnormal physical condition. The value is set to a slightly smaller value, e.g., 0.8, in a slightly abnormal physical condition. A similar setting is also applied to the parameters classified as the components fb3, fb4, and fb5 showing the intention power about a physical strength recovery. For example, the parameter fb4 corresponding to the intention "resting" is set to a slightly greater value in a fatigue or tired condition, even in the normal condition.

Regarding the reference intention vector VFM for the mental condition, as shown in FIG. 16, the value of the parameter classified as the component fm5 showing the intention power relating to the uplifting a feeling is set to a greater value in the disappointment than that in the neutral and excited conditions in order to emphasize an intention to uplift a feeling. A greater value is set in a scene that requires an uplifting even in the same neutral condition. Contrary, the parameters classified as the components fm6 and fm7 showing the intention power about feeling quiet are set to greater values in the excited condition than that in the disappointed and neutral conditions in order to emphasize the intention to cool down the excited feeling. A greater value is set in a scene that requires a healing even in the same neutral condition.

Since there is usually no user who welcomes an unpleasant element, the values of the parameters classified as the components fm1 and fm2 showing the intention power about the unpleasant exclusion are set to generally greater values. On the contrary, in the time of violent emotion and excitement, and disappointment, since it is difficult to accept a pleasant element because of moral stable lack, the parameters classified as the components fm3 and fm4 showing the intention power about pleasant acquisition are set generally smaller values. In the neutral condition, although the value is usually set small, the value is set in a gradually increasing manner as the scenes are changed from the scene where the healing is required to the scene where the uplifting is required.

Figure 17:
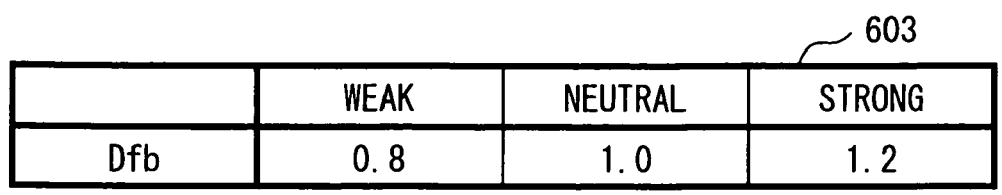
FIG. 17 is a figure showing an example of setting of correction coefficients for a physical condition.
Figure 18:
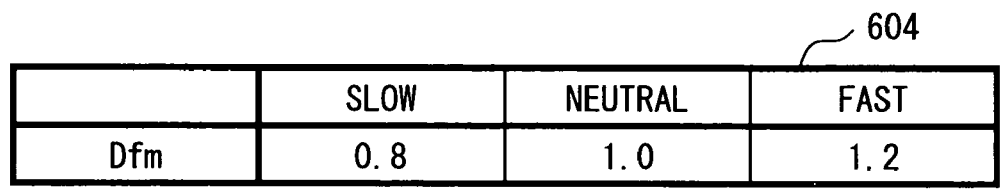
FIG. 18 is a figure showing an example of setting of correction coefficients for a mental condition.

Next, the processing proceeds to a step S4, the reference intention vector VFB for the physical condition and the reference intention vector VFM for the mental condition are corrected. More specifically, the apparatus retrieves a rank of each user in the vehicle by searching the user registration part 600 of FIG. 2A, then retrieves correction coefficients Dfb and Dfm indicated by the user who is ranked in the highest. The correction coefficient Dfb for the physical condition is set as a coefficient for correcting a set value of the components of the reference intention vector VFB for the physical condition. The correction coefficients Dfb are set for each of the users in order to have values reflecting user preferences of body stimulus levels. For example, the correction coefficients Dfb reflects user preferences such as, in a cooling air-conditioning, a mild cooling is preferred due to an oversensitivity to cold, or a strong cooling is preferred due to an oversensitivity to hot. In this embodiment, as shown in FIG. 17, the values of the correction coefficients Dfb for the physical condition are provided in three grades which include a weak, a neutral, and a strong. The correction coefficients Dfb are applied to corresponding one of the components of the vector VFB. Each of the correction coefficients Dfb is set to 1.0 for no correction in a neutral condition, is set to 0.8 for a decreasing correction in a weakening, and is set to 1.2 for a increasing correction in a strengthening.

The correction coefficient Dfm for the mental condition is set as a coefficient for correcting a set value of the components of the reference intention vector VFM for the mental condition. The correction coefficients Dfm are set for each of the users in order to have values reflecting user preferences of disturbance removing speeds. For example, the correction coefficient Dfm reflects user preferences such as a gentle mood or an impatient mood. More specifically, the correction coefficients Dfm reflects user preferences such as, in a cooling air-conditioning, a mild cooling is preferred due to a gently mood, or a strong cooling is preferred due to an impatient mood. The correction coefficient Dfm for the mental condition is closely related to the character classification stored in the user registration part 600. A smaller value is set in the correction coefficient Dfm for a user classified in the gentle character. A greater value is set in the correction coefficient Dfm for a user classified in the impatient character. In this embodiment, the values of the correction coefficients Dfm for the mental condition are provided in three grades which include a slow, a neutral, and a fast. The correction coefficients Dfm are applied to corresponding one of the components of the vector VFM. Each of the correction coefficients Dfm is set to 1.0 for no correction in a neutral condition, is set to 0.8 for a decreasing correction in a slow, and is set to 1.2 for a increasing correction in a fast.

Since user preferences of corporal stimulus levels are different for every user, it is difficult to find out a correcting condition which satisfies these uniformly. Then, the apparatus uses a parameter that indicates a hospitality priority ranking among users, and performs a processing mainly reflecting the correcting condition of the user ranked in the highest position in the hospitality priority ranking. The hospitality priority ranking shows and reflects a power relationship among the users in the vehicle. As mentioned above, the hospitality priority ranking may be set manually at a user registration. Alternatively, the hospitality priority ranking may be set depending on ages of the users such as a child or an adult. In this case, the ranking may be automatically set based on a preset ranking rules and a detected result such as a body size determined from a detecting sensor attached on the seats or an image of the users captured by the camera 521. For example, if the detected body size is less than a predetermined threshold, it is possible to determine the user is categorized as a child.

Alternatively, it is also possible to automatically determine the hospitality ranking based on an analyzed result of a well known method of a voice recognition and a conversation analysis of a user conversation detected by a microphones disposed on each of the seats. As a relatively easier method for determining the hospitality ranking, the following method may be used in the apparatus. In the method, a frequency of word occurrence in a conversation is analyzed, then, the apparatus ranks a user in accordance with words used by the user. For example, the apparatus determines a user having a lower power and ranks the user in a lower ranking level of the hospitality priority ranking as the user uses a honorific word and a respect language more frequently. Contrary, the apparatus determines a user having a higher power and ranks the user in a higher ranking level of the hospitality priority ranking as the user uses commanding words and generous tone words more frequently. Alternatively, it is possible to determine that a user is a child when the user speaks baby words frequently or speaks generally young speech. As mentioned later, the hospitality priority ranking may be determined based on a conversation input information induced by a chatterbot. In this case, the chatterbot engine, i.e., a conversation support means, is started in order to induce information for determining each user's hospitality priority ranking.

Figure 23:
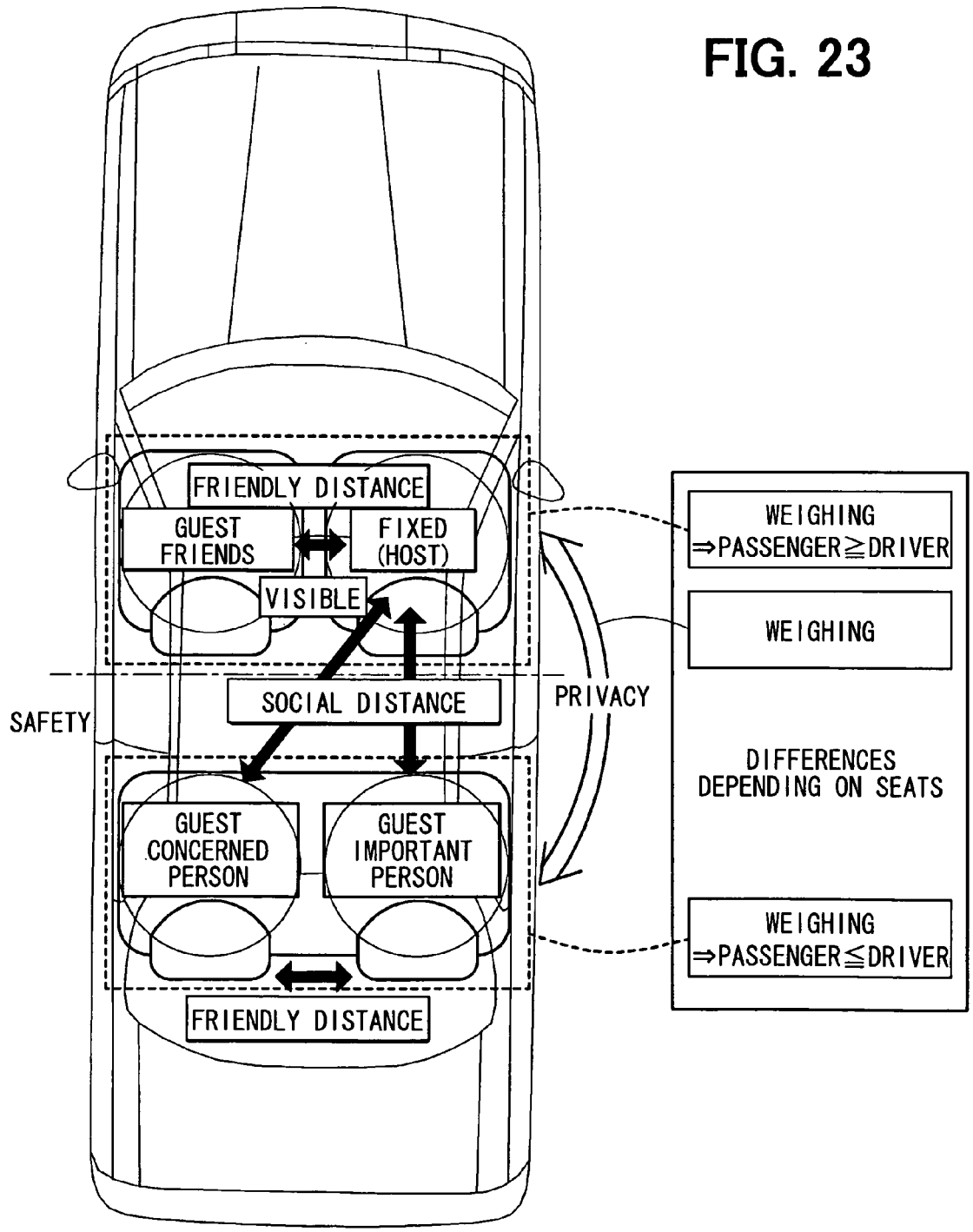
FIG. 23 is a figure showing a conceptual relationship of hospitality priority compensation between seats on vehicle.
Figure 24:
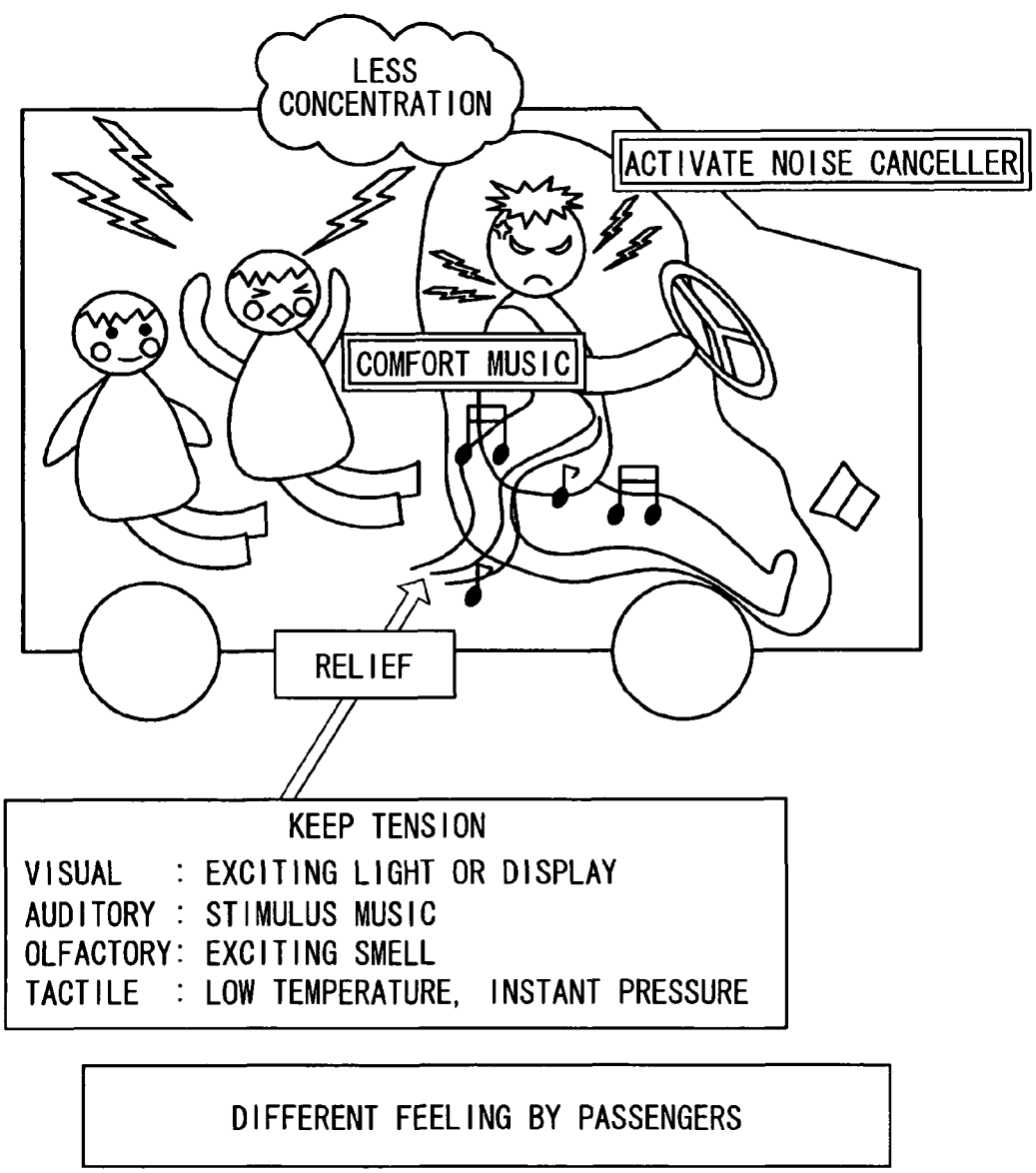
FIG. 24 is a schematic diagram showing an example of hospitality operation in case a child sits down to a backseat.

The hospitality priority ranking may be obtained by correcting a default settings based on a seating position of the user. In this case, the default setting is set regardless of a user's seat location. As shown in FIG. 23, it is usually seen that a user who is seated on the drivers seat is a host person of a hospitality in the vehicle, and a user who is seated on a passengers seat next to the drivers seat is a relatively closely related person with the host person. Considering such tendency in the vehicle, it is possible to set the hospitality priority ranking of the user seated on the passengers seat relatively higher than others by setting a correction amount, which corrects the hospitality priority ranking in an increasing direction, for the user on the passengers seat to a greater value than that for the user on the drivers seat. In the case of backseats, considering the manners, a custom where a seat placed on the rear side of the drivers seat is considered a higher position is usually seen. Therefore, for example, it is possible to set a correction amount, which corrects the hospitality priority ranking in an increasing direction, for the user seated behind the drivers seat to a greater value than that for the user seated behind the passengers seat. Since the front seats and the backseats are slightly distanced, in consideration of social communication distance, the correction amount for the hospitality priority ranking may be set smaller for those seats in the front and back relation than that for those seats next to each other. Under the situation of raising the hospitality priority ranking of the passenger seat user, for example, it is possible to show an embodiment in which the correction mount in the increasing direction for the front seat is set higher than that for the rear seat.

Further, when a child, especially a small child and a lower grade child, is seated on the backseats, it is considered that a concentration for driving may be influenced, since then may make noise excitedly. In this case, as an example of reducing the above influence at backseats, it is possible to increase the hospitality priority ranking for the hospitality action in order to make the child on the backseats calm down. For example, the hospitality action is an outputting and displaying a video image which can attract an attention of the child. On the other hand, as an example of reducing the above influence at the drivers seat, it is possible to propose a method for increasing the hospitality priority ranking for an operation of the noise canceller which controls the noise voice from the backseat, or an outputting and playing a comfortable music which is provided for calming down irritation, etc.

Figure 25:
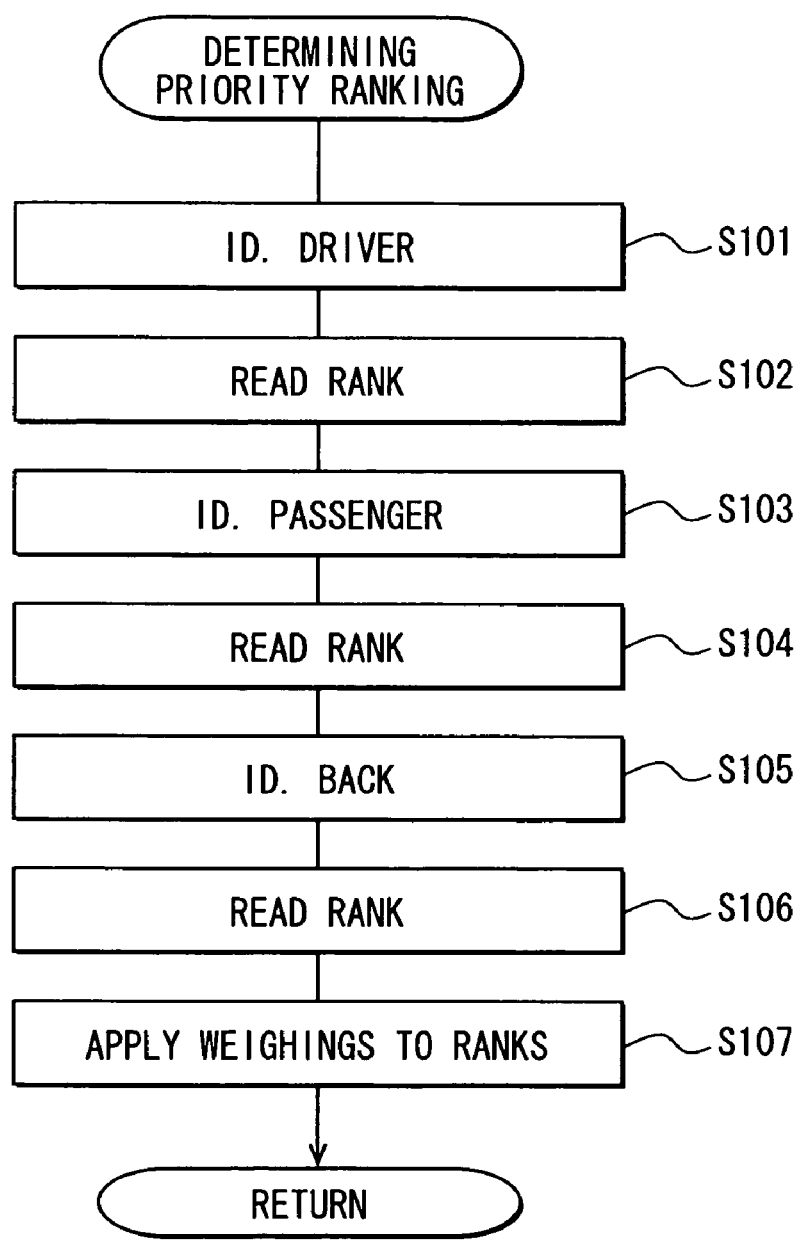
FIG. 25 is a flow chart showing a setting algorithm of a hospitality priority.

FIG. 25 is a flow chart in which a flow of a decision processing according to seat of the hospitality priority ranking is shown. In steps S101 to 5106, the apparatus identifies each of the users seating on the driver seat, the passenger seat, and the backseats by the above-mentioned method, then the apparatus reads the default value of the hospitality priority ranking which is registered in the above-mentioned user registration part 600 shown in FIG. 2A respectively. Then, the apparatus obtains the hospitality priority rankings for the seats by applying the correction coefficients determined by the above mentioned method to the default values of the hospitality priority rankings.

Although the hospitality actions, which can be executed for each seat, are basically executed in customized fashions for every seats, the apparatus performs a mediation processing in accordance with the hospitality priority ranking when opposite hospitality action competes between seats. In this case, it is possible to provide the mediation processing for the opposite hospitality actions by correcting the below mentioned intention power of the hospitality action by using correction coefficients determined according to the value of the hospitality priority rankings as shown in FIG. 26 so that the intention power is increased as the hospitality priority ranking becomes higher.

Components of the corrected vectors VFB and VFM are deployed as mentioned below on the intention estimation table 371 as shown in FIG. 19 and FIG. 20. The intention estimation table 371 is stored in ROM of the hospitality determination section 2, and has the following configurations. The table 371 is configured as a matrix structure that has a vertically arranged flow of scene axis on which a plurality of scenes are arranged in an orderly manner such as the getting in scene, the getting out scene, the staying scene. Further, in each scene, three hospitality intention provisions of classification such as a safety (safely), a convenience (easily), and a comfort (comfortably) are set. Among these, five intention power items which are indicated by each component of the reference intention vector for the physical condition (parameter) are assigned to the hospitality intention provisions of classification of convenience (easily) as shown in FIG. 20. Further, seven intention power items which are indicated by each component of the reference intention vector for the mental condition (parameter) are assigned to the hospitality intention provisions of classification of comfort (comfortably) as shown in FIG. 19.

On the other hand, the items, of the disturbance stimulus classified into at least three attributes such as the tactile, the visual, and the auditory are arranged on the horizontal axis of the matrix. Although the matrix may further include the sense of smell, it is arranged outside in the drawing. Although the disturbance stimulus includes disturbances in the car and disturbances outside the car, it has illustrated about the case of the disturbances in the car here. The tactile disturbance stimulus includes an airflow temperature, an object temperature, a humidity, and a pressure (vibration). The visual disturbance stimulus includes light (intensity of illumination). The auditory disturbance stimulus includes sound. Values of the disturbances mentioned above are detected from inputs of corresponding sensors in a step S5 in FIG. 13.

The value of the disturbance stimulus for every classification is detected in both positive and negative directions on the basis of a neutral value. For example, each of the disturbance stimulus is detected by five steps including zero for the neutral, +0.5 and +1.0 in the positive direction, and −0.5 and −1.0 in the negative direction. The values indicate variable conditions between opposing conditions such as bright and dark, hot and cold, and noisy and quiet. For example, regarding the airflow temperature, a power corresponding to an amplitude or a grade is varied among a hot, a warm, a neutral, a cool, and a cold. Also, a speed of the airflow temperature, which corresponds to a frequency, of a temperature change obtained as a result of functional operation is varies among a rapid, a fast, a neutral, a slow, and a sluggish. Regarding the object temperature, a power is varied among a hot, a neutral, and a cold. Regarding the humidity, a power is varied among a getting wet, a moistened, a neutral, and a getting dry. Regarding the vibration, a power is varied among a large or strong, a neutral, and a small or weak. Also, a speed of the vibration, which corresponds to a frequency, is varied among a high, a neutral, and a low. Regarding the light (intensity of illumination), a power is varied among a glaring, a neutral, a dim, and a dark. A speed of the light, which corresponds to a color of light, i.e., a frequency, is varied among a warm color, a neutral, and a cold color. Regarding the sound, a power is varied among a noisy as annoying, a neutral, and a quiet. A speed, which corresponds to a frequency, is varied among a lively, a neutral, and a gently.

As mentioned above, each component of reference intention vector VFB and VFM, i.e., each component of the reference intention parameter, are set to have greater absolute value as an exclusion intention of the user against the corresponding disturbance stimulus becomes strong. The apparatus calculates a product of each component and a corresponding disturbance stimulus value as the reference intention parameter on each cell of the intention estimation table 371 as shown in a step S6 in FIG. 13. If a corresponding disturbance stimulus value is a neutral value, i.e., it is zero, the product value, i.e., the intention power parameter, will also be zero. The blank cells in FIG. 19 and FIG. 20 show that the value of the intention power parameter is zero. This means that there is no exclusion intention of the user against the corresponding disturbance stimulus. That is, the most comfortable disturbance stimulus condition for the user is realized without any action. Therefore, it reflects an intention to suppress or prohibit an action of a corresponding function for suppressing the corresponding disturbance stimulus.

If the absolute value of the corresponding disturbance stimulus value is not zero, the intention power parameter is no longer zero, therefore, it is assumed that exclusion intention against the disturbance stimulus is set stronger as the absolute value becomes large. However, the intention power parameter can be defined as an inverted value of the product of each component of the reference intention vector VFB and VFM and the corresponding disturbance stimulus value, or as a ratio of the same. Therefore, it shall be understood that a relationship between the absolute value and the amount of the exclusion intention against the disturbance stimulus differs depending on calculation definitions.

The positive and negative sign of the intention power parameter is matched with the sign of the disturbance stimulus, and is associated with and linked to directions of control of a corresponding function. Since the disturbance stimulus values varies between opposing conditions as mentioned above, and have a neutral condition between the two conditions, the sign uniquely indicates a direction to which the disturbance stimulus shifts on the basis of the neutral condition. The neutral condition corresponds to a nicely illuminated condition which is not too bright and not too dark, a comfortable temperature condition which is not too hot and not too cold, or a ordinary sound condition which is not too noisy and not too quiet.

As mentioned above, the reference intention parameter shows an amount of an exclusion wish of the user against the disturbance stimulus that is shifted from the neutral value by the absolute value, therefore, in order to cancel the disturbance stimulus, the apparatus executes a control having a direction which is indicated by the sign on the intention power parameter calculated by a product of the reference intention parameter and a disturbance stimulus value. For example, the apparatus executes a control to make it dark when it is too bright or glaring, or to make it bright when it is too dark. For example, the apparatus executes a control to make it cool when it is too hot, or to make it hot when it is too cold. For example, the apparatus executes a control to make it quiet or deceiving the noisiness when it is noisy.

Figure 13:
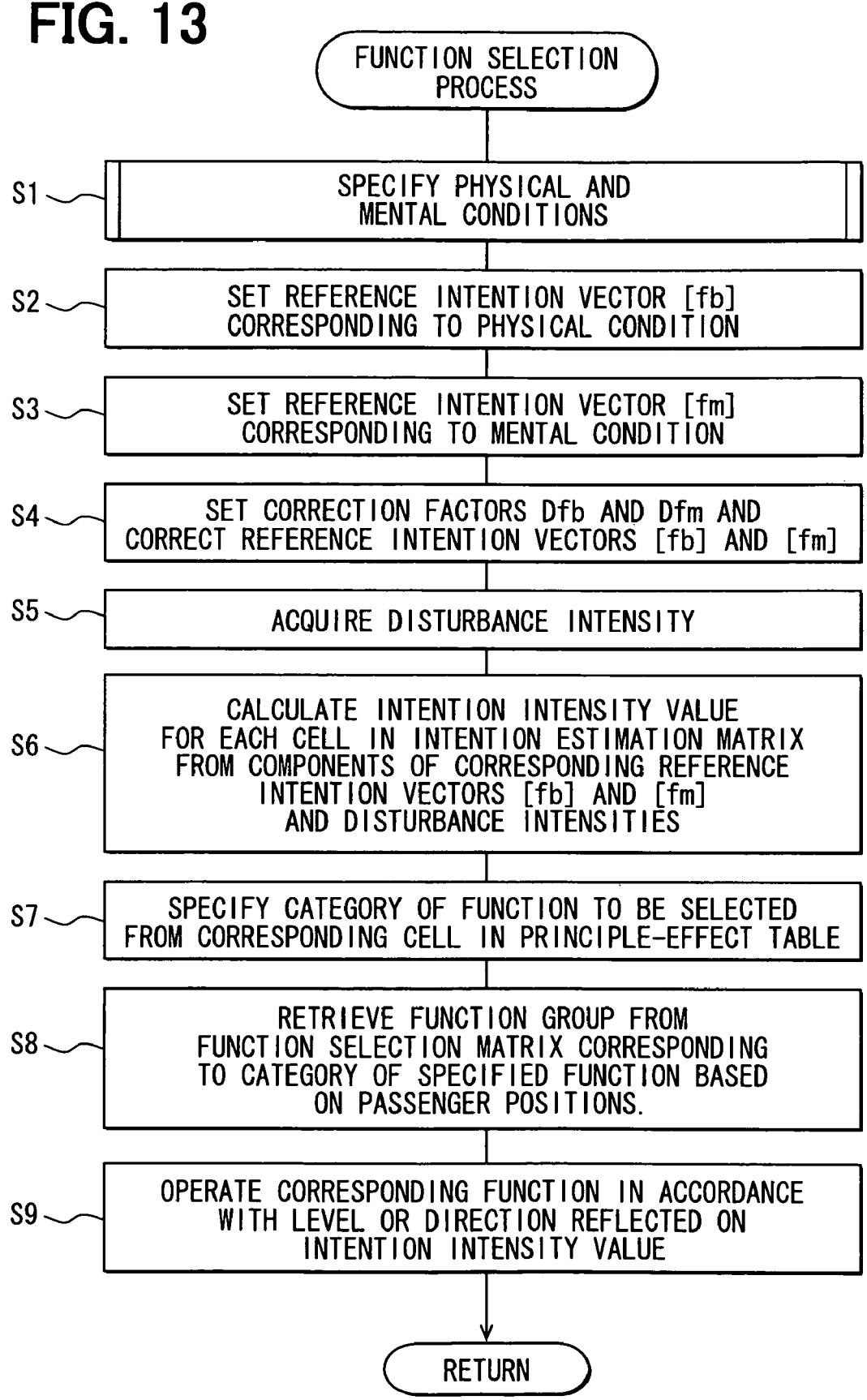
FIG. 13 is a flow chart showing an example of function selection processing.

Concrete selection and decision of a function are made in steps S7 and S8 in FIG. 13 by using a principle search table 372 shown in FIG. 21 and a function determine table 373 shown in FIG. 22. Although the principle search table 372 has a similar cell structure with that of the intention estimation table 371, the principle specific information for determining or specifying the principle of a function is stored in each cell as function specific information. The function determine table 373 is a two-dimensional table, which is accompanied the principle search table 372, associating and linking each principle specific information and an individual function mutually, and stores the function adoption priority information, which shows the adoption priority according to a seat of the individual function, in each cell of the table.

Here in after, the embodiment is explained in detail by referring a portion relating to the reference intention vector for the mental condition as a representative. A fundamental processing flow for a portion relating to the reference intention vector for the physical condition is similar to the above. FIG. 19 is a view showing an extracted part for setting the reference intention vector VFM for the mental condition of the intention estimation table 371. FIG. 21 is a view showing an extracted part of a corresponding part of the principle search table 372. In FIG. 19, components fm1, fm2, fm3, fm4, fm5, fm6, and fm7 of the reference intention vector VFM for the mental condition are initially set to 1, 1, 0.2, 0.2, 0.2, 0.8, and 0.8 respectively. The components are corrected by Dfm, which is 0.8 here, into values 0.8, 0.8, 0.16, 0.16, 0.16, 0.64, and 0.64, and are stored on the intention estimation table 371. On the other hand, regarding the intensity of light which is visual disturbance, since the minimal value −1.0 out of five steps is detected, setting value of the intention power parameter in corresponding cells are −0.8, −0.8, −0.16, −0.16, −0.16, −0.64, and −0.64.

For example, in a corresponding part on the principle search table 372 of FIG. 21, as a principle specific information of the visual, "displayed interiorly" (rational) and "illuminated interiorly" (emotional) are respectively stored in the intention item boxes identified by the eliminate unpleasantness, the eliminate source of stress, and the strengthen communication. The blank cells on the principle search table 372 shows no corresponding function principle exists. The former one is connected to a function to change a display mode of indicators on the meter, the car-navigation system, or the car-stereo, etc. to a lighted mode for night time or dark place on the functional determine table 373 of FIG. 22. However, the illustration is omitted in FIG. 22. The latter one is the lighting in the passenger compartment. On the functional determine table 373 of FIG. 22, in the boxes identified by the interior effect, the visual effect, and the illumination, it is instructed to select corresponding functions with a priority "3" for illumination devices, which are provided with the lighting 511 in the car shown in FIG. 1, arranged to illuminate corresponding place on an upper portion and a lower portion at every seat on the front and back, and right and left respectively. The upper and lower corresponds to a step portion and ceiling. For example, setting of a corresponding intention power parameter is −0.8, which corresponds to a quite dark, therefore, the hospitality control section controls the display and/or illuminations with a radiant power output corresponding to +0.8 in order to cancel the setting in a step S9 in FIG. 13.

In FIG. 19, regarding the airflow temperature (power) categorized as the tactile disturbance, a mid-small value −0.5 is detected out of five steps, therefore, settings of the intention power parameter of corresponding cells are −0.4, −0.4, −0.08, −0.08, −0.08, −0.32, and −0.32.

Referring to the corresponding part of the principle search table 372 of FIG. 21, as the principle specific information for the tactile, the "inner air-conditioner" (emotional) is stored in the intention item box identified by the eliminate unpleasantness, the eliminate source of stress, and the eliminate heat or cold. This is connected to an air-conditioner function on the functional determine table 373 of FIG. 22. However, the illustration is omitted in FIG. 22. For example, setting of a corresponding intention power parameter is −0.4, which corresponds to a cool, therefore, the hospitality control section controls the air-conditioner to warm up the passenger compartment with a heating power corresponding to +0.4 in order to cancel the setting in a step S9 in FIG. 13.

As a principle specific information, "illuminated interiorly" (emotional) is stored in the intention item box identified by the eliminate unpleasantness, the dissemble and the make insensitive to stress. The corresponding function is an adjustment of a lighting color. The apparatus changes the lighting color to shift to the long wavelength side, e.g., yellow, amber, red, pinks, or white light which slightly colored with the above color. These lighting colors are categorized as the warm color, and it is because it excels in stage effects with warmth, or it contributes to uplift a feeling.

As a principle specific information, "all illuminated interiorly" (rational) is stored in the intention item box identified by the acquire pleasantness, the favorite or image is available, and the provide interested information. On the functional determine table 373 of FIG. 22, the information output function, which provides guide information of the institutions (e.g., a teahouse, a pool, etc.) offering a feeling of cool, of the car navigation system is connected. However, the illustration is omitted in FIG. 22. For example, as the principle specific information, "sound or voice generated interiorly" (emotional) is stored in the intention item box identified by the provide favorable impression. On the function determine table 373 of FIG. 22, an output function of sound for inducing feeling of cool such as a little stream, a wave, or a wind is connected. However, the illustration is omitted in FIG. 22.

In FIG. 19, regarding the sound (power) of the auditory disturbance, since it is detected the maximal value +1.0, i.e., considerably noisy, out of five steps. Therefore, settings of the intention power parameter of corresponding cells are 0.8, 0.8, 0.16, 0.16, 0.16, 0.64, and 0.64. Referring to the corresponding part of the principle search table 372 of FIG. 21, as the principle specific information for the auditory, the "sound prevented interiorly" (emotional) is stored in the intention item box identified by the eliminate unpleasantness, the eliminate source of stress, and the eliminate noise. The information is connected to the noise canceller 1001B on the functional determine table 373 of FIG. 22. However, the illustration is omitted in FIG. 22. For example, setting of a corresponding intention power parameter is 0.8, therefore, the hospitality control section controls the noise canceller 1001B to cancel the noise in the passenger compartment with an output power corresponding to +0.8 in order to cancel the setting in a step S9 in FIG. 13.

As a principle specific information, "music generated" (emotional) is stored in the intention item box identified by the acquire pleasantness, the favorite or image is available, and the provide interested information. On the function determine table 373 of FIG. 22, a music output function of the car stereo is connected. However, the illustration is omitted in FIG. 22. A music source is appropriately selected in accordance with a present physical and/or mental condition in the step S9 in FIG. 13.

Figure 28:
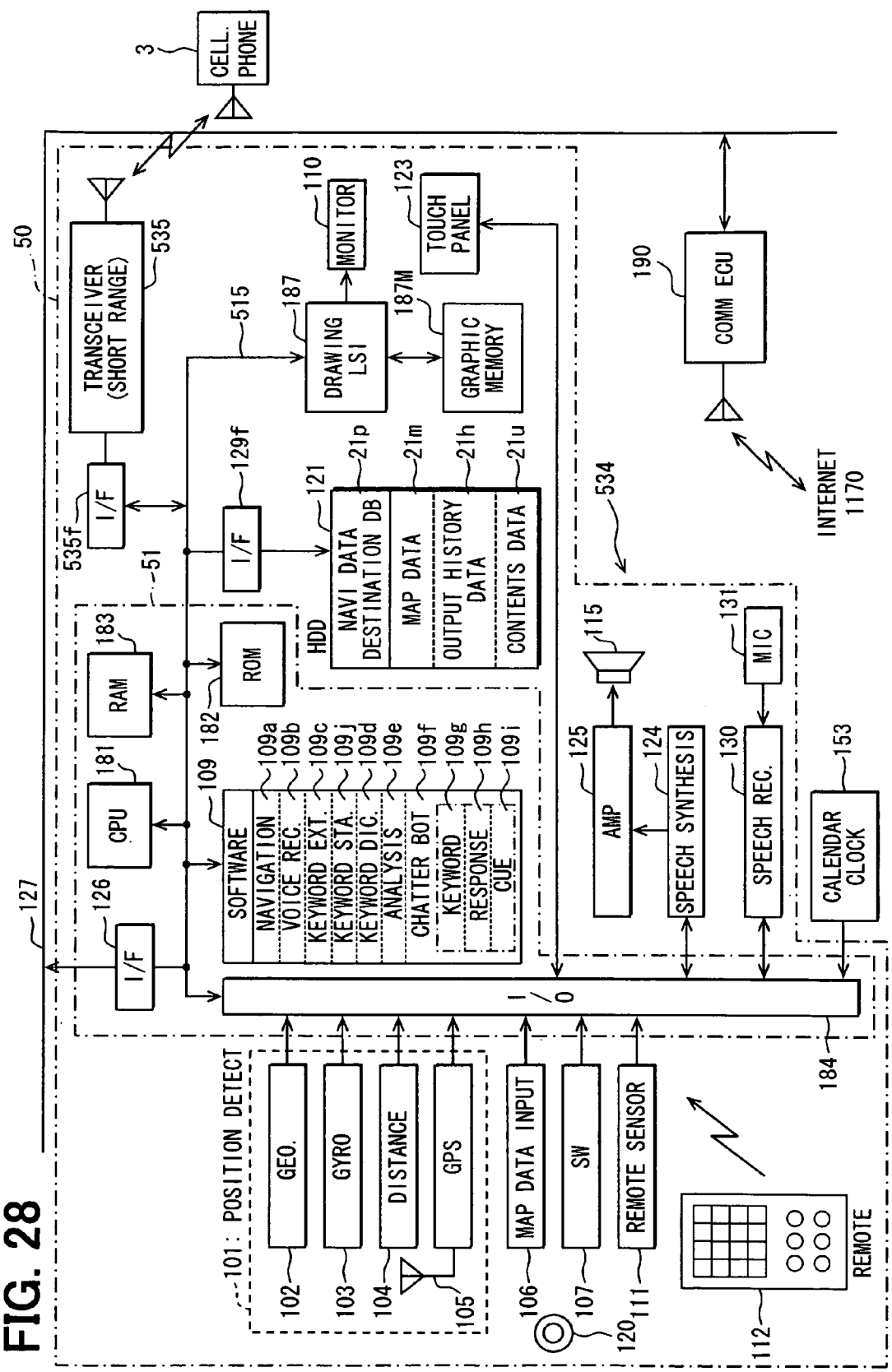
FIG. 28 is a block diagram showing an example of an electronic configuration of an information providing apparatus for vehicle constituted as a car-navigation system.

Next, FIG. 28 is a block diagram showing an example of configuration of the car-navigation system 534. The car-navigation system 534 provides an information providing apparatus for the vehicle. The car-navigation system 534 includes a position detecting sensors 101, a map data input device 106, a set of operation switches 107, a remote control sensor 111, an electronic speech synthesis circuit 124 for providing a voice guidance, etc., a loudspeaker 115 for voice output, a flash memory 2809 that is nonvolatile memory, a monitor display 110 provided by a LCD etc., an information system ECU 51 for providing a main control section, a remote control terminal 112, and a HDD (a hard disk drive) 121 for providing a main memory. The information system ECU 51 is operatively connected with the other above mentioned devices.

The position detecting device 101 has a well-known magnetic field sensor 102, a gyroscope 103, a distance sensor 104, and a GPS receiver 105 for GPS which detects the location of the vehicle based on the radio wave from satellites. Since each has an error from which character differs, the sensors 102, 103, 104, and 105 are arranged and used to complement each other. Alternatively, depending on a required accuracy, the system may include only a part of the above mentioned sensors, and may includes additional sensors such as a rotation sensor of the steering, the wheel rotation sensors of rotatable wheels, etc.

For the set of the operation switches 107, it is possible to use mechanical switches etc., but in the embodiment, the system also includes a touch panel 122, which is unitary formed with the monitor 110, for providing a software button. The touch panel enables it to recognize an operation condition which is obtained by touching the touch panel area corresponding to a button image displayed on the monitor 110. It is possible to input various directions with the set of the operation switches 107 and the remote control terminal 112.

It is also possible to use the speech recognition unit 130 to input various directions in addition to the operation switches 107 and the remote control terminal 112. This inputs a voice from the microphone 131 connected to the speech recognition unit 130; carries out speech-recognition processing by the speech recognition technology available, and changes the input voice into operating command according to the recognition result.

Information system ECU 51 is mainly made of a micro computer hardware in which a CPU 181, a ROM 182, a RAM 183, the above-mentioned flash memory 109, and the input and output part 184 are connected via a bus 515. The HDD 121 is connected to the bus via an interface 129f. Similarly, a drawing LSI 187, which carries out image outputting to the monitor 110 based on drawing information for displaying a map and a navigation operation screen, and a graphic memory 187M for drawing processing are connected to the bus. Further, the above-mentioned monitor 110 is connected to the above. The CPU 181 performs controls based on a navigation software 109a and data stored in the flash memory 109. A control of reading and writing of data of the HDD 121 is performed by the CPU 181.

The map data 21m containing road data and navigation data 21d which includes data of destinations and guide information of destinations are stored in the HDD 121. The HDD 121 also stores output history data 21d and contents data 21u. It is possible to rewrite the contents of those data by instructing the apparatus via operation of the operation switches 107, operation of the remote control terminal 112 or voice commanding of an audio input. It is also possible to update the contents of the HDD 121 based on data read from the storage medium 120 using the external information input-output device, i.e., the map data input machine 106. In this embodiment, the information system ECU 51 is connected to the serial communication bus 127 providing a network in the car via a communication interface 126, and exchanges data among other control devices in the car, such as a vehicular body system ECU and an engine control ECU, not illustrated.

A communication ECU 190, i.e., a wireless access means, including a wireless transmission and reception part for the internet connection is connected to the serial communication bus 127. The browser software 109d is installed in the flash memory 109. Therefore, the system can access a contents providing server 500, i.e., an information service server, shown in FIG. 29, which obtains websites, via the communication ECU 190 by specifying the URL, and can retrieve files of the contents. Contents of the file, i.e., contents of the homepage, is served via the monitor 110 in case of image including an animation and a still image, and via the speaker 115 through the amplifier 125 in case of sound. The flash memory 109 is also installed with interest analysis software 109b, a key word dictionary 109c, and a chatterbot engine 109e. The detail of above feature is described later.

The monitor 110 is constructed by the color liquid crystal display. The system displays a present position mark of the vehicles inputted from the position detecting sensors 101, map data 21m inputted from the HDD 121, and additional data, such as a route guidance displayed on the map, on the monitor screen in an overlapped manner. Further, as mentioned above, the touch panel 122 is overlayed thereon, therefore, the monitor 110 also displays function buttons for destination setting, display setting, various function calls, screen changing operations, etc. when need arises.

In the car-navigation system 534, the navigation program 21p is started by the CPU 181 of the information system ECU 51. Then, a driver chooses a desired destination from the destination data base 21d by operating the operation switches 107, the remote control terminal 112, or the audio input from the microphone 131. For example, the following processing are carried out, when a route guidance processing for displaying a route to the destination on the monitor 110 is chosen from the menu displayed on the monitor 110. That is, the system inputs a destination based on a driver's operation via the map or a destination choice screen on the monitor 110, and performs a processing for searching an optimal route to the destination from the current position which is acquired based on the satellite data obtained from GPS receiver 105. Then, the system provides guidance of the optimal route to the driver by displaying a guidance route on the road map on the monitor 110 in an overlapping manner. A Dijkstra method etc., are known as a method for setting an optimal route automatically. The system further performs a reporting of message indicating an operational condition, and/or providing a guidance for operation by using at least one of the monitor 110 and the speaker 115.

Figure 30:
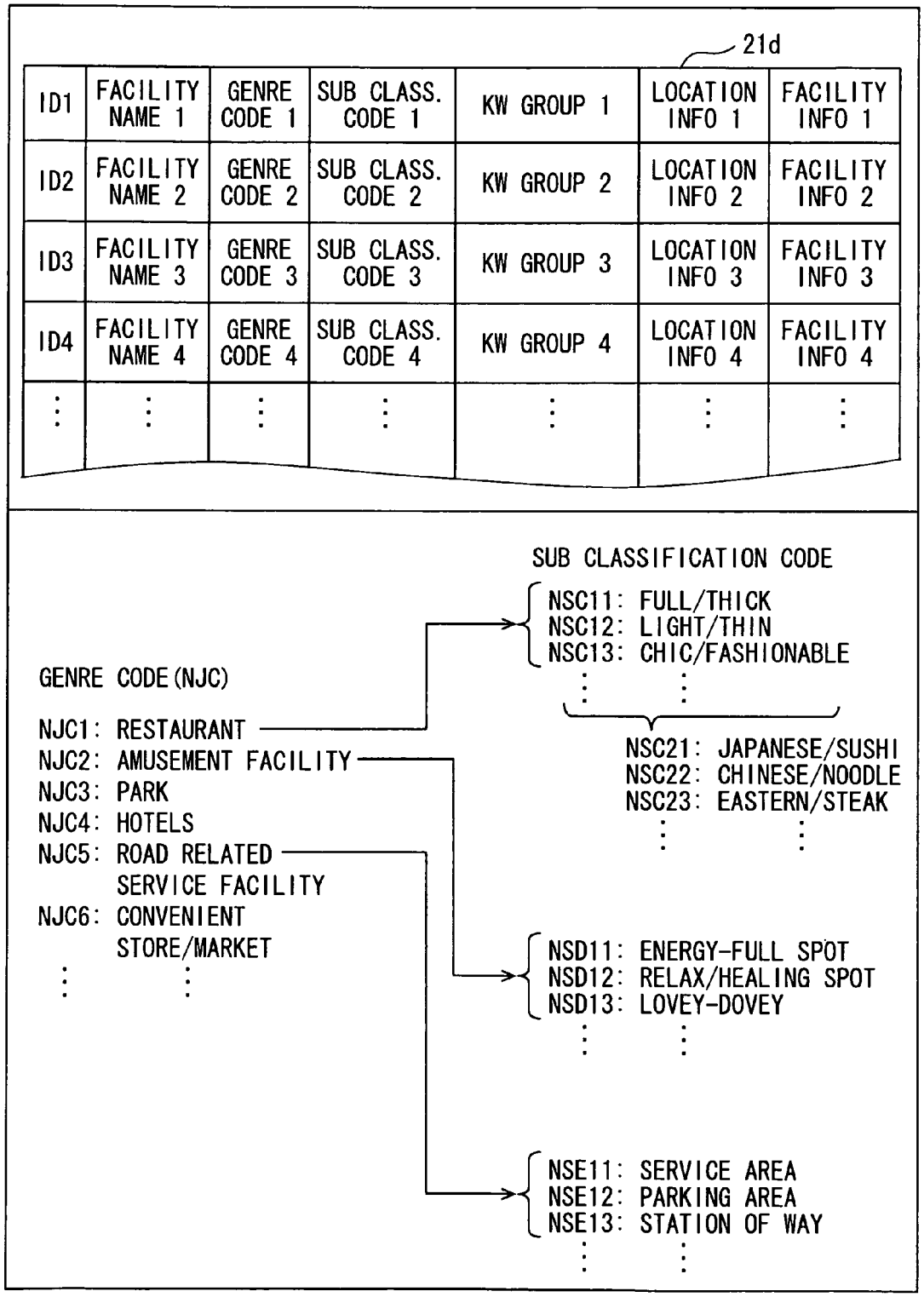
FIG. 30 is a schematic diagram showing an example of navigation data.

FIG. 30 shows configuration of contents of the destination data base 21d in which each of the location information of destinations is attached and associated with an ID for pinpointing each destination, a classification information and keywords. The keywords are selected from a keyword group registered in the key word dictionary 109c shown in FIG. 28, which is a keyword group for determining a user interest, so that the keywords have a close relationship with the destination.

On the other hand, the classification information includes a genre code and a sub classification code. The genre code classifies the institution, which is selectable as the destination, according to the purpose classification, such as a restaurant, an amusement facility, a park, a hotel, a road related service facility, a convenience store, a supermarket, etc. Among these, the restaurant, the road related service facility, a convenience store, a supermarket, etc. are categorized as an food providing facility where it is possible to have a drink and food.

Each genre code is further categorized by attached sub classification code which suites the genre code. For example, in the case of the restaurant, the classification of the sub classification code is determined so that it is enabled to select the destination in accordance with the user's physical and/or mental condition by taking an effect of the hospitality into consideration. For example, the restaurant, which should be chosen when the user feels a good physical condition, feels a good appetite, or is in a high hunger degree, is classified with a sub classification code corresponding to a priority for fullness, such as a full and thick food. This kind of restaurant may be suit for youth or manhood. The restaurant, which should be chosen when the user does not feel a good physical condition, does not have a good appetite, or is not so hungry, is classified with a sub classification code corresponding to a priority for lightness, such as a light and thin food. This kind of restaurant may be suite for woman. For example, the restaurant, which should be chosen when the user is depressed and wants to change feeling, or wants to increase a lovely feeling with other person, is classified with a sub classification code indicating a priority for comfortable atmosphere, such as a chic and fashinable food. Further, another sub classification code, which indicates a general food or cooking kinds, such as "Japanese style and Sushi", "Chinese and Noodle", and "European and Curry", is also provided separately and may be selected.

For example, in the case of the service provision institution for a recreation or entertainment purpose, such as an amusement facility or a sightseeing spot, the classification of the sub classification code is determined so that it is enabled to select the destination in accordance with the user's physical and/or mental condition. For example, the facility, which should be chosen when the user feels a good physical condition, or wants to have a cheerful and active service, is classified with a sub classification code corresponding to a priority for physical or mental relief, such as a energy full spot. This kind of facility may be suit for youth or manhood. The facility, which should be chosen when the user does not feel a good physical condition or even feels tired, is classified with a sub classification code corresponding to a priority for suppressing exhaustion, such as a relaxing and healing. This kind of facility may be suite for woman. The sub classification code focused on comfortable atmosphere, such as a lovely spot, is given to the facility or institution which should be chosen to heap up a mood in a couple etc.

On the other hand, the road relating service institution is further categorized with a sub classification code indicating a service area on a highway, a parking area on a highway, a station of a way, and a drive-in area.

Figure 45:
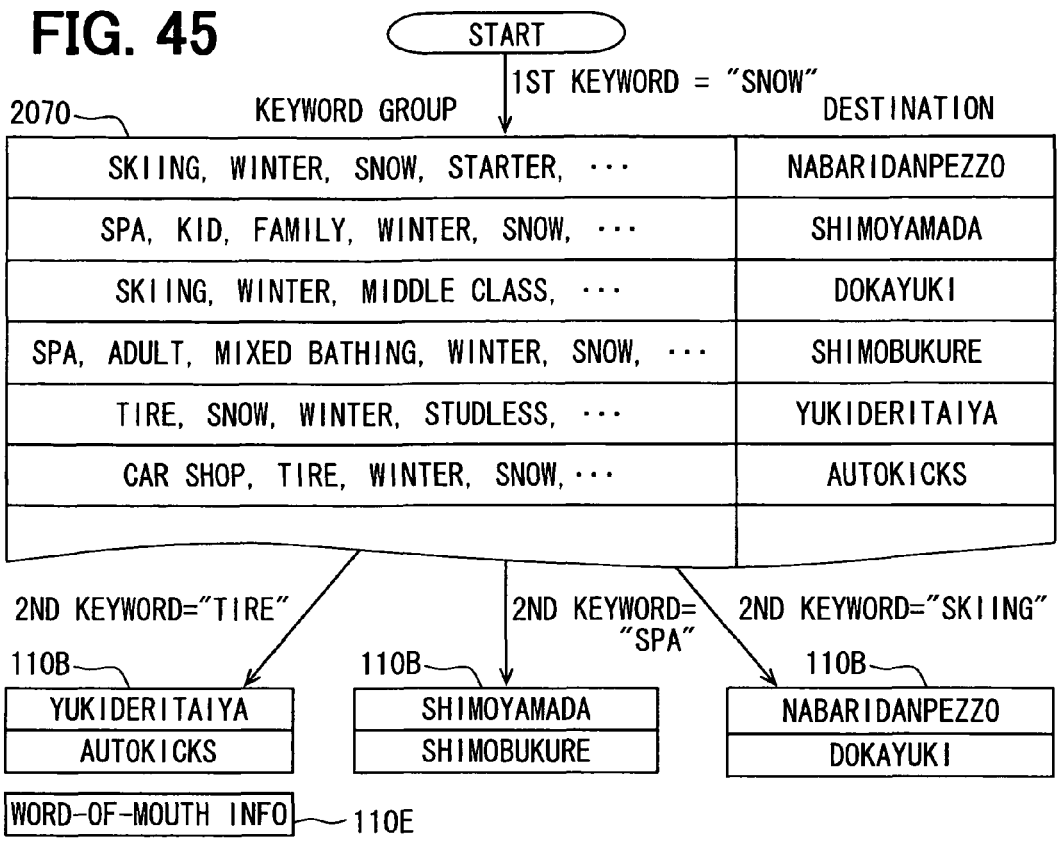
FIG. 45 is a schematic diagram showing a second to a fourth examples of output of the search results in the case of performing narrowing process.

In destination data base 21d, a content explanation information of each facility or destination, i.e., a contents information of the facility, is also stored in an associated and linked manner. The system displays contents explanation information corresponding to the selected destination on the screen as shown in FIG. 45 or outputs it in a voice form, so that the user may confirm the contents before arriving at the destination and use it as one of selection aid.

Figures 41, 42:
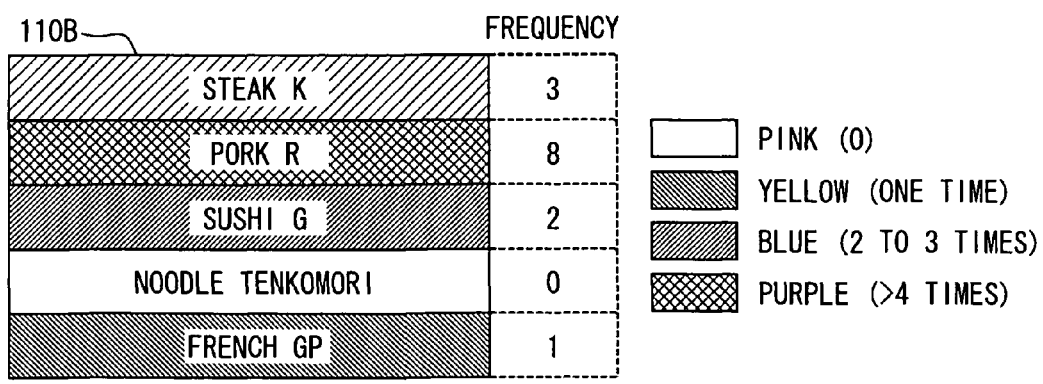
FIG. 41 is a schematic diagram showing an example of output history data.
FIG. 42 is a schematic diagram showing a first example of output of a search result.

Next, an output history data 21d in the HDD 121 records and stores visited destination histories (destination history) within a past predetermined period, e.g., one to five years, or to a predetermined numbers, e.g., 30 to 300 destinations, in an associated and linked manner with a visiting day, a user name, a classification, and visiting frequency, as shown in FIG. 41. Update of the output history data 21d may be performed at a timing when a route guidance to the destination by the car-navigation system is completed. At the update timing, the visited destination history may be newly stored in the output history data 21d, or the visiting frequency for the existing destination may be incremented. A user identification may be performed by the well-known face authentication technology using a captured image after capturing a face of user on each seat by the camera provided for each seat. In this case, the user needs to register a face image and a user name into the registration part formed in the flash memory 109 in advance.

Contents files, which were already downloaded and viewed, from websites that are related to the visited destinations, are stored in a contents data 21u in the HDD 121, and are prepared for reviewing at any time. Although it is not illustrated, image data, music data, etc. different from the contents files of the websites are associated with and linked to the group of keywords and a destination name reflecting the user interest, and are also prepared in the contents data 21 as service information.

The speech recognition software 109b, which provides a speech recognition means, stored in the flash memory 109 performs a processing which carries out the transliteration of the spoken language which a user inputs from the microphone 131 by a well-known available algorithm using the Hidden Markov Model. More specifically, the character string obtained as a result of the speech recognition is processed and decomposited into words by a well-known morphological-analysis technique, and is recognized in the decomposited words form.

The chatterbot engine 109e has a conversation support base data including a reference keyword dictionary 109g, and a response sentence models 109h, and is provided as a main part of a conversation support means. A plurality of reference keywords determined previously for supporting conversation are registered in the reference keyword dictionary 109g. The chatterbot engine 109e extracts a reference keyword which is the word extracted by a character string matching performed by referencing a reference keyword dictionary 109g and by conducting the morphological analysis of the conversation entry content by a user.

The response sentence models 109 are conversational-sentence data having an insertion blank part for a leading keyword, and are stored in a form for associating with and linking to the reference keywords. The chatterbot engine 109e reads a response sentence model from the response sentence model storage section one by one in response to a completion of a conversation input by a user. The chatterbot engine 109e creates a conversation response for leading a user to the next conversation input by filling the insertion blank in the response sentence model with a leading keyword for inducing the next conversation input. The leading keyword is the extracted reference keyword or another reference keyword associated beforehand with the extracted reference keyword within the keyword dictionary. The created conversation response is outputted from the speaker 115 which provides a response sentence output means.

The chatterbot engine 109e extracts a reference keyword which is the word extracted by a character string matching performed by referencing a reference keyword dictionary 109g and by conducting the morphological analysis of the conversation entry content by a user. At this time, the apparatus does not conduct a syntax analysis for determining modification relation and the grammatical logic analysis for word arrangement. That is, the chatterbot engine 109e functions as an automatic chatting program which can function by performing the character string matching, a reading out processing for the response sentence model 109h associated beforehand with a reference keyword, i.e., a matched character string, and a filling or inserting processing of the leading keyword associated beforehand with the above-mentioned reference keyword into the response sentence model 109h.

The conversation support base data, which includes the reference keyword dictionary 109g and the response sentence models 109h, includes a plurality of sub-sets of the conversation support base data each of which has different contents adapted to a predetermined conversation support scenes. The chatterbot engine 109e detects an occurrence of a specific conversation support scene based on various methods explained below, and switches sub-sets of the conversation support base data to one that is adapted to the determined conversation support scene. In addition, the conversation support base data may includes sub-sets containing different contents for seasons.

The flash memory 109 further stores the conversation cue phrases 109i, which is included in the conversation support base data, prepared for every conversation support scene. The apparatus reads a corresponding conversation cue phrase in response to a detection of the occurrence of a specific conversation support scene, and outputs it from the speaker 115. Therefore, it is possible to provide information in a timely manner by enabling it to determine the user interest object in the scene promptly by outputting the conversation cue phrase spontaneously from the system side in response to the occurrence of the conversation support scene.

In this embodiment, an example for determining a start-up scene of a car, a user's hungry scene, a fatigue or tired scene, and a changing a feeling scene is described. Among these, the start-up scene of a car can be determined by monitoring an operation condition of an ignition switch. The user's fatigue scene can be determined by detecting the physical condition and/or mental condition which already explained. Further, the hungry scene can be determined by an energy management and a time measuring for a core meal time as mentioned later. In the start-up scene, the apparatus switches to a sub-set of conversation support base data which is suitable in order to pull out interest object information about final destination. In the hungry scene, the apparatus switches to a sub-set of conversation support base data which is suitable in order to pull out interest object information about a meal contents from the user. In the fatigue scene, the apparatus switches to a sub-set of the conversation support base data which is suitable in order to pull out interest object information about a resting activity from the user.

Figure 31:
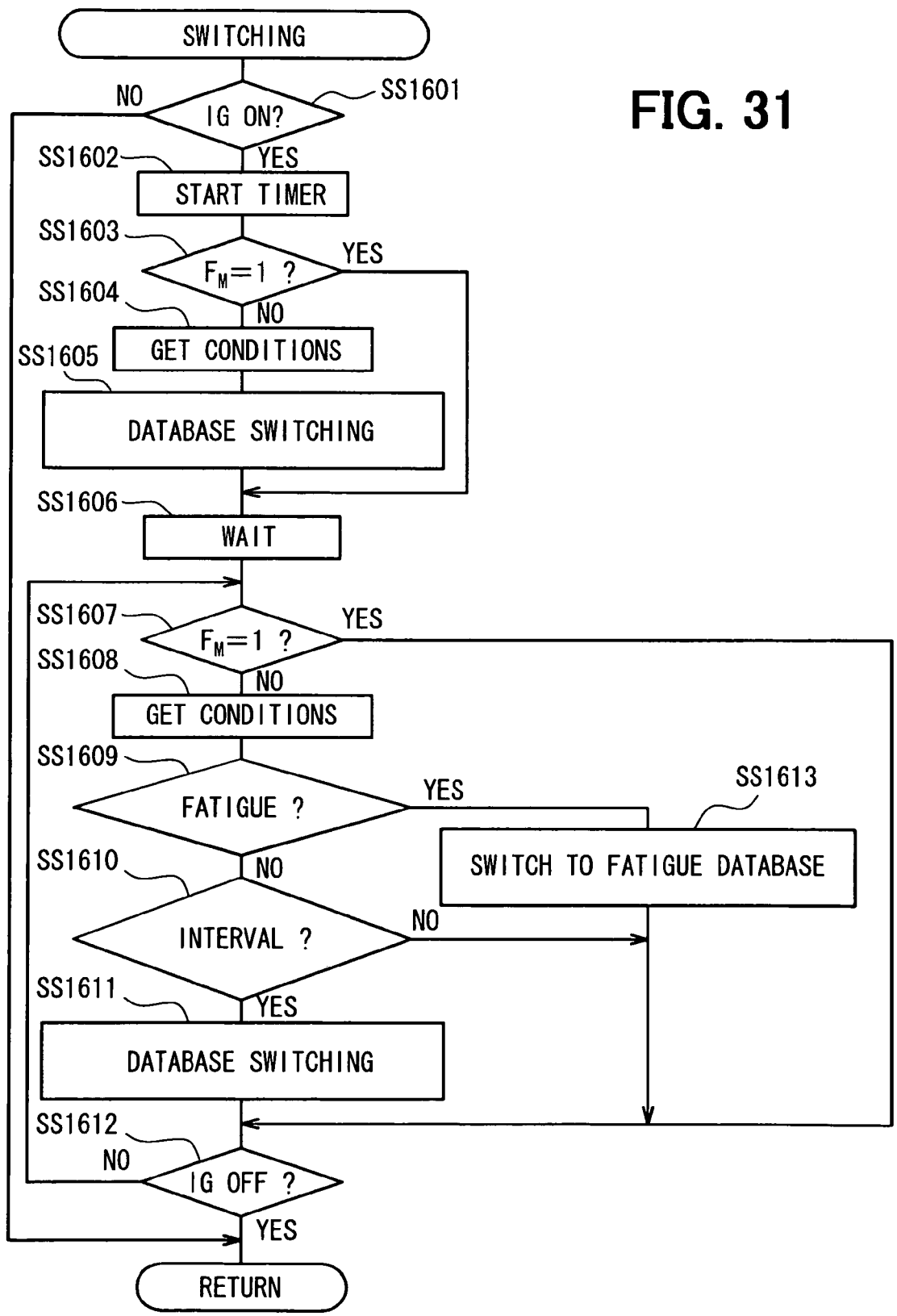
FIG. 31 is a flow chart in which a flow of a conversation support database selection process is shown.

FIG. 31 is a flow chart showing an example of a selecting and switching processing of the conversation support data base. In SS1601, it is checked whether the ignition switch has been set to ON. If it is set to ON, the apparatus judges that the start-up scene has come, and starts a timer in SS1602. Next, in SS1603, it is checked whether below-mentioned meal flag FM is "1", which means the occurrence of the hungry scene. Since the hungry scene does not come when FM=0, the apparatus proceed to SS1604 considering the start-up scene important, and acquires the physical condition and/or mental condition determined by the technique explained with FIG. 14. Subsequently, in SS1605, the apparatus initiates the chatterbot engine by selecting and switching to a sub-set of the conversation support data base for the start-up scene which suits the determined physical condition and/or mental condition, and outputting a conversation cue phrase. On the other hand, the apparatus determines that the hungry scene came when FM=1, and skips SS1604 and SS1605 to deal the scene by another routine processing.

Next, in SS1606, the apparatus waits for a fixed interval period, e.g., 30 minutes to 1 hour, which is set by estimating scene transition. Then, the apparatus proceeds to SS1607 and read the meal flag FM again. The apparatus proceeds to SS1608 and acquires the physical condition and/or mental condition again, when FM=0, which indicates that the hungry scene did not come. If FM=1, the apparatus judges that the hungry scene has come and skips steps from SS1608 to SS1611 to deal the scene by another routine processing. Then, in SS1609, it is checked whether it has been changed from the condition of not getting fatigued to a fatigue condition by comparing the presently acquired physical condition and/or mental condition and the physical condition and/or mental condition acquired last time. The apparatus judges that the fatigue scene came when it changes to a fatigue condition, proceeds to SS1613, selects the conversation support database for the fatigue scene, and starts the chatterbot engine by outputting a conversation cue phrase.

On the other hand, when it is not in the fatigue condition, it proceeds to S1610, and it is judged whether the fixed interval time, for example, above-mentioned interval period, e.g., 30 minutes to 1 hour, from the last start of the chatterbot engine. The apparatus judges that the changing a feeling scene came when the fixed interval time has elapsed, proceeds to SS1611, selects the conversation support database for the changing a feeling scene, and starts the chatterbot engine by outputting a conversation cue phrase. If the fixed interval time has not elapsed in SS1610, the apparatus skips SS1611. In SS1612, the apparatus checks whether the ignition switch has been turned to off, and returns to SS1607 if the ignition switch is not turned to off to repeat the following processing. If the ignition switch is turned to off, the apparatus finishes the process.

In the above embodiment, the occurrence of the start-up scene is detected by determining whether the ignition switch was set to ON, but alternatively, the occurrence of the start-up scene may be detected by a remote control from the outside of the car using portable apparatus etc., a presetting by a hospitality system, or an approach detection of the user to a vehicle, etc. In this case, it is considered appropriate to judge the start-up scene has come in response to simultaneous occurrence of both ON operation of the ignition switch and a detection of the user in the passenger compartment.

Next, it is described about the occurrence of the hungry scene and another processing flow performed in this case. If the user becomes hungry, it is possible to externally detect many signals such as that the user becomes silent, and the user becomes irritated etc. Although it is not necessarily impossible to detect those signals as the above-mentioned living body information, in actual cases, it is still sometimes difficult to correctly discriminate a simple bad physical condition with no hunger, or a mentally depressed condition. In order to address the difficulties above, the apparatus may include a time measuring means for measuring time period in the vehicle side. The apparatus judges the occurrence of the meal time set beforehand based on a measured time information acquired by the time measuring means. As a result, it is possible to use a judging result of the meal time as degree information of hunger. Alternatively, the apparatus may measure an elapsed time after a user's meal and may use the after-meal elapsed time as degree information of hunger. Of course, it is also possible to use this method together with the method for judging the occurrence of meal time based on the above-mentioned time information.

Figure 32:
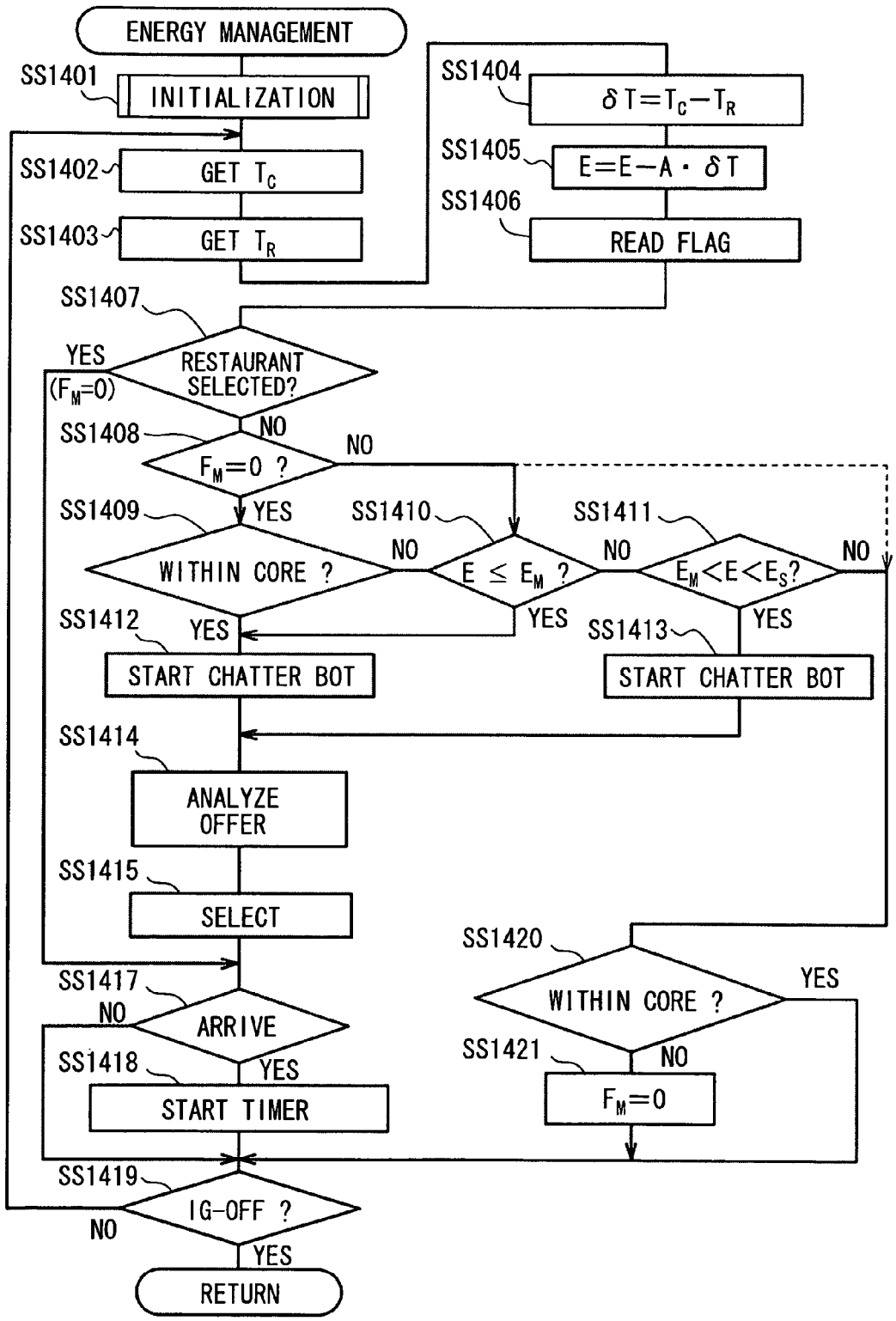
FIG. 32 is a flow chart in which a flow of energy-management processing is shown.

In this embodiment, the apparatus performs a management processing based on a flow shown in FIG. 32, by using the degree information of hunger as a body energy information, i.e., energy-management processing. The processing is executed by the ECU 51 of the car-navigation system 534 shown in FIG. 28 in parallel with a processing of FIG. 31 by using a turning on of the ignition switch as a trigger. SS1401 is an initialization process for setting an initial holding energy of the user at the starting time of use of the vehicle. The details are shown in FIG. 32. In SS1501, it is checked whether the ignition switch has been set to ON. In SS1502, it is checked whether it is the first engine start of the day. It is possible by monitoring time based on a calender clock 153. If it is Yes, the apparatus proceeds to SS1503 and resets the meal flag FM, i.e., a confirmation information for a meal, and a meal management timer, i.e., a time measuring means prepared for a purpose of determining a completion of a meal. The meal flag FM indicates a before meal if it is 0, and indicates an after meal if it is 1.

In SS1504, a current time TC is acquired from the calendar clock 153. In steps from SS1505 to SS1507, it is checked that whether the current time TC is in one of meal core times, such as aimorning core time, a lunch core time, and a dinner core time. For example, the morning core time is from 5:00 to 10:00, and has a morning reference time at 8:00. For example, the lunch core time is from 11:00 to 14:00, and has a lunch reference time at 12:30. For example, the dinner core time is from 17:00 to 22:00, and has a dinner reference time at 19:00. That is, a judgment of an occurrence of a meal guidance timing is performed by determining whether the current time TC is in the meal core times predetermined by considering time ranges where an ordinary person has a meal with high probability.

If the current time TC is not within any one of the meal core times, the apparatus considers that the user has not had a meal till the present after a meal within the last meal core time, proceeds to SS1508, and sets meal flag FM to 0. In SS1509, the apparatus calculates an elapsed-time DeltaT by DeltaT=TC−TM, where TM is the reference time of the last meal core time and is assumed as a last meal time. In SS1509, the apparatus sets the initial holding energy E by calculating E=Emax−A*DeltaT, where A is an energy mortality factor.

Emax is defined as a value of the energy obtained when the user has a meal upto full from a hungry condition. Although the setting of Emax itself may be arbitrary, in this case, it is necessary to determine the energy mortality factor A which shows the energy consumed volume per unit time so as to decrease to a predetermined minimum energy Emin just before the next meal. For example, assuming that the user had a lunch at the reference time 12:30, assuming the user started having a dinner at 18:30 that is 30 minites, i.e., it means time during dinner, before the reference time, and it is determined that the minimum energy Emin just before the dinner shall be at 0.4Emax, then the energy mortality factor A may be set at 0.1Emax. Since meal intervals and degree of hunger are different depending on a cycle such as a breakfast, a lunch, a dinner and a breakfast, the variables Emax, Emin and A may be set to have different values respectively according to a present meal interval between which meals.

On the other hand, when current time TC is within one of meal core times, it proceeds to SS1510. At this time, it is hard to know that whether the user may get into the car after having a meal, or the user may get into the car before having a meal and may think that he will dine out by somewhere. Such things are matters which are not usually known if it does not check with a question to a user. Generally, if there is a visitor who should be treated at the time of a meal, it is considered probably the common sense or good hospitality to confirm by asking "Did you have a meal?"

So, in SS1510, the apparatus outputs a question for confirming whether the user had a meal or not from the speaker. The question may be outputted in a voice form or a character form on the monitor 110. A reply may be a direct answer in a voice form, a speech recognition for recognizing contents of the reply is necessary in this case, or a manual entry from the input unit of the touch-panel 122 etc. If the reply is "Before a meal", the apparatus proceeds to SS1512 and sets the holding energy to Emin, and then sets the meal flag FM=0, which means a before a meal condition, in SS1513. If the reply is "After a meal", the apparatus proceeds to SS1519 and sets the holding energy to Emax, an energy consumed volume A*DeltaT for an elapsed time from the reference time may be subtracted, and then sets the meal flag FM=1, which means an after a meal condition, in SS1513.

Next, if the engine start operation detected in SS1501 is not determined as the first start in the day in SS1502, this case may correspond to a case where a user once parked a car on the way of the destination, left the car for some reason, backed to the car again, and started the engine. In this case, the user may park the car for a meal. Of course, it is also possible to perform a method for determining whether a user had a meal or not based on a reply obtained for a question similar to SS1510. However, it may be unpleasant that a user is asked "Did you have a meal?" mechanically at every parking of a car. So, in this embodiment, the state of the meal flag FM is read in SS1514. If the meal flag is "1", it means that a series of processing to SS1520 was already executed in the last cycle, and since the value of energy is also updated, the apparatus complete the routine without doing anything.

Figure 29:
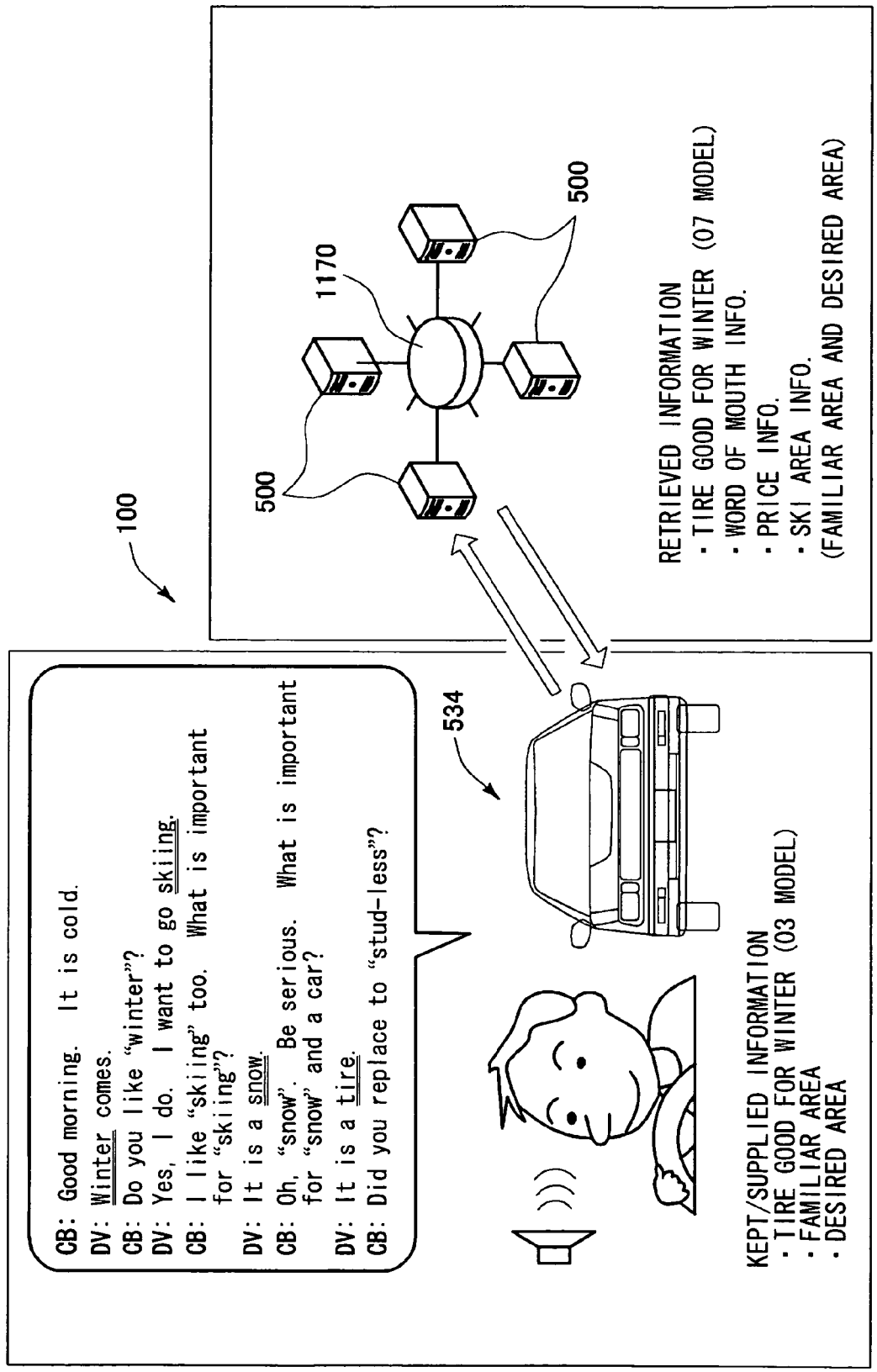
FIG. 29 is a figure which illustrates an operation of an information providing apparatus for vehicle with a first example of a conversation by a chatterbot.

On the other hand, if the meal flag is "0", as mentioned later in the main processing part in FIG. 29, it can be easily determined from the current position of the car whether the above-mentioned parking is a parking in the dining facilities or not, since it may be presumed that the dining facilities should be set as the destination in the car-navigation system. In SS1516, the apparatus reads a condition of the meal management timer, since the meal management timer starts measuring when an arrival to the dining facilities is confirmed as mentioned later. If the measuring time of the meal management timer shows a value more than TM corresponding to a completion of a meal in SS1517, the apparatus proceeds to SS1518 for resetting the meal management timer, then, proceeds to SS1519 for performing the above-mentioned processing at the time of an after meal is determined. On the other hand, if it is a value less than TM, including zero, the value of energy should be updated, therefore, complete the routine without doing anything.

Returning to FIG. 29, after completing an initial setting for the initial holding energy as mentioned above, the apparatus retrieves a current time TC in SS1402, and retrieves a last cycle time TR in SS1403. The last cycle time TR is the time retrieved in the last cycle as the current time TC. A time difference DeltaT=TC-TR is calculated in SS1404. The holding energy E is updated by subtracting a consumed energy for the time difference DeltaT in SS1405. Then, the apparatus proceeds to SS1406 and read the meal flag FM.

In SS1407, it is checked whether the car-navigation system is already set with a destination setting of dining facilities and is started a route guidance. In the case of No, the state of the meal flag FM is checked. If it is "0", which means a condition before a meal, the apparatus proceeds to SS1409, and checks whether the current time TC is in the above-mentioned meal core time or not. If it is within the core time, the apparatus determines that it is the occurrence of the hungry scene, and proceeds to SS1412 for switching to the conversation support database for the hungry scene, and for starting the chatterbot engine by outputting a conversation cue phrase. The contents of the conversation support database in this case are defined so that it is preferable to induce and find interest object information about a full-scale meal from a user.

Then, in SS1414, as described later in detail, a keyword analysis for the contents which the user inputted by following a leading of the chatterbot is conducted, and candidates of the meal related facilities matched with an analysis result are listed and displayed. In SS1415, the apparatus inputs a user's choice of desired meal related facilities resulted from referencing the display. The meal related facilities may be classified according to the classification of breakfast, lunch, and dinner, and it is possible to choose and search the meal related facilities which suit the present meal core time.

On the other hand, if the destination setting of meal related facilities is already completed in SS1407 in the last processing cycle, a series of processing to SS1415 is skipped. If the meal flag FM is "1" (after a meal) in SS1408, or if the current time Tc is outside a meal core time in SS1409, the routine proceeds to SS1410 for confirming the value of the present energy E. While boarding in a vehicle, a feeling of hunger may show an easily increasing tendency, and an interval from a lunch to a dinner usually becomes long, therefore, many people may have a snack. In addition, in a case of long continuous midnight run after a dinner, since there is long time to the next breakfast, a midnight snack may be required. Furthermore, if a meal becomes irregular for a certain reason, a meal may be needed out of the meal core time. In order to address the above, the apparatus determines a hungry situation which cannot be presumed from time by monitoring a value of the energy E which is obtained based on the elapsed time after a meal, and performs a processing for similarly providing a guidance to a meal facility when the hungry situation is determined.

In this embodiment, a plurality of threshold values Em and Es (Em<Es) for the energy E are set in a step like manner. When the energy E becomes smaller than the first threshold value Em of a lower side in SS1410, a processing for providing a guidance to the full-scale meal related facilities by a flow in SS1412 to SS1415. For example, the full-scale meal related facilities may include a general meal providing facility such as a restaurant, and a service area etc. with the similar facility. When the energy E becomes between the first threshold value Em and the second threshold value Es higher than the above in SS1411, the conversation support database for the hungry scene is chosen in SS1413, and the chatterbot engine is started by outputting a conversation cue phrase. The contents of the conversation support database in this case are defined so that it is preferable to induce and find interest object information about a light meal from a user. Hereinafter, sequential execution of the above-mentioned processing of SS1414 and SS1415 is carried out. If the energy E is higher than a threshold value, which is the second threshold value Es here, for determining that no meal is needed, any processing for providing guidance to meal related facilities is not performed. If the current time is outside the meal core time in SS1420, the meal flag FM is reset to "0" (before a meal).

Figure 33:
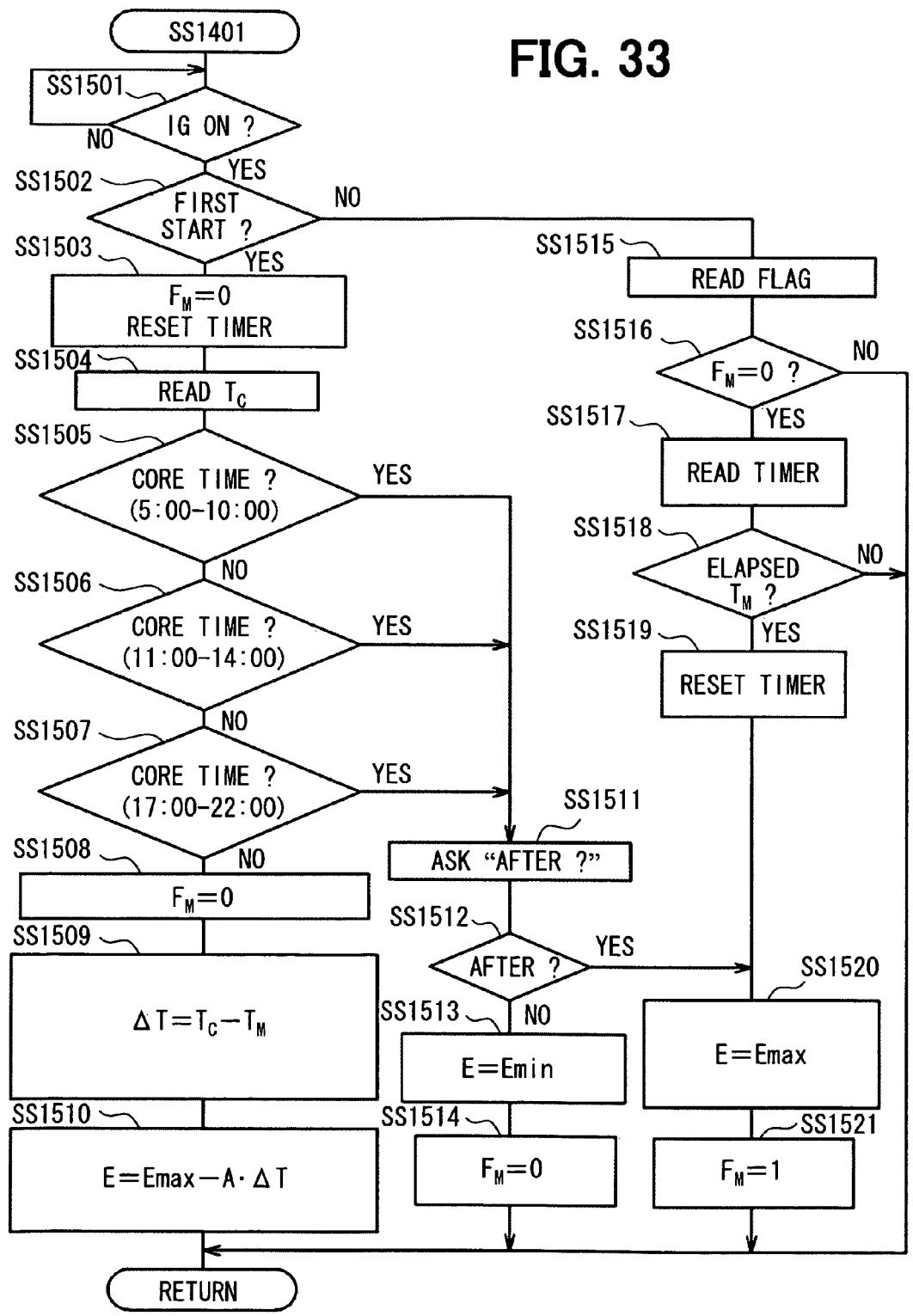
FIG. 33 is a flow chart in which a flow of the initialization process in FIG. 32 is shown.

In a case that a facility is set as a destination as mentioned above, the user may continue to drive the car by following a guidance display obtained by a well-known car navigation program processing. In SS1417, it is judged whether the car arrived at the selected facility or not. If it has arrived, the apparatus proceeds to SS1418 and starts the meal management timer. The SS1418 is skipped if the car has not arrived. If IG signal is continuously ON in SS1419, then, the apparatus returns to SS1402 and repeats the processing below. On the other hand, if IG signal is OFF, the apparatus completes an energy-management processing in this cycle. As mentioned above, the meal management timer is started at an arrival to the dining facilities, and is provided to determine the user already had a meal if a fixed time has elapsed when the engine is started at the next time, i.e., when the IG signal is turned to ON, by the processing from SS1516 to SS1520 in FIG. 33.

Actual examples of conversation in some scenes where leading conversation held are explained below. First, in the start-up scene, the apparatus uses the conversation support base data for inducing the interest object information relating to a final destination, i.e., information roughly indicative of where the user wants to go. An example of conversation for such a purpose is shown in FIG. 29. In the drawing, CB denotes words from the chatterbot, and DV denotes words from the user such as a driver. The first line is a conversation cue phrase. The apparatus selectively uses a plurality of subsets of the conversation support base data including the conversation cue phrase which differ in accordance with seasons. Identification of season is possible by referencing a measuring data in the calendar clock 153.

For example, if the season is winter, the chatterbot CB selects and outputs a conversation cue phrase suited for winter, such as "Good morning. It is cold."

Alternatively, it is possible to prepare various conversation cue phrases, such as "We also have off tomorrow. Forget a winter cold, and let's go out to play.", or "I was waiting. Please make me warm, in such a freezing day.", and select them at random with reference to a random number.

The apparatus may outputs the response sentence models in an orderly manner from a sequentially arranged fixed scenario, but a user may get bored immediately, since it is fixed pattern. This problem may be partially addressed by grouping a plurality of response sentence models, arranging a plurality of groups in a fixed scenario, and selecting a response sentence model randomly from each group. However, since there is no change in the scenario being fixed, if a conversation progresses to a direction which is out of the scenario, it may fall into the condition which cannot be managed.

In order to address above, it is possible to employ a method. In this method, combinations of an input and an output are stored as the dictionary. Then, the apparatus searches whether a specific reference keyword is included in an input string, and selects a response sentence model based on a dictionary. This method may be called as a dictionary reverse lookup type. If a big dictionary is prepared, it can respond to various situations. If no word stored in the dictionary is found, the apparatus is configured to return a vague reply which can understand in any way. This configuration is somehow arranged to avoid monotonous behavior by giving variations to such a vague reply.

The User DV is recommended to naturally reply to the suitable reply by taking it seriously without seldom inquiring. For example, if the chatterbot gives a seasonal subject, it is appropriate the user replies with seasonal subject. For example, if the user replies "Winter comes.", the chatterbot CB extracts "winter" as a reference key word, and creates and returns a conversation response which includes the same reference keyword. In the drawings, the reference keywords are indicated with double underlines.

For example, the apparatus stores "Do you like BLANK?" as a response sentence model associated with and linked to winter. Winter extracted as the reference keyword is assumed as a leading keyword, and is inserted into the blanked part indicated by BLANK in the response sentence model. As a result, the apparatus creates and outputs a conversation response "Do you like winter."

Since, the apparatus returns a response sentence in a form inserted with the specific word "winter" told by the user DV, the user DV has an illusion that the vehicle understands what he spoke. Therefore, for example, the user DV may speak an answer such as "Yes, I do. I want to go skiing."

Then, "skiing" is extracted as a reference keyword. Thus, in the case of the chatterbot, it proceeds a conversation only by character string matching for keyword extraction, and selecting a response sentence model associated with and linked to the keyword.

In such a simple system, a search hit probability of each item falls as the dictionary is improved. Therefore, for example, it is concerned that the vague reply is used too much.

Further, if the number of the choices to the extracted keyword increases too much (called what is called a frame problem or possibility explosion), the probability where a proper response sentence model and a leading keyword are selected decreases quickly. Therefore, it is concerned that the apparatus may become impossible to maintain conversation in a target direction. As a result, through a repetition of irrelevant replies, the user may lose a motivation to a conversation. Therefore, it is desirable to construct the chatterbot engine so that the apparatus induces an appropriate reply from the user by repeating one or more turns the response sentence models including the question item for leading a narrowing process of destination in order to prevent a blurring of a conversation direction. For example, in the above-mentioned user talk "Yes I do. I want to go skiing.", "skiing" is a keyword considered effective for narrowing destination. However, in this case, for example, it is not clear whether the user wants to go skiing or the user wants to prepare to go skiing. Therefore, it is not sufficient for determining a destination in which the user is interested.

In FIG. 28, the apparatus reads out a response sentence model "I like BLANK too. What is important for BLANK." which is stored in a manner that is associated with and linked to a group of the reference keywords for recreations such as "skiing".

The reference keyword extracted is also inserted in a blank part BLANK here as it is. As a result, a conversation response "I like skiing too. What is important for skiing" is provided.

Here, a part "What is important for skiing" forms a question item, and the apparatus is configured so that the response sentence models for next usage are selected in a branching fashion in accordance with a classification of the reference keyword which is contained in the question. For example, the following response sentence models are selected for each case. In a case of a group of the reference keywords relating to transportation devices, such as "snow" and "road", a model "Oh, BLANK. Be serious. What is important for BLANK and a car?" is selected. In a case of a group of the reference keywords relating to tools or baggage, such as "tool", "board", and "skiwear", a model "Do you buy BLANK? You don't have a new one." is selected. In a case of a group of the reference keywords relating to destinations, such as "skiing area", "hotel", "accommodations", and "hot spring", a model "Do you say BLANK? From now? really?" is selected.

In the case of this embodiment, since the user answered as "It is snow.", the apparatus selects and outputs "Oh, snow. Be serious. What is important for snow and a car?"

It continues as follows, the user says "It is a tire.", and the chatterbot says "Did you replace to stud-less?"

As described above, it is possible to know that the user is interested in replacing a tire, to accumulate keywords relating to purchasing a tire, and to gradually narrow subjects, i.e., destinations.

If the subjects is sufficiently narrowed, it is also effective to continue outputting the response sentence model having contents for inducing continuous speaks by showing sympathy with a user, in a form which sandwiches it as an interlude, such as "You are familiar with BLANK. Tell me more.", and "I am pretty interested in that. Tell me more about BLANK." in response to each utterance of the user.

That is, it is possible to enrich accumulated number of interest determining keywords mentioned above by making a user tell continuously after the subject is materialized to some extent.

In addition, it is also effective to learn response sentence model selection according to a log of conversation (chat) which is recorded. The exchange performed in conversation can be pursued later by reviewing the log. In this case, since it is assumed with high probability that a reply is recorded on the next line of the question, the apparatus may calculates a correlation coefficient by a predetermined method after comparing an input string with a character string in the log, and may proceed a self-study processing in a form that a response sentence model which comes to the next of the user utterance highest in correlation is selected as a reply.

Further, available methods about algorithms for selecting response sentence model are explained below. FIG. 34 shows an example of conversation in case a season is summer. A conversation cue phrase here is "It is hot. Aren't you hesitating to go out?", and a reply from a user is "Well. Boys want to go to beach."

In this case, since a reference keyword "want to go" reflecting a visit intention can be found in the conversation, the apparatus prepares response sentence models such as "How about BLANK.", and "BLANK is close from here." in order to introduces some destinations associated with the reference keyword.

Further, "beach" specifying a genre of the destination is included in the reference keyword. Therefore, the apparatus searches destination candidates categorized in the genre and located within a predetermined distance from the present location within the destination data base 21d by using a function of the above-mentioned car-navigation system 534. Then, the apparatus inserts "TAKASHIO beach" into a response sentence model as a leading keyword which is associated with and linked to both a destination genre keyword and a visiting intention reflection keyword in a compounding manner, such as "beach" and "want to go". As a result, a conversation response "How about "TAKASHIO beach"?" is outputted.

Then, the user replies by "We went to TAKASHIO beach last year."

Among these, the apparatus extracts two reference keywords "last year" and "went to" reflecting the past visiting record. The apparatus selects "How about BLANK." as a response sentence model for proposing an alternative destination by associating and linking the above result. Then, the apparatus searches an alternative destination candidate within a destination data base 21d in FIG. 30, and inserts the alternative destination candidate into a response sentence model as a leading keyword, here "IMOARAI beach".

As a result, the apparatus outputs a conversation response "How about IMOARAI beach?"

In addition, when searching alternative destination candidates, it is also possible to conduct a search by lowering the priority of the destination already visited in the past by referencing the output history data 21d shown in FIG. 41. For example, the destination already visited within the latest predetermined period, e.g., one to three years, may be dropped from alternative destination candidates. For example, if the output history data 21d is in a condition shown in FIG. 41, "TAKASHIO beach" would not be adopted as a destination candidate in the conversation response shown in the third line of FIG. 34.

Similar exchanges are repeated hereafter. For example, in the second line of the user utterance, "even distanced" is extracted as a reference keyword for changing a searching range for destinations. The other words such as "extend a trip", "even takes time", and "more close" may be extracted for the same purpose. For example, in the second line of the user utterance, "not crowded" is extracted as a reference keyword for determining a popularity ranking of destinations. The other words such as "not wait", "good place known to few people", and "lined up" may be extracted for the same purpose. For reflecting the former one, a regional range for searching alternative destination candidates within the destination database 21d is expanded by a predetermined distance. For reflecting the latter one, alternative destination candidates are searched by narrowing to the low-ranking destinations in the popularity ranking. The popularity ranking information of each destination may be associated with and linked to each destination and stored in the destination data base 21d of FIG. 30, alternatively, may be acquired from the external information providing server, e.g., the contents providing server 500 in FIG. 29, which is connectable with the car via a wireless communication.

Next, FIG. 35 shows another example of conversation, when a season is summer. Here, it is shown that an example in which a conversation begins in response to a control state, e.g., a control state in a passenger compartment, of the car by the hospitality system at the occurrence of the start-up scene by outputting a conversation cue phrase corresponding to the control state. Specifically, the hospitality system starts the engine in advance of user getting in, and turns on the air-conditioner in operation for making a passenger compartment pre-cooled in accordance with a presetting by a use. Then, the following conversation cue phrase is outputted in response to a detection of seating of a user to a seat.

That is, "I activated the air-conditioning."

Although the above is a familiar attitude which tells the service performed the apparatus a little patronizingly, this may lead to make a user feels a perfect housewife sense of closeness. In this example, the user says "Thanks. You saved me."

Among these, "saved" is extracted as a reference keyword corresponding to a praising language. The other words such as "appreciate", "That's like you", and "You are sensible." may be extracted for the same purpose. A response sentence model showing the contents with which it will be pleased if praised is associated with and linked to the reference keyword showing language. However, it does not contain any blank part and is served as a conversation response as it is. For example, the following conversation response is outputted. "It is my pleasure."

Although the apparatus may be configured to freely continue a conversation from such a cue, in this embodiment, the apparatus promptly selects and outputs the response sentence model, i.e., a conversation response, relating to today's weather, such as "Outside is so hot." in order to lead the user to a topic which may induce destination information.

In response to the above, the user replies with "Don't you know anywhere cool place?" "anywhere" and "cool" are extracted as reference keywords.

Here, "anywhere" is a reference keyword reflecting a visiting intention, and "cool" corresponds to a reference keyword for determining the genre of the destination. In this example, the apparatus selects "I have some BLANK. Do you have plenty of time?" as a response sentence model, inserts "cool place(s)" as a leading keyword as it is, and outputs a response sentence "I have some cool places. Do you have plenty of time?"

The feature of this response sentence model is that the model includes "Do you have plenty of time?" as a phrase for inducing information about a permitted time for going out that the user desires. For the same purpose, phrases such as "Can you drive long?", "Have a local drive, because you seems tired." according to an acquired physical condition, and "It is nice feeling today, so let's have a long drive." may be used.

The user replies "I want to go for a drive. Three hours." in response to the above. The apparatus extracts "three hours" as a reference keyword. Therefore, the apparatus searches destination candidates that are located within an expected trip time from the tourist resorts which mainly include mountains, rivers, lakes, etc. associated with and linked to a keyword "cool". The expected trip time is determined taking a going trip time, a returning trip time, and a staying time in consideration, e.g., (3−1)/2=1 hour. The staying time is a predetermined time, e.g., 1 hour. Then, the apparatus inserts one of the search results into a response sentence model as a leading keyword, e.g., "DOKAYUKI plateau". As a result, the apparatus outputs a conversation response "How about DOKAYUKI plateau also good in summer. About one hour."

As mentioned above, although an example for leading a conversation in SS1605 in the start-up scene in FIG. 31 is explained, a similar conversation is induced in SS1610 to SS1611 by activating the chatterbot for every fixed time after it is started in order to change a user's feeling. That is, in response to every elapsing of the fixed time, the apparatus determines that the changing a feeling scene has come.

Although the above-mentioned embodiment is configured to starts a conversation from the chatterbot engine side by outputting a conversation cue phrase, alternatively, it is possible to configure the apparatus to state a conversation from the user by an utterance which calls the chatterbot engine to perform. For example, it is possible to configure the apparatus to register a nickname of the chatterbot or the vehicle in advance, and to activate the chatterbot engine in an interrupting manner in response to a direct voice input of the nickname. For example, if the nickname is "KAORIN", the direct voice input may be "KAORIN, Do you have time?"

Next, FIG. 36 shows an example of a leading conversation in the fatigue scene. For example, the conversation cue phrases may include "Aren't you tired?", "Have a short break.", etc. in a case of a slightly tired condition which may include a poor health condition. For example, the conversation cue phrases may include "You must rest for a while.", "I am tired. I want to rest. Understand?", etc. in a case of a heavily tired condition which may include a serious poor health condition.

Thus, it is possible to rationalize a leading direction of a conversation more according to a user's physical condition by changing the contents of the conversation cue phrases according to the determined grade of the fatigue.

Since FIG. 36 shows an example of relatively slight fatigue, the apparatus outputs "Aren't you tired?" as a conversation cue phrase.

In the drawing, the left column shows an example of a conversation in a case where the user replies with an utterance "No, I am OK." which denies fatigue.

In this case, "OK" is extracted as a reference keyword reflecting negation of fatigue, and "Why don't you have a break." is selected and outputted as a response sentence model, i.e., a conversation response associated with the reference keyword extracted.

Conversation is converged without certain progressing.

On the other hand, the right column in the drawing shows an example of a conversation in a case where the user replies with an utterance "I need something like coffee." which shows an intention for resting.

In this case, "Coffee" is extracted as a reference keyword reflecting a resting intention. Therefore, the apparatus searches destination candidates related to a coffee shop, a light meal shop, a parking area or a service area and located within a predetermined close distance, e.g., less than 10 km, from the present location within the destination data base 21d, and inserts one of search results into a response sentence model as a leading keyword, e.g., here "KAMEYAMA parking" is inserted. As a result, the apparatus outputs a conversation response "We are approaching to KAMEYAMA parking."

FIG. 37 shows an example of leading conversation in the hungry scene, e.g., for a full-scale meal in SS1412. The apparatus outputs "You did not have a meal. Right?" as a typical conversation cue phrase.

A user should reply an answer which includes a degree or grade of hungry. In the left column of the drawing, the user replies with "Yes. I feel little hungry."

Here, the apparatus is configured to determine a genre of restaurants in associated with a degree of hungry. Therefore, the apparatus extracts "hungry" as a referene keyword, and determines a sub classification code "full and thick food" which gave priority to a feeling of fullness by the destination data base 21d based on the extracted reference keyword. The apparatus takes a name of this sub classification code as a leading keyword associated with a hungry, and outputs a conversation response "Do you want to have a full and thick food?"

The user replies to the above by an answer "Any kind is OK. But, I want some fast." Therefore, "any kind" and "fast" are extracted as reference keywords.

The sub classification code is already selected by the system side at this stage, a keyword "any kind" is used and recognized as a keyword for giving a confirmation to maintain the above selection. The apparatus searches restaurants having the selected sub classification code "full and thick food" and being located within a fixed short distance, e.g., less than 10 km, from the present location by the destination data base 21d. Then, the apparatus inserts one of search results into a response sentence model corresponding as a leading keyword, e.g., "TENKOMORI". As a result, a conversation response "OK. How about a Noodle shop TENKOMORI." is outputted.

On the other hand, in the right column of the drawing, the user replies with "Have a light one."

In this case, the apparatus extracts "light one" as a reference keyword, and determines a sub classification code "light and thin food" which gave priority to a lighter meal in the destination data base 21d based on the extracted reference keyword. The apparatus takes a name of this sub classification code as a leading keyword associated with a hungry, and outputs a conversation response "Do you want to have a light and thin food?"

FIG. 38 shows an example of leading conversation in the hungry scene, e.g., for a light meal in SS1413. "Do you want to have some snack?" which is appropriate for leading the user to a light meal is outputted as a conversation cue phrase.

The following exchanges show a flow for leading the user to determine a genre of restaurants. However, in the second line from the bottom, the user says "Do you know any shop close to here. Show me a fun shop.", then the apparatus extracts "fun" as a reference keyword reflecting a user's request for a popular shop or a recommended spot. The other keywords such as "recommend", "good place", etc. can be used for this purpose.

The apparatus can search a popular shop or a recommended spot based on the above-mentioned information of the popularity ranking.

If a leading direction of a conversation is narrowed exactly, there is a case where a user interest objects, such as a final destination, may be able to be promptly determined from the specific reference keyword inputted in the final stage of a series of conversation. For example, if only a sufficient communication is achieved in a conversation, the apparatus just presents one or plural actual destination candidates as leading keywords, and uses such candidates as choices to make the user to select one. However, as mentioned above, it has to be said that it is rare to be able to determine a user interest object with convenience sufficient as mentioned above, since the chatterbot does not possess the capability to analyze the syntax of a user's utterance and to understand the contents of interest directly. Therefore, the apparatus is configured to make the user speaks as much as possible, and to accumulate the contents of inputted series of the user's conversation. For this accumulating purpose, an accumulating area is preserved, for example, in the RAM 183 in FIG. 28. For example, the conversation content recognized by a speech recognition may be accumulated as it is. Alternatively, a reference keyword extracted by referencing the reference keyword dictionary built in the chatterbot engine may be accumulated.

In case of accumulating a conversation content as it is, the keyword extraction software 109c, i.e., a keyword extraction means, in FIG. 28 plays the role which extracts the interest determining keyword used for determining a user interest from the entry content which recognized by the speech recognition. An interest determining keyword dictionary 109d which covers a group of interest determining keywords beforehand selected for determining an interest is stored in the flash memory 109, i.e., a key word dictionary storage part. The keyword extraction software 109c selectively extracts only an interest determining keyword arranged in the interest determining keyword dictionary 109 by comparing the conversation content decomposited into words with the group of the interest determining keywords registered in the interest determining keyword dictionary 109d in a word by word manner.

Only keywords which are considered effective to narrow the service information contents are registered in the interest determining keyword dictionary 109d. For example, the registered keywords directly reflect information genres, e.g., a car accessory, an amusement, a meal, etc.), classifications of goods or service (e.g., a tire, skiing, etc.), seasons, proper nouns (e.g., a name of a place, a name of a person, a store name, etc.), etc. For example, in the above-mentioned conversations, the underlined words are registered as the keywords. Therefore, the apparatus can extract only the keyword which is matched in a comparing processing by comparing the words provided by decompositing the above-mentioned conversation with the interest determining keyword dictionary 109d.

Since the keywords in the reference keyword dictionary 109g on the side of the chatterbot engine are selected for the purpose of leading a conversation, the reference keyword dictionary 109g covers keywords other than the interest determining keywords. For example, the reference keyword dictionary 109g includes keywords such as "last year" and "went" in FIG. 34, "saved" and "anywhere" in FIG. 35, "OK", "thanks" and "go there" in FIG. 36, "fast" and "what kind" in FIG. 37, and "fun" in FIG. 38. However, it includes the interest determining keywords mostly, therefore, it is also possible enough to substitute it as the interest determining keyword dictionary. In this case, a reference keyword is extracted from the reference keyword dictionary 109g for leading a conversation, but, it is possible that the apparatus can not place an interest determining keyword which is contained in the conversation contents as an extracting target depending on a leading direction of a conversation. However, the apparatus may be configured to extract and accumulate keywords including the interest determining keyword which does not have particular relevance with a leading direction of a conversation, and may be configured to remove keywords other than the interest determining keywords from the accumulated result. As a result, the apparatus may utilize the remaining keywords as a base data for determining an interest.

The keyword extraction software 109c accompanies a dictionary tool which functions as a key word dictionary renewal means. The dictionary tool is performed periodically. The dictionary tool demands distribution of keyword update information containing a group of new keywords related to a season, fashion, or newest topics to a dictionary distribution server 501 through the Internet 1170 or the other communication network, and updates the key word dictionary 109d by the keyword update information acquired by receiving the distribution. In detail, the dictionary tool adds a new keyword if the keyword update information contains the new keyword, and contrary, deletes a specific keyword if the keyword update information contains a deletion command for the specific keyword. For example, some keywords only for a season are registered in the dictionary in a limited manner for a specific period corresponding to the season, and are deleted when the specific period expires. For example, "snow", "skiing", "stud-less" etc. are considered to be a keyword peculiar to winter, and has a specific period such as from November to April.

Next, interest analysis software 109e carries out functional realization of the user interest information retrieving means, and stores and memorizes the group of the extracted interest determining keywords including redundancies as the keyword statistical data 109j, i.e., a base data for determining interest. Further, a frequency of occurrence of each interest determining keyword in the keyword statistical data 109j is counted. The counted results are stored as shown in FIG. 39. The old keyword which became an outside of a sampling period is deleted from the keyword statistical data 109j one by one.

Figure 40:
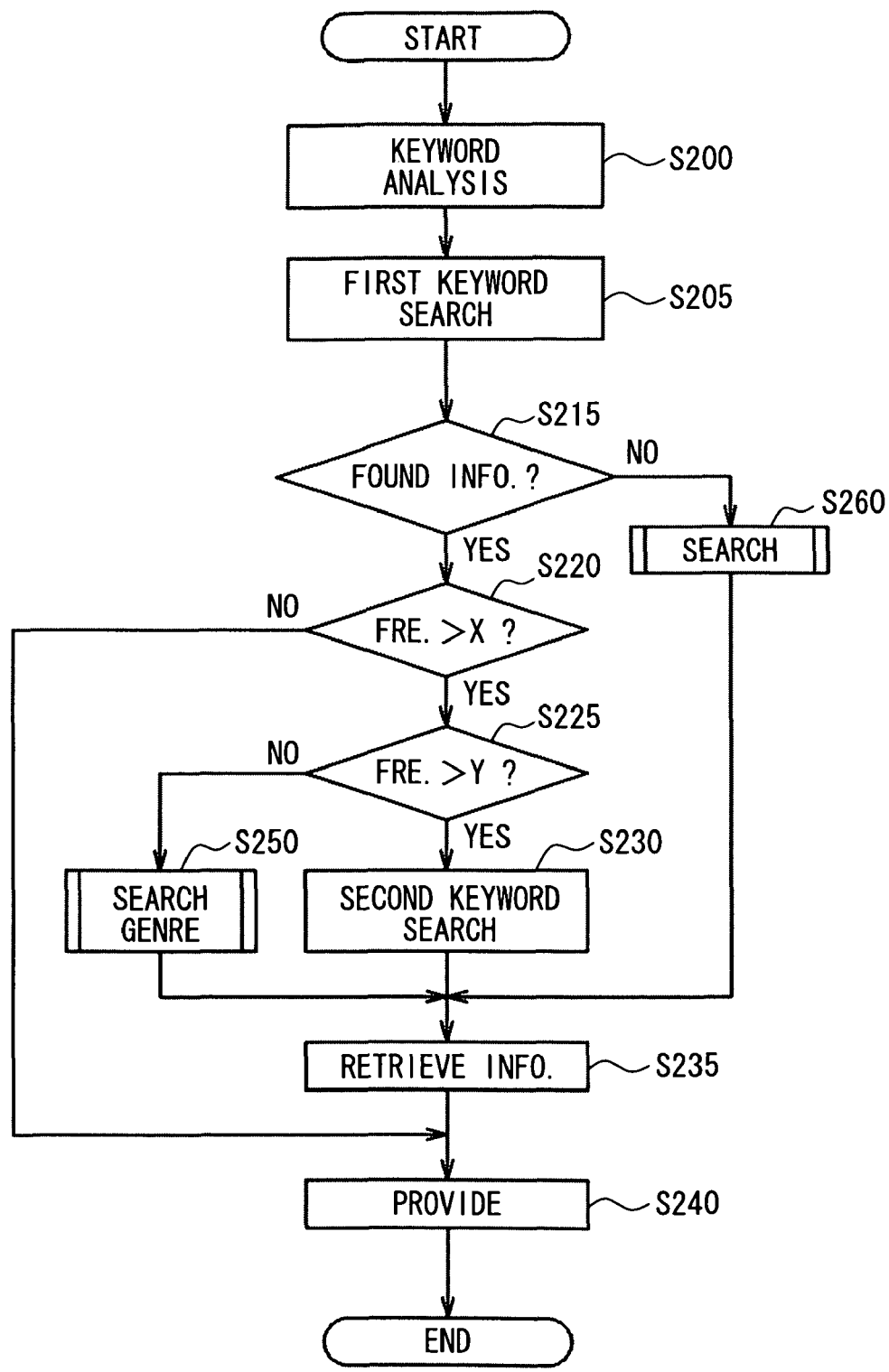
FIG. 40 is a flow chart in which a flow of information service processing is shown.

FIG. 40 shows a flow of the information acquisition processing based on the base data for determining an interest. First, in S200, the keyword statistical data 109j is analyzed and a destination containing the keyword extracted with the highest frequency is searched on the destination data base 21d. Hereafter, the keyword having the highest frequency is called as the first keyword. If it is determined that no destination matched with the keyword is found in S215, the process proceeds to S260, and information retrieval processing is widely performed on the Internet, e.g., the information service server 500, via a search engine site as shown in FIG. 29.

Figure 9:
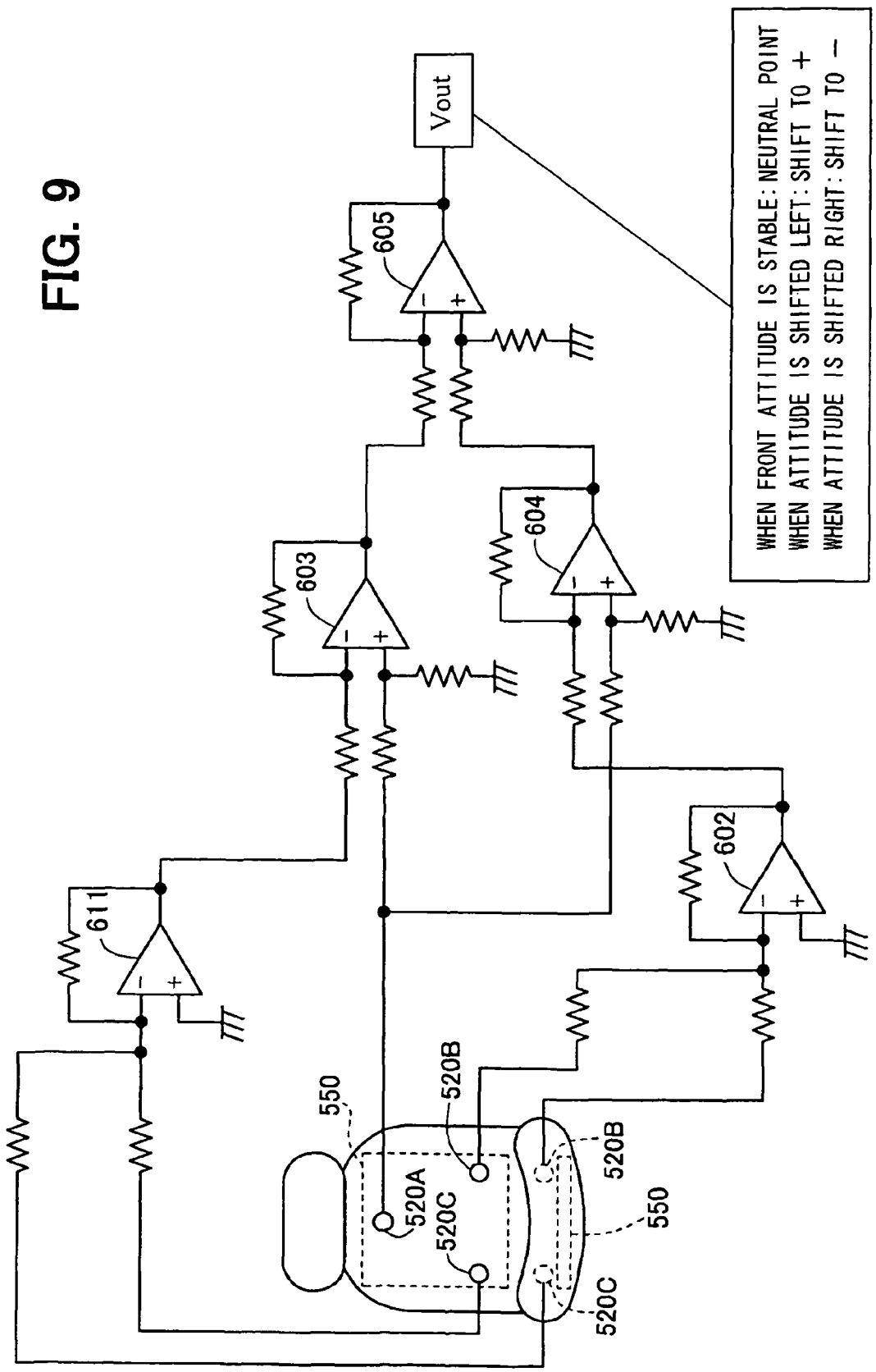
FIG. 9 is a circuit diagram showing an example of a hardware for generating an attitude signal waveform.

On the other hand, if it is determined that a destination matched with the keyword is found in S215, the process proceeds to S220, and information retrieval processing is performed inside, that is, is performed on the contents data 21u in the HDD 121. The visit frequency is investigated with reference to the destination visit history, i.e., the destination history, on the output history data 21d in FIG. 9. If the visit frequency is less than a first threshold value X, e.g., X=2, in S235, the process promptly proceeds to S240. The apparatus displays destinations matched on the monitor 110 in a listed manner and invites the user to perform a selection.

On the other hand, when the visit frequency is equal to or more than the first threshold value X in S220, the process proceeds to S225. If the visit frequency is less than a first threshold value Y, e.g., Y=4, the process proceeds to S250. Here, an extended retrieval processing is conducted in a form where destinations that does not include the keyword are placed as searching targets by using the classification, i.e., a sub classification code or a genre code, to which the hit destination belongs. Then, the apparatus displays the result on the monitor 110 in a listed manner and invites the user to perform a selection.

If the visit frequency is equal to or more than the first threshold value Y, it judges that the destination has obsoleted and progresses to S230. Here, a retrieval processing is conducted by expanding subjective destinations by an OR logic between the above-mentioned first keyword and a keyword called a second keyword which is extracted with the second high frequency. Then, the apparatus displays the result on the monitor 110 in a listed manner and invites the user to perform a selection.

FIG. 42 shows an example of display in a listed form, which displays respective destination selection button 110B in a form where the past visit frequency is discriminatable. For example, the destination selection buttons 110B are classified by color according to visit frequency. A user can switch to the destination setting screen 122 shown in FIG. 43 by touching on a corresponding button on the touch panel 112. Then, a user can finalize a destination setting by touching on a finalizing button 122F, and start a guidance.

On the other hand, when other service information relevant to the destination exists, since an access button 122s to the other service information is additionally displayed, the user can make the apparatus outputs the other service information by execution of the access button 122s. For example, in a case that the service information is contents of the Internet website, the access button 122s is formed as a link button to the website. In a case that destinations are restaurants as shown in FIG. 43, for example, if it is required to show a menu of one restaurant, the access button 122s is attached with an URL link to a menu showing page which is a part of the contents. By execution of this access button 122s, wireless access is made from the car-navigation system 534 to the contents providing server 500, i.e., the information service server, of the website. Then, a menu page is displayed on the monitor 110 as shown in FIG. 44.

In a case that the contents file of this website acquired by the past access is memorized in the contents data 21u in the HDD 121, the contents file may be just read out from the HDD 121 and outputted to the monitor 110 without any access to the contents providing server 500. However, if the last access was held before a predetermined time, an output to the monitor 110 is performed based on an access to the contents providing server 500. In this case, an old contents file is renewed in an overwriting manner by a re-downloaded contents file.

Next, as shown in FIG. 45, it is possible that an appropriate destination selection can not performed because too many destinations equal to or more than the threshold valve may be searched by using the first keyword only. In this case, a narrowing process on the destination candidates can be performed by an AND logic with the second keyword. FIG. 45 shows an example of a display of a destination list and selection buttons 110B, in a case where a group of the interest determining keywords, which includes "snow" as the first keyword; and "tire", "hot spring" and "skiing" as the second keyword, is retrieved from the supported conversation shown in FIG. 29.

Figure 46:
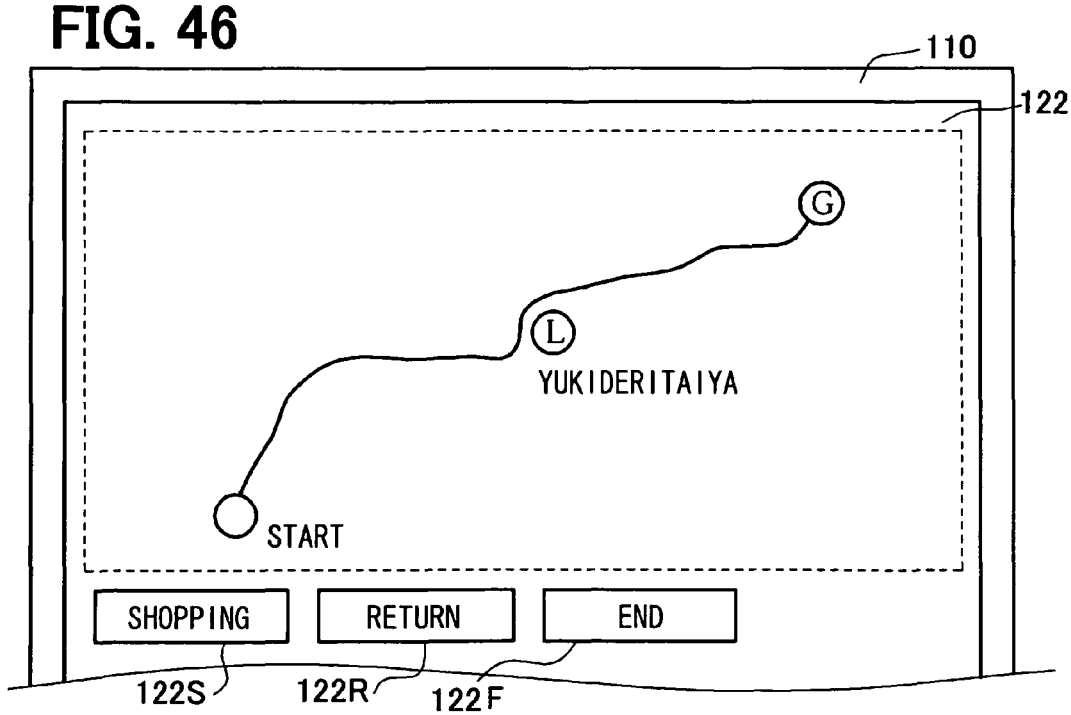
FIG. 46 is a figure showing an example of display for the destination setting corresponding to the second example of output.
Figures 47, 48:
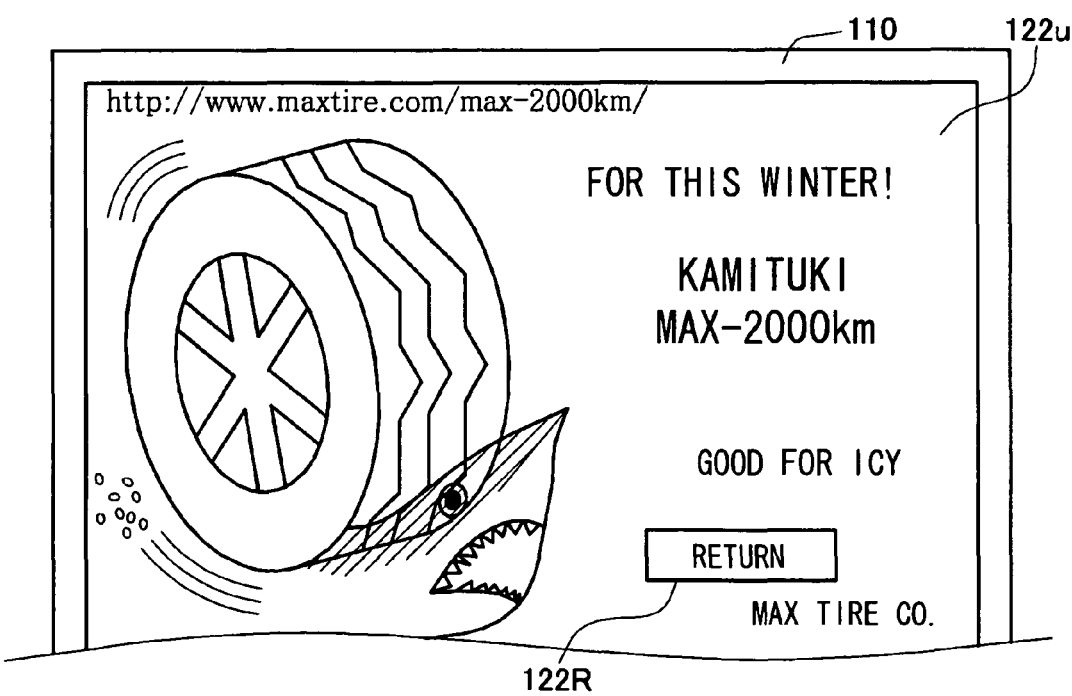
FIG. 47 is a figure showing a first example of display for the contents of a website.
FIG. 48 is a figure showing a second example.

FIG. 46 shows an example of a display of a destination setting screen 122 when one of tire shops is selected as a destination, in a case where a narrowing processing is performed by using "tire" as a second keyword. Since the website of the tire shop accompanies a shopping page, a link button to the shopping page is provided as an access button 122s. FIG. 47 shows a display image 122s of the shopping page.

In addition, if an information service relating to an access record of the pertinent information in an external search website can be obtained from a third party during a narrowing process, the apparatus may be configured to additionally set and display a link button to the pertinent information obtainable website as an auxiliary access button 110E, i.e., word-of-mouth information button. For example, the apparatus transmits keywords "snow" and "tire" to a search website. Then, the search website conducts a website search for the goods, e.g., a stud-less tire, related to the transmitted keywords, and creates the statistical data which reflects the access frequency of the searched website. Then, the search website sends URL information of a website which shows the goods having the highest access frequency among the associated goods back to the car-navigation system 534. In response to the above, the car-navigation system 534 creates an auxiliary access button 110E. FIG. 48 shows an image 122U displayed on the monitor 110 by a processing in response to the auxiliary access button 122E.

Figure 49:
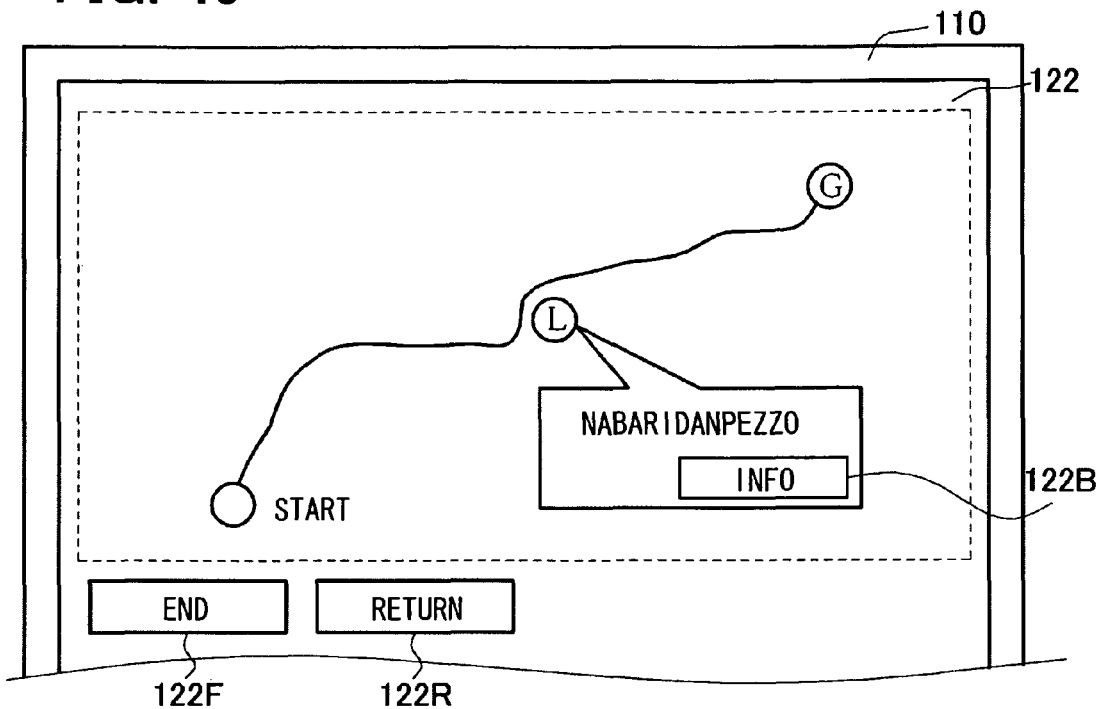
FIG. 49 is a figure showing an example of display for the destination setting corresponding to a third example of output.
Figure 50:
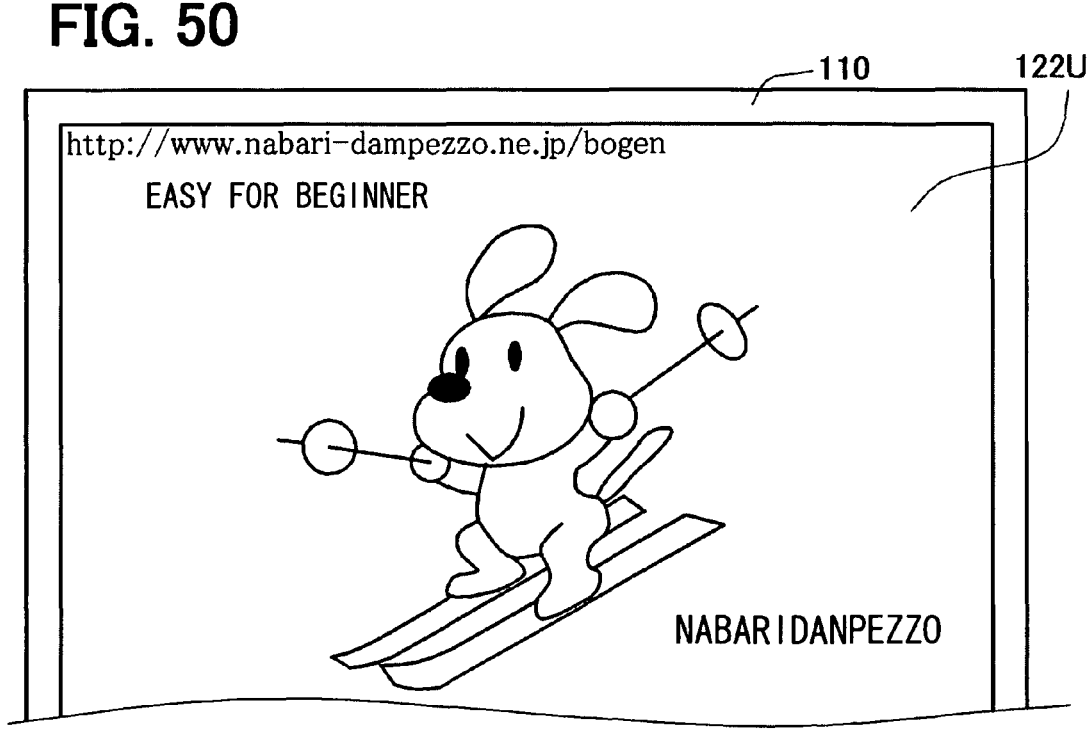
FIG. 50 is a figure showing an example of display for the contents of a website.

FIG. 49 shows an example of a display of a destination setting screen 122 when one of skiing areas is selected as a destination, in a case where a narrowing processing is performed by using "skiing" as a second keyword. A link button for enabling a link to the website of the skiing area is prepared as the access button 122s. FIG. 50 shows an image 122U displayed on the monitor 110 by a processing in response to the access button 122s.

Figure 51:
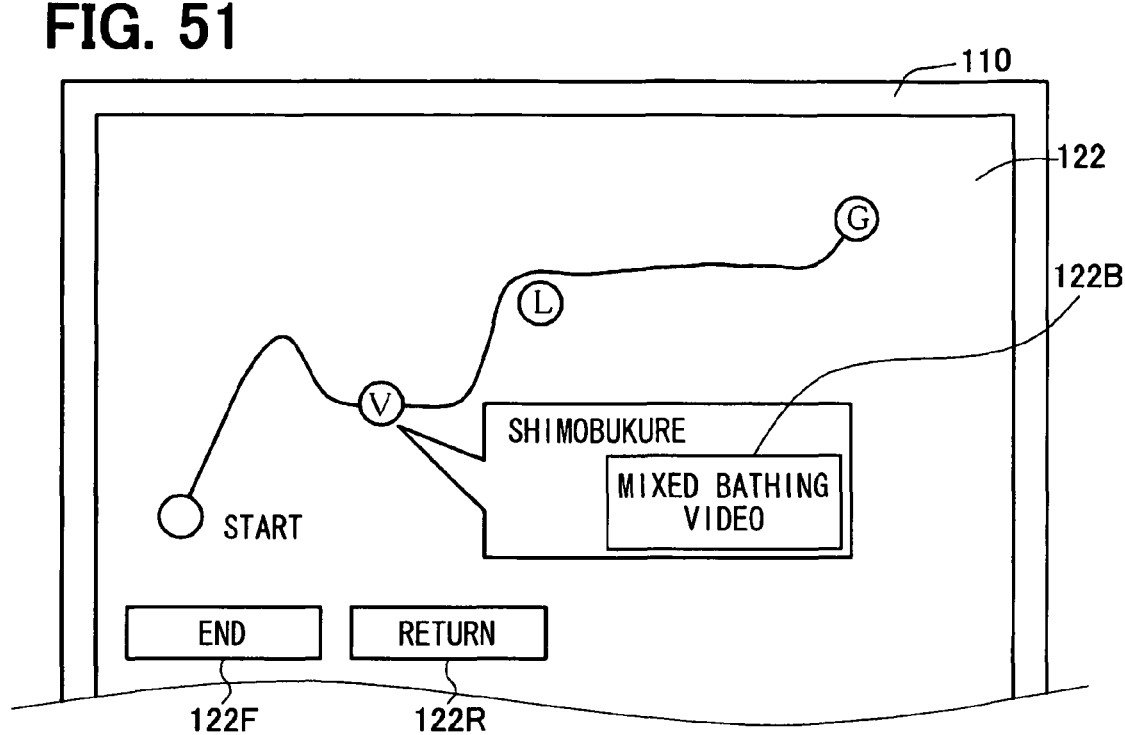
FIG. 51 is a figure showing an example of display for the destination setting corresponding to a fourth example of output.
Figure 52:
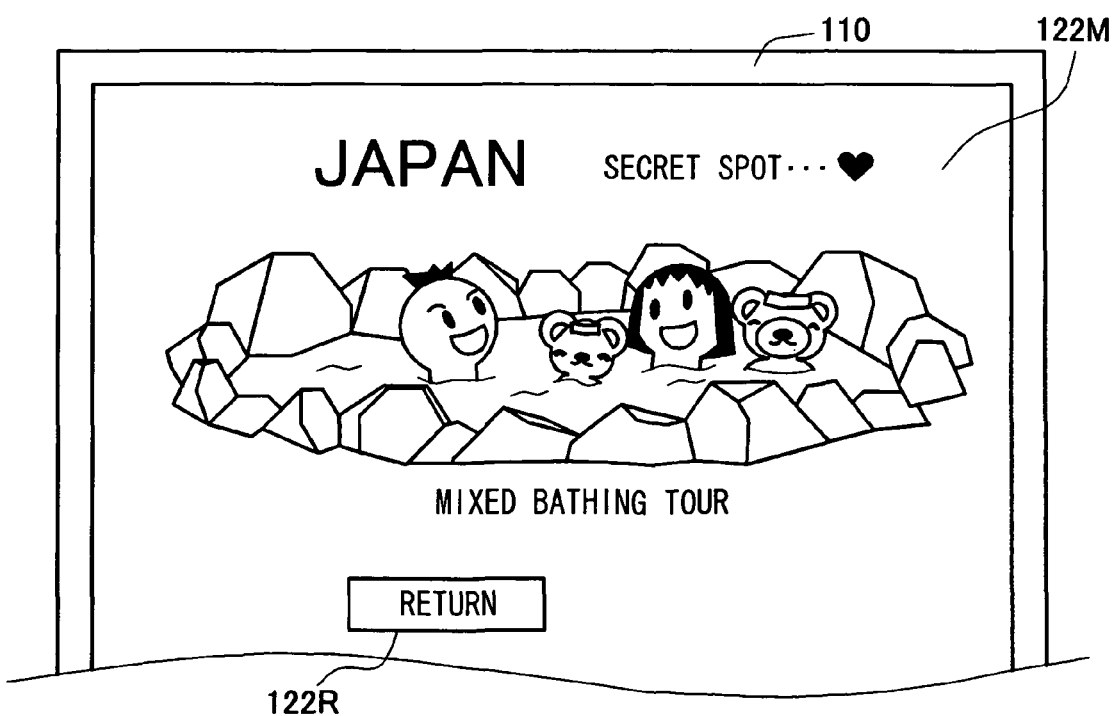
FIG. 52 is a figure showing an example of a video output.

FIG. 51 shows an example of a display of a destination setting screen 122 when one of hot-spring resorts is selected as a destination, in a case where a narrowing processing is performed by using "hot spring" as a second keyword. Here, an access button 122B for enabling an access to a hot spring related image information memorized in the contents data 21u in the HDD 121 is provided. FIG. 52 shows an example of a display of an image 122M provided by a processing in response to the access button 122B.

In the above-mentioned embodiments, although a information service about the destination etc. is performed based on the interest determining base data acquired by a conversation support function, for example, it is also possible to utilize it as supporting information for rationalizing an operation of the hospitality system 100, and to utilize it as supporting information for an automatic song selection in the car stereo 515.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An information providing apparatus for a vehicle comprising:
 a conversation input device which inputs conversation by an audio input or manual operation by a user on a vehicle;
 a conversation support device, which is made to perform as a user's false conversation partner, including:
  a reference-keyword dictionary storage memory which memorizes a reference-keyword dictionary, in which a plurality of reference keywords are registered;
  a reference-keyword extraction device for retrieving a reference keyword by comparing input contents of the conversation of the user with the reference-keyword dictionary;
  a response sentence model storage memory which memorizes a plurality of response sentence models with an insertion blank part, in which a retrieved reference keyword or another reference keyword preliminary linked to the retrieved reference keyword within the keyword dictionary is inserted as a leading keyword so as to lead a user's next conversation input; and a conversation-leading-response-sentence creating and outputting device for creating and outputting a conversation leading response sentence, which leads the next conversation input by the user, the conversation leading response sentence being created by inserting the leading keyword corresponding to the retrieved reference keyword into the insertion blank part of the response sentence model, which is selected in accordance with the reference keyword and retrieved in an orderly manner from the response sentence model storage memory at each time of input of the conversation input by the user;

a base data accumulation device for determining a user interest, which accumulates base data for determining a user interest based on a series of conversation contents of the user inputted in response to leading of the conversation support device;

a service information collecting device for analyzing an object of the user interest based on contents of the accumulated base data for determining the user interest, and for collecting service information which is matched with the analyzed object of the user interest; and a service information output device for outputting the collected service information in a form of an image, audio, or those combination, wherein the conversation support device has a conversation support base data which includes the reference keyword dictionary and the response sentence models, the conversation support base data having a plurality of base data sets, each of which has different content adapted to a predetermined conversation support scene, wherein the conversation support device further includes:
a conversation support scene determining device for determining occurrence of one of the predetermined conversation support scenes, and
a conversation support base data switching device for switching the base data sets of the conversation support base data in response to a determined conversation support scene, wherein the reference-keyword extraction device does not conduct a syntax analysis for determining modification relation and grammatical logic analysis for word arrangement, wherein the reference-keyword extraction device retrieves the reference keyword, which is a word matched in a character string with a certain reference keyword memorized in the reference-keyword dictionary storage memory, wherein the conversation support device is configured as a chatterbot engine, which performs only both of a character string matching by referencing the reference-keyword dictionary storage memory with using the reference-keyword extraction device, and insertion of the leading keyword into the response sentence model, which is memorized in the response sentence model storage memory, with using the conversation-leading-response-sentence creating and outputting device.

2. The information providing apparatus for the vehicle claimed in claim 1,
wherein the conversation support device creates the conversation leading response sentence, of which a meaning is not uniquely determined, when there is no word matched in a character string in the reference-keyword dictionary.

3. The information providing apparatus for the vehicle claimed in claim 1, further comprising:
an interest determining keyword retrieving device for extracting an interest determining keyword, which is used for determining the user interest according to the conversation contents,
wherein the base data accumulation device for determining the user interest includes an interest determining keyword storage device for accumulating the extracted interest determining keyword.

4. The information providing apparatus for the vehicle claimed in claim 3,
wherein the service information collecting device searches service information to be collected by using the interest determining keyword retrieved by the interest determining keyword retrieving device, and
wherein the interest determining keyword retrieving device analyzes a frequency of occurrence of the interest determining keyword accumulated in the interest determining keyword storage device, and sets higher priority for employing the interest determining keyword having high occurrence frequency when the service information collecting device searches the service information.

5. The information providing apparatus for the vehicle claimed in claim 4,
wherein the interest determining keyword retrieving device has an interest determining keyword dictionary storage memory, which memorizes an interest determining keyword dictionary covering an interest determining keyword group selected beforehand, and
wherein the interest determining keyword retrieving device selectively retrieves the interest determining keyword listed on the interest determining keyword dictionary by comparing the interest determining keyword dictionary and a decomposition result of decompositioning the conversation contents into words.

6. The information providing apparatus for the vehicle claimed in claim 3,
wherein the interest determining keyword dictionary is provided by the reference keyword dictionary which is used by the conversation-leading-response-sentence creating and outputting device.

7. The information providing apparatus for the vehicle claimed in claim 6,
wherein the reference keyword retrieving device in the conversation-leading-response-sentence creating and outputting device is provided by the interest determining keyword retrieving device.

8. The information providing apparatus for the vehicle claimed in claim 1,
wherein the conversation support device includes;
a first narrowing device for repeating one or more turns the response sentence model, which includes a question item for narrowing a destination; and
a second narrowing device for outputting the response sentence model having a content for inducing continuous speaks by showing sympathy with user words.

9. The information providing apparatus for the vehicle claimed in claim 8,
wherein the conversation support device includes:
a conversation cue phrase storages memory which memorizes a conversation cue phrase prepared for each of the conversation support scenes, and a conversation cue phrase output device for reading and outputting a corresponding conversation cue phrase in response to a detection of occurrence of the conversation support scene.

10. The information providing apparatus for the vehicle claimed in claim 8,
wherein the conversation support scene determining device determines a start-up scene of the vehicle as the conversation support scene, and
wherein the conversation support base data switching device switches to the set of the conversation support base data for inducing interest object information relating to a final destination from the user.

11. The information providing apparatus for the vehicle claimed in claim 8,
wherein the conversation support scene determining device determines a hungry scene of the user as the conversation support scene, and
wherein the conversation support base data switching device switches to the set of the conversation support base data for inducing interest object information relating to a meal content from the user.

12. The information providing apparatus for the vehicle claimed in claim 8,
wherein the conversation support scene determining device determines a fatigue scene of the user as the conversation support scene, and
wherein the conversation support base data switching device switches to the set of the conversation support base data for inducing interest object information relating to a resting content from a user.

13. The information providing apparatus for the vehicle claimed in claim 1,
wherein the conversation support device has a conversation support base data which includes the reference keyword dictionary and the response sentence models, the conversation support base data including a plurality of base data sets, each of which has a different content adapted to a physical and/or mental condition of the user which is subject to applying a conversation support, and
wherein the conversation support device includes:
a user body characteristics information acquisition device for acquiring user body characteristics information, which reflects the user's physical condition and/or mental condition;
a physical and mental condition determining device for determining user's physical condition and/or mental condition based on a content of acquired user body characteristics information; and
a conversation support base data switching device for switching the sets of the conversation support base data in response to a determined user's physical condition and/or mental condition.

14. The information providing apparatus for the vehicle claimed in claim 9,
wherein the conversation support base data includes a plurality of base data sets, each of which has a different content adapted to season, and
wherein the conversation support base data switching device detects present season, and chooses and uses the set of the conversation support base data corresponding to the detected season.

15. The information providing apparatus for the vehicle claimed in claim 1, further comprising:
a car-navigation system,
wherein the service information collecting device searches and collects the destination information, which suits user interesting information, as the service information on the car-navigation system.

16. The information providing apparatus for the vehicle claimed in claim 1, further comprising:
a wireless access device to the Internet website,
wherein the service information collecting device searches and collects website information, which suits user interesting information, as the service information on the Internet.

17. The information providing apparatus for the vehicle claimed in claim 1,
wherein the conversation support device includes a conversation leading device for performing conversation at the start-up scene with using the conversation support base data in order to pull out information about an user desired destination from the user.

* * * * *